(12) United States Patent
McMackin et al.

(10) Patent No.: US 8,717,492 B2
(45) Date of Patent: May 6, 2014

(54) FOCUSING MECHANISMS FOR COMPRESSIVE IMAGING DEVICE

(75) Inventors: Lenore McMackin, Austin, TX (US); Donna E. Hewitt, Austin, TX (US); Tyler H. Weston, Austin, TX (US); Byron Zollars, Georgetown, TX (US)

(73) Assignee: InView Technology Corporation, Austin, TX (US)

( * ) Notice: Subject to any disclaimer, the term of this patent is extended or adjusted under 35 U.S.C. 154(b) by 267 days.

(21) Appl. No.: 13/208,263

(22) Filed: Aug. 11, 2011

(65) Prior Publication Data

US 2012/0038817 A1 Feb. 16, 2012

Related U.S. Application Data

(60) Provisional application No. 61/372,826, filed on Aug. 11, 2010.

(51) Int. Cl.
*H04N 5/228* (2006.01)
*G03B 13/36* (2006.01)

(52) U.S. Cl.
USPC .................................. 348/349; 348/222.1

(58) Field of Classification Search
USPC .......................... 348/349, 345, 346
See application file for complete search history.

(56) References Cited

U.S. PATENT DOCUMENTS

| | | | |
|---|---|---|---|
| 6,727,949 B1 * | 4/2004 | Saruwatari et al. | 348/349 |
| 6,937,284 B1 * | 8/2005 | Singh et al. | 348/346 |
| 7,463,302 B2 * | 12/2008 | Kobayashi | 348/345 |
| 7,697,834 B1 * | 4/2010 | Tsai | 396/147 |
| 7,769,286 B2 * | 8/2010 | Subbotin | 396/122 |
| 8,125,549 B2 * | 2/2012 | Dekel | 348/294 |
| 8,199,244 B2 | 6/2012 | Baraniuk et al. | |
| 2006/0038705 A1 * | 2/2006 | Brady et al. | 341/13 |
| 2006/0239336 A1 | 10/2006 | Baraniuk et al. | |
| 2008/0219579 A1 * | 9/2008 | Aksyuk et al. | 382/248 |

(Continued)

FOREIGN PATENT DOCUMENTS

CN 202772980 U * 3/2013

OTHER PUBLICATIONS

Duarte et al.; Single-Pixel Imaging via Compressive Sampling; Mar. 2008; IEEE Signal Processing Magazine; pp. 83-91.*

(Continued)

*Primary Examiner* — John Villecco
(74) *Attorney, Agent, or Firm* — Meyertons Hood Kivlin Kowert & Goetzel, P.C.; Jeffrey C. Hood; Mark K. Brightwell

(57) ABSTRACT

A compressive imaging (CI) device including a light modulator and a light sensor (e.g., a single-element sensor or a sensor array). The CI device may support the focusing of light on the light modulator and/or on the light sensor in a number of ways: (1) determining a focus indicator value by analyzing a 1D or 2D image in the incident light field; (2) measuring light spillover between modulator regions and light sensing elements—either at the level of voltage measurements or the level of reconstructed images; (3) measure noise in reconstructed sub-images; (4) measuring an amount high-frequency content in the incident light field; (5) incorporating a range finder to measure distance to the object being imaged; (6) incorporating an image sensor downstream from the modulator; and (7) splitting a portion of the incident light onto an image sensor, prior to the modulator.

44 Claims, 37 Drawing Sheets

(56) References Cited

U.S. PATENT DOCUMENTS

| | | | |
|---|---|---|---|
| 2009/0059062 A1* | 3/2009 | Toguchi | 348/349 |
| 2010/0315513 A1* | 12/2010 | Goodman et al. | 348/187 |
| 2011/0025870 A1* | 2/2011 | Baraniuk et al. | 348/222.1 |
| 2011/0109773 A1* | 5/2011 | Dekel | 348/241 |
| 2012/0038786 A1* | 2/2012 | Kelly et al. | 348/222.1 |
| 2012/0038789 A1 | 2/2012 | Kelly et al. | |
| 2012/0038790 A1* | 2/2012 | Kelly et al. | 348/226.1 |
| 2012/0038805 A1* | 2/2012 | Kelly et al. | 348/300 |
| 2012/0038819 A1 | 2/2012 | McMackin et al. | |
| 2012/0213270 A1* | 8/2012 | Baraniuk et al. | 375/240.01 |
| 2012/0294543 A1* | 11/2012 | Sen et al. | 382/233 |
| 2012/0314099 A1* | 12/2012 | Kelly et al. | 348/222.1 |
| 2013/0002715 A1* | 1/2013 | Tidman et al. | 345/629 |
| 2013/0002968 A1* | 1/2013 | Bridge et al. | 348/744 |
| 2013/0083312 A1* | 4/2013 | Baraniuk et al. | 356/51 |

OTHER PUBLICATIONS

Shih, Loren; "Autofocus survey: A comparison of algorithms," Proceedings of SPIE-IS&T Electronic Imaging, SPIE vol. 6502, 65020B, Feb. 2007; pp. 1-11.

"Autofocus;" Wikipedia, revision as of Jul. 9, 2011, retrieved from <http://en.wikipedia.org/w/index.php?title=Autofocus&oldid=438551743> on Dec. 19, 2012; pp. 1-6.

"Focus variation;" Wikipedia, last modified Jul. 9, 2011, retrieved from <http://en.wikipedia.org/wiki/Focus_variation> on Dec. 19, 2012; pp. 1-2.

Groen et al.; "A Comparison of Different Focus Functions for Use in Autofocus Algorithms;" Cytometry, vol. 6, 1985, accepted Oct. 16, 1984; pp. 81-91.

* cited by examiner

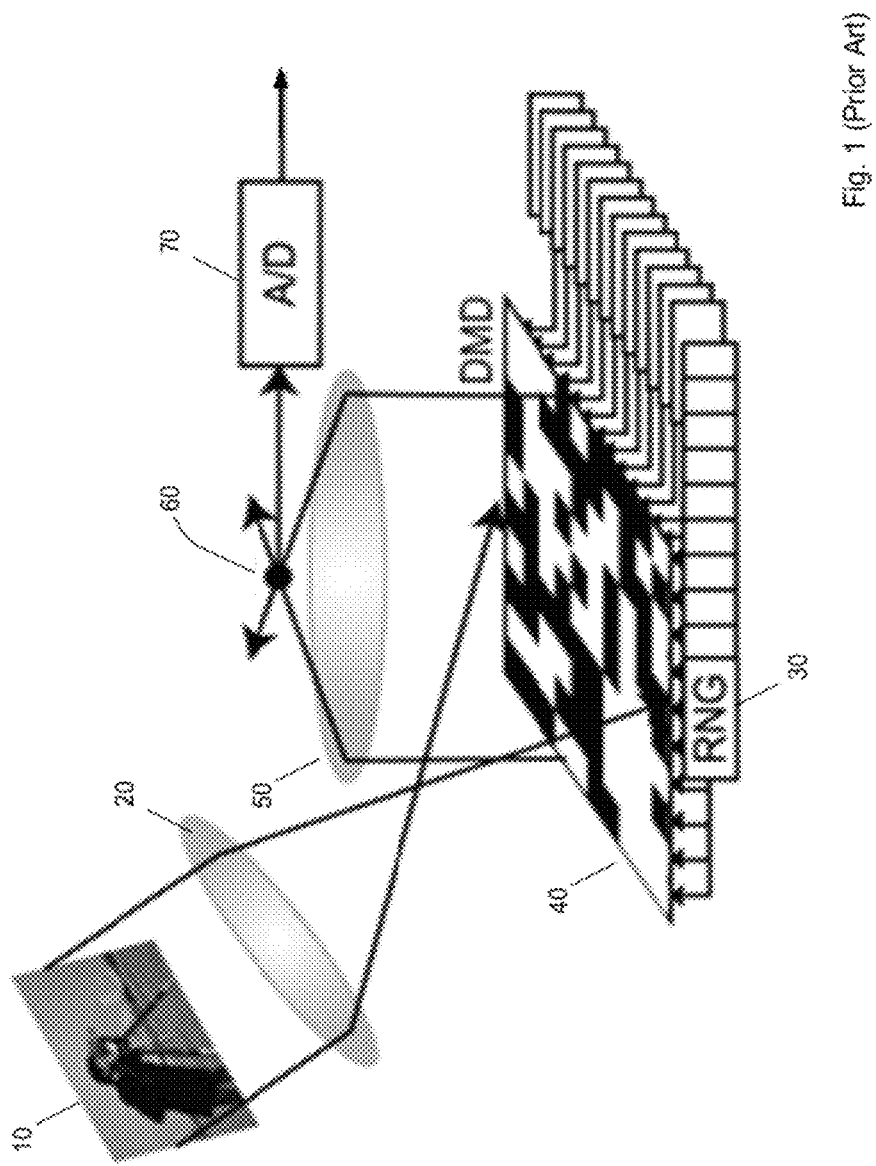

900 supply a sequence of calibration patterns to a light modulation unit of the CI device, where the light modulation unit includes an array of light modulating elements 910 modulate an incident light stream with the sequence of calibration patterns to produce a modulated light stream, where the sequence of calibrations patterns is configured to effect a movement of a region along a one-dimensional path on the light modulation unit, where each of the calibration patterns corresponds a different position of the region along the one-dimensional path 915 a light sensing device of the CI device receives the modulated light stream and acquires a sequence of samples representing an intensity of the modulated light stream as a function of time, where the sequence of samples includes at least one sample for each of the calibration patterns 920 display a one-dimensional image on a display, where the one-dimensional image is based on the sequence of samples 925 adjust a focus setting of the CI device based on user input 930

```
modulate an incident light stream with a sequence of spatial patterns, thereby
generating a modulated light stream, where the action of modulating is performed by
a light modulation unit of the CI device   1210
```

```
generate an electrical signal representing intensity of the modulated light stream as a
function of time, where the electrical signal is generated by a light sensing device of
the CI device 1215
```

```
acquire samples of the electrical signal   1220
```

```
construct an image using the sequence of spatial patterns and a subset of the acquired
samples that corresponds to the sequence of spatial patterns   1225
```

```
compute focus information based on the image, where the focus information
comprises information regarding at extent to which an image carried by the incident
light stream is in focus at the light modulation unit   1230
```

*Fig. 12*

1300 modulate an incident light stream with a sequence of spatial patterns to obtain a modulated light stream, where the modulating action is performed by a light modulation unit of the CI device   1310 generate an electrical signal representing intensity of the modulated light stream as a function of time, wherein the electrical signal is generated by a light sensing device of the CI device 1315 acquire samples of the electrical signal, where the acquired samples include at least one sample for each of the spatial patterns   1320 construct an image using the sequence of spatial patterns and the acquired samples  1325 display the image on a display  1330 change a focus setting of the CI device based on user input  1335

*Fig. 13*

1400 modulate an incident light stream with calibration patterns to obtain a modulated light stream, where the action of modulating is performed by a light modulation unit of the CI device, where the light modulation unit includes an array of light modulating elements  1410 an array of light sensing elements of the CI device receiving the modulated light stream, where the light sensing elements receive respective spatial portions of the modulated light stream and generate respective electrical signals, where each electrical signal represents intensity of the respective spatial portion as a function of time, where the light sensing elements correspond to respective non-overlapping regions within the array of light modulating elements, where each of the calibration patterns specifies that the light modulating elements inside a respective one of the regions are to be set to an OFF state and specifies that at least a subset of the light modulating elements outside the respective region are to be set to an ON state  1415 for each of the calibration patterns, acquire a respective group of samples from the array of light modulating elements, where each of the sample groups includes at least one sample of each of the electrical signals  1420 determine spillover values corresponding respectively to the calibration patterns, where each of the spillover values is determined based on the sample group corresponding to the respective calibration pattern, where each of the spillover values indicates an extent to which modulated light from outside the respective region of the array of light modulating elements reaches the light sensing element corresponding to the respective region  1425 compute a composite spillover value for the array of light sensing elements based on the spillover values  1430

```
┌─────────────────────────────────────────────────────────────┐
│ modulate an incident light stream with a calibration pattern│
│ to obtain a modulated light stream, where the action of     │
│ modulating is performed by a light modulation unit of the CI│
│ device, where the light modulation unit includes an array of│
│ light modulating elements   1510                            │
└─────────────────────────────────────────────────────────────┘
                              │
                              ▼
┌─────────────────────────────────────────────────────────────┐
│ an array of light sensing elements of the CI device receiving│
│ the modulated light stream, where the light sensing elements │
│ receive respective spatial portions of the modulated light   │
│ stream and generate respective electrical signals, where each│
│ electrical signal represents intensity of the respective     │
│ spatial portion as a function of time, where the light       │
│ sensing elements correspond to respective non-overlapping    │
│ regions within the array of light modulating elements, where │
│ the calibration pattern specifies that the light modulating  │
│ elements inside a particular one of the regions are to be set│
│ to an off state and specifies that at least a subset of the  │
│ light modulating elements outside the particular region are  │
│ to be set to an on state, where the particular region        │
│ corresponds to a particular one of the light sensing elements│
│                                                       1515  │
└─────────────────────────────────────────────────────────────┘
                              │
                              ▼
┌─────────────────────────────────────────────────────────────┐
│ acquire samples of the electrical signal generated by the   │
│ particular light sensing element in response to said        │
│ modulating the incident light stream with the calibration   │
│ pattern, where each of the samples indicates an extent to   │
│ which modulated light from outside the particular region of │
│ the array of light modulating elements reaches the          │
│ particular light sensing element   1520                     │
└─────────────────────────────────────────────────────────────┘
```

*Fig. 15*

1640 modulate an incident light stream with a sequence of spatial patterns to obtain a modulated light stream, where the action of modulating is performed by a light modulation unit of the CI device, where the light modulation unit includes an array of light modulating elements, where the light sensing elements correspond to respective non-overlapping regions on the array of light modulating elements
1642

↓ the array of light sensing elements of the CI device receiving the modulated light stream, where the light sensing elements receive respective spatial portions of the modulated light stream and generate respective electrical signals, where each of the electrical signals represents intensity of the respective spatial portion as a function of time    1644

↓ acquire measurements from the array of light sensing elements, where the measurements include sample sets that correspond respectively to the light sensing elements, where each sample set includes samples of the electrical signal generated by the respective light sensing element, with the samples including at least one sample for each of the spatial patterns    1646

↓ compute a focus indicator value based on two or more noise values for two or more respective ones of the light sensing devices, where the focus indicator value indicates an extent to which the modulated light stream is in focus at the sensor array, where each of the two or more noise values is computed by: constructing a respective sub-image based on the sample set of the respective light sensing element and also on a restriction of the spatial patterns to the region of the array of light modulating elements corresponding to the respective light sensing element; and computing an amount of noise present in the respective sub-image    1648

```
modulate an incident light stream with a sequence of spatial patterns to obtain a
modulated light stream, where the action of modulating is performed by a light
modulation unit of the CI device, where the light modulation unit includes an array
of light modulating elements    1662
```
↓
```
an array of light sensing elements of the CI device receiving the modulated light
stream, where the light sensing elements receive respective spatial portions of the
modulated light stream and generate respective electrical signals, where each of the
electrical signals represents intensity of the respective spatial portion as a function of
time, where the light sensing elements correspond to respective non-overlapping
regions on the array of light modulating elements    1664
```
↓
```
acquire measurements from the array of light sensing elements, where the
measurements include sample sets that correspond respectively to the light sensing
elements, where each sample set includes samples of the electrical signal generated
by the respective light sensing element, with the samples including at least one
sample for each of the spatial patterns    1666
```
↓
```
compute a focus indicator value based on two or more spillover values for two or
more respective ones of the light sensing devices, wherein the focus indicator value
indicates an extent to which the modulated light stream is in focus at the sensor
array, wherein each of the two or more spillover values is computed by: constructing
a respective image based on the sample set of the respective light sensing element
and also on the spatial patterns; and summing pixels in the image outside the region
corresponding to the respective light sensing element    1668
```

*Fig. 16B*

1700 supply a sequence of high-frequency spatial patterns to a light modulation unit of the CI device, where the light modulation unit includes an array of light modulating elements, where each of the high-frequency spatial patterns is a spatial pattern whose AC component includes only spatial frequencies greater than or equal to a cutoff frequency   1710

↓ the light modulation unit modulating an incident light stream with the sequence of high-frequency spatial patterns to produce a modulated light stream   1715

↓ a light sensing device of the CI device receiving the modulated light stream and acquiring a sequence of samples representing an intensity of the modulated light stream as a function of time, where the sequence of samples includes at least one sample for each of the high-frequency spatial patterns   1720

↓ compute a focus indicator value based on the sequence of samples, where the focus indicator value indicates an extent to which the incident light stream is in focus at the array of light modulating elements   1725

*Fig. 17*

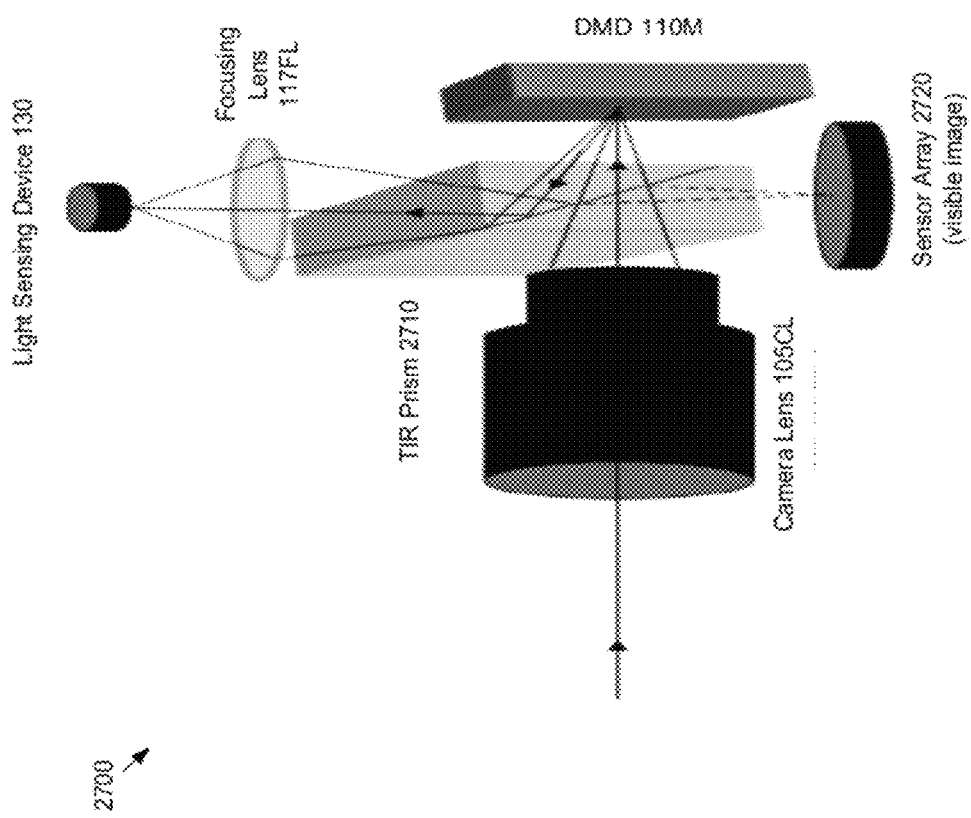

FOCUSING MECHANISMS FOR COMPRESSIVE IMAGING DEVICE

RELATED APPLICATION DATA

This application claims the benefit of priority to U.S. Provisional Application No. 61/372,826, filed on Aug. 11, 2010, entitled "Compressive Sensing Systems and Methods", invented by Richard Baraniuk, Gary Woods, Kevin Kelly, Robert Bridge, Sujoy Chatterjee and Lenore McMackin, which is hereby incorporated by reference in its entirety as though fully and completely set forth herein.

FIELD OF THE INVENTION

The present invention relates to the field of compressive sensing, and more particularly to systems and methods for focusing a compressive imaging device.

DESCRIPTION OF THE RELATED ART

According to Nyquist theory, a signal x(t) whose signal energy is supported on the frequency interval [−B,B] may be reconstructed from samples {x(nT)} of the signal x(t), provided the rate $f_S=1/T_S$ at which the samples are captured is sufficiently high, i.e., provided that $f_s$ is greater than 2B. Similarly, for a signal whose signal energy is supported on the frequency interval [A,B], the signal may be reconstructed from samples captured with sample rate greater than B−A. A fundamental problem with any attempt to capture a signal x(t) according to Nyquist theory is the large number of samples that are generated, especially when B (or B−A) is large. The large number of samples is taxing on memory resources and on the capacity of transmission channels.

Nyquist theory is not limited to functions of time. Indeed, Nyquist theory applies more generally to any function of one or more real variables. For example, Nyquist theory applies to functions of two spatial variables such as images, to functions of time and two spatial variables such as video, and to the functions used in multispectral imaging, hyperspectral imaging, medical imaging and a wide variety of other applications. In the case of an image I(x,y) that depends on spatial variables x and y, the image may be reconstructed from samples of the image, provided the samples are captured with sufficiently high spatial density. For example, given samples {I(nΔx, mΔy)} captured along a rectangular grid, the horizontal and vertical densities 1/Δx and 1/Δy should be respectively greater than $2B_x$ and $2B_y$, where $B_x$ and $B_y$ are the highest x and y spatial frequencies occurring in the image I(x,y). The same problem of overwhelming data volume is experienced when attempting to capture an image according to Nyquist theory. The modern theory of compressive sensing is directed to such problems.

Compressive sensing relies on the observation that many signals (e.g., images or video sequences) of practical interest are not only band-limited but also sparse or approximately sparse when represented using an appropriate choice of transformation, for example, a transformation such as a Fourier transform, a wavelet transform or a discrete cosine transform (DCT). A signal vector v is said to be K-sparse with respect to a given transformation T when the transformation of the signal vector, Tv, has no more than K non-zero coefficients. A signal vector v is said to be sparse with respect to a given transformation T when it is K-sparse with respect to that transformation for some integer K much smaller than the number L of components in the transformation vector Tv.

A signal vector v is said to be approximately K-sparse with respect to a given transformation T when the coefficients of the transformation vector, Tv, are dominated by the K largest coefficients (i.e., largest in the sense of magnitude or absolute value). In other words, if the K largest coefficients account for a high percentage of the energy in the entire set of coefficients, then the signal vector v is approximately K-sparse with respect to transformation T. A signal vector v is said to be approximately sparse with respect to a given transformation T when it is approximately K-sparse with respect to the transformation T for some integer K much less than the number L of components in the transformation vector Tv.

Given a sensing device that captures images with N samples per image and in conformity to the Nyquist condition on spatial rates, it is often the case that there exists some transformation and some integer K very much smaller than N such that the transform of each captured image will be approximately K sparse. The set of K dominant coefficients may vary from one image to the next. Furthermore, the value of K and the selection of the transformation may vary from one context (e.g., imaging application) to the next. Examples of typical transforms that might work in different contexts are the Fourier transform, the wavelet transform, the DCT, the Gabor transform, etc.

Compressive sensing specifies a way of operating on the N samples of an image so as to generate a much smaller set of samples from which the N samples may be reconstructed, given knowledge of the transform under which the image is sparse (or approximately sparse). In particular, compressive sensing invites one to think of the N samples as a vector v in an N-dimensional space and to imagine projecting the vector v onto each vector in a series of M vectors {R(i)} in the N-dimensional space, where M is larger than K but still much smaller than N. Each projection gives a corresponding real number s(i), e.g., according to the expression $$s(i) = <v, R(i)>,$$

where the notation $<v,R(i)>$ represents the inner product (or dot product) of the vector v and the vector R(i). Thus, the series of M projections gives a vector U including M real numbers. Compressive sensing theory further prescribes methods for reconstructing (or estimating) the vector v of N samples from the vector U of M real numbers. For example, according to one method, one should determine the vector x that has the smallest length (in the sense of the $L_1$ norm) subject to the condition that ΦTx=U, where Φ is a matrix whose rows are the transposes of the vectors R(i), where T is the transformation under which the image is K sparse or approximately K sparse.

Compressive sensing is important because, among other reasons, it allows reconstruction of an image based on M measurements instead of the much larger number of measurements N recommended by Nyquist theory. Thus, for example, a compressive sensing camera would be able to capture a significantly larger number of images for a given size of image store, and/or, transmit a significantly larger number of images per unit time through a communication channel of given capacity.

As mentioned above, compressive sensing operates by projecting the image vector v onto a series of M vectors. As discussed in U.S. patent application Ser. No. 11/379,688 (published as 2006/0239336 and invented by Baraniuk et al.) and illustrated in FIG. 1, an imaging device (e.g., camera) may be configured to take advantage of the compressive sensing paradigm by using a digital micromirror device (DMD) 40. An incident lightfield 10 passes through a lens 20 and then interacts with the DMD 40. The DMD includes a two-dimensional array of micromirrors, each of which is configured to independently and controllably switch between two orientation states. Each micromirror reflects a corresponding portion of the incident light field based on its instantaneous orientation. Any micromirrors in a first of the two orientation states will reflect their corresponding light portions so that they pass through lens 50. Any micromirrors in a second of the two orientation states will reflect their corresponding light portions away from lens 50. Lens 50 serves to concentrate the light portions from the micromirrors in the first orientation state onto a photodiode (or photodetector) situated at location 60. Thus, the photodiode generates a signal whose amplitude at any given time represents a sum of the intensities of the light portions from the micromirrors in the first orientation state.

The compressive sensing is implemented by driving the orientations of the micromirrors through a series of spatial patterns. Each spatial pattern specifies an orientation state for each of the micromirrors. The output signal of the photodiode is digitized by an A/D converter 70. In this fashion, the imaging device is able to capture a series of measurements {s(i)} that represent inner products (dot products) between the incident light field and the series of spatial patterns without first acquiring the incident light field as a pixelized digital image. The incident light field corresponds to the vector v of the discussion above, and the spatial patterns correspond to the vectors R(i) of the discussion above. The measurements {s(i)} are used to algorithmically construct an image representing the incident light field.

The incident light field may be modeled by a function I(x,y,t) of two spatial variables and time. Assuming for the sake of discussion that the DMD comprises a rectangular array. The DMD implements a spatial modulation of the incident light field so that the light field leaving the DMD in the direction of the lens 50 might be modeled by $$\{I(n\Delta x, m\Delta y, t)*M(n,m,t)\}$$

where m and n are integer indices, where $I(n\Delta x, m\Delta y, t)$ represents the portion of the light field that is incident upon that $(n,m)^{th}$ mirror of the DMD at time t. The function $M(n,m,t)$ represents the orientation of the $(n,m)^{th}$ mirror of the DMD at time t. At sampling times, the function $M(n,m,t)$ equals one or zero, depending on the state of the digital control signal that controls the $(n,m)^{th}$ mirror. The condition $M(n,m,t)=1$ corresponds to the orientation state that reflects onto the path that leads to the lens 50. The condition $M(n,m,t)=0$ corresponds to the orientation state that reflects away from the lens 50.

The lens 50 concentrates the spatially-modulated light field $$\{I(n\Delta x, m\Delta y, t)*M(n,m,t)\}$$

onto a light sensitive surface of the photodiode. Thus, the lens and the photodiode together implement a spatial summation of the light portions in the spatially-modulated light field:

$$S(t) = \sum_{n,m} I(n\Delta x, m\Delta y, t) M(n, m, t).$$

Signal S(t) may be interpreted as the intensity at time t of the concentrated spot of light impinging upon the light sensing surface of the photodiode. The A/D converter captures measurements of S(t). In this fashion, the compressive sensing camera optically computes an inner product of the incident light field with each spatial pattern imposed on the mirrors. The multiplication portion of the inner product is implemented by the mirrors of the DMD. The summation portion of the inner product is implemented by the concentrating action of the lens and also the integrating action of the photodiode.

In a compressive imaging (CI) device such as described above, the incident light field needs to be properly focused on the DMD or the quality of image reconstruction will suffer.

SUMMARY

A compressive imaging (CI) device includes a light modulator and a light sensing device. The light modulator modulates an incident light stream with a sequence of spatial patterns to obtain a modulated light stream. (The light modulator comprises an array of light modulating elements.) The light sensing device receives the modulated light stream and generates samples that represent intensity of the modulated light stream as a function of time. The samples may be used to reconstruct an image (or a sequence of images) representing the incident light stream.

The CI device may include an input optical subsystem (e.g., camera lens) situated in front of the light modulator to focus the incident light stream onto the modulator. For quality image reconstruction, the image carried by the incident light stream should be in focus at the light modulator. This means properly adjusting the focus setting of the input optical subsystem and/or properly setting the optical distance between the input optical subsystem and the light modulator. In some embodiments, the light modulator may be translatable, e.g., mounted on a translation stage, which may be manually and/or electronically controllable.

The CI device may also include post-modulation optics to concentrate or focus or direct the modulated light stream onto the light sensing device. In some embodiments, the light sensing device includes (or is) an array of light sensing elements, in which case the post-modulation optics may be used to focus the modulated light stream onto the light sensing array. The light sensing elements are supposed to receive modulated light from respective non-overlapping regions of the light modulator. When the light sensing array is properly positioned or oriented with respect to the modulated light stream and/or the post-modulation optics, light is cleanly delivered from the regions onto their respective light sensing elements. However, when the light sensing array is not properly positioned or oriented with respect to the modulated light stream and/or the post-modulation optics, light from the arbitrary region will spill over (cross over) to light sensing elements other than the respective lights sensing element. In other words, the arbitrary light sensing element will receive light from regions other than the respective region. The spill over is large when the light sensing array is far from its optimal position or orientation. Conversely, when the light sensing array is properly positioned and oriented, the spillover is small. Spillover adversely effects image reconstruction quality, and thus, is a thing to be minimized. Thus, the sensor array may be translatable and/or rotatable, e.g., may be mounted on a translation stage, a rotation stage or a combined translation-rotation stage, which may be manually and/or electronically controllable.

This disclosure discusses a number of ways to achieve proper focus of the image onto the modulator and/or to achieve proper focus of the modulated light stream onto the light sensing array.

In one method, the sequence of spatial patterns is configured to effect the movement of a region along a 1D path on the field of the light modulator. Thus, the corresponding samples from the light sensing device represent a one-dimensional image. The 1D image may be analyzed using any of a variety of techniques to derive a value indicating the extent to which the incident light is in focus at the modulator. The focus setting of the input optical subsystem and/or position of the light modulator may be translated until the focus indicator is optimized. (This method may be practiced even when the light sensing device includes an array of light sensing elements, by summing the samples from the elements to obtain one sum value per spatial pattern. The 1D image is then based on the sequence of sum values.) Alternatively, the 1D image may be displayed, allowing a user to control adjustments to focus based on perceived quality of the 1D image.

In another method, the sequence of spatial patterns may be configured to support the reconstruction of images. Groups of the samples are used to reconstruct corresponding images. The images may be analyzed to determine a focus indicator value for each image (or for selected ones of the images). Again, the focus-determining parameters of the CI device may be adjusted until the 2D focus metric is optimized. Alternatively, the reconstructed image may be displayed, allowing the user to control adjustments to focus based on perceived quality of the 1D image.

In another method, the sequence of spatial patterns may be configured to include a number of patterns with high spatial frequencies. The corresponding samples may then be used to measure the extent to which the image, as a pattern of light on the modulator, has high spatial frequencies. The presence of high spatial frequencies is an indicator of being in focus.

In another method, the CI device includes a range finder that determines a range to the object being imaged, e.g., by transmitting a light signal and receiving the signal reflected by the object. In embodiments that use a digital micromirror device as the light modulator, the range finder may be configured to transmit and receive via mirrors in the off state, while the light sensing device captures modulated light via mirrors in the on state. The range determined by the range finder may be used to set to focus-determining parameters of the CI device.

In another method, the samples acquired by a particular one of light sensing elements may be used to algorithmically reconstruct an image covering the whole extent of the light modulator. Because the particular light sensing element receives light from its respective region and also spillover light from other regions, the reconstructed image includes image information in the respective region and also in the other regions (especially adjacent regions). The sum of the image pixel values in the other regions (or adjacent regions) may be used as a measure of spillover. The spillover estimation process may be performed for two or more of the light sensing elements to determine a composite spillover value for the light sensing array. The position and/or orientation of the light sensing array may be adjusted until spillover (or composite spillover) is minimized.

In another method, the samples acquired by a particular one of the light sensing elements may be used to algorithmically reconstruct a sub-image representing only the region of the light modulator belonging to the particular light sensing element. In the reconstruction process, the domain of the spatial patterns is restricted to that region. Thus, portions of modulated light that spilled over from the other regions to the particular light sensing device have no way of being algorithmically mapped to their correct spatial locations. The spillover thus expresses itself in the reconstructed sub-image as noise. Therefore, spillover may be estimate by measuring the amount of noise present in the sub-image. This spillover estimation process may be performed for two or more of the light sensing elements, to determine corresponding spillover values, which may be averaged or maximized to determine a composite spillover value. The spillover value(s) or the composite spillover value may be used to drive adjustments to the position and/or orientation of the light sensing array.

In another method, a spatial pattern may be asserted on the light modulator, where the spatial patterns is configured to turn off light modulating elements for the region corresponding a particular one of the light sensing elements, but to turn on at least a subset of the light modulating elements in the other regions. Thus, the modulated light arriving at the particular light sensing element represents spillover light from the other regions. The sample (voltage reading) from the particular light sensing element may be used as an indicator a spillover. This spillover estimation process may be performed for two or more of the light sensing elements, using two or more respective spatial patterns, to obtain corresponding spillover values. The spillover values may be combined to determined a composite spillover value. The spillover value(s) or the composite spillover value may be used to drive adjustments to the position and/or orientation of the light sensing array.

In another method, the light modulator includes an array of mirrors. Portions of the incident light stream that are reflected by on-state mirrors are detected the light sensing device and used to perform compressive image acquisition. Portions of the incident light stream that are reflected by on-state mirrors are detected by an image sensor. The images captured by the image sensor may be analyzed by determine focus indicator values. The position of the image sensor may be adjusted until the focus indicator value is optimized, indicating proper focus for modulated light on the image sensor. (Alternatively, the captured images may be displayed on a display screen. The user may then control adjustments to the position of the image sensor, to achieve optimal focus as viewed on the display.) That optimizing position may be used to determine an optimal position or translation for the light sensing device. The functional relationship between optimal positions of the image sensor and optimal positions of the light sensing device may be known from calibration, the results of which are stored in memory.

In another embodiment, the incident light stream is split (or separated) into two streams prior to the light modulator. The first stream is provided to the light modulator; the second stream is provided to an image sensor. The images captured by the image sensor may be analyzed to determine focus indicator values. The position of the image sensor and/or the focus setting of the input optical subsystem may be adjusted until the focus indicator value is optimized, indicating proper focus for light on the image sensor. (Alternatively, the captured images may be displayed on a display screen. The user may then make or specify adjustments to the position of the image sensor and/or to the focus setting of the input optical subsystem, to achieve optimal focus as viewed on the display.) The optimizing position of the image sensor may be used to determine an optimal position or translation for the light sensing device. The functional relationship between optimal positions of the image sensor and optimal positions of the light sensing device may be known from calibration. Similarly, the optimizing focus setting of the input optical subsystem may be used to determine an optimal position or translation for the light sensing device. Again, the functional relationship between optimal focus settings of the input optical subsystem and optimal positions of the light sensing device may be known from calibration.

Various additional embodiments are described in U.S. Provisional Application No. 61/372,826, which is hereby incorporated by reference in its entirety as though fully and completely set forth herein.

BRIEF DESCRIPTION OF THE DRAWINGS

A better understanding of the present invention can be obtained when the following detailed description of the preferred embodiments is considered in conjunction with the following drawings.

FIG. 1 illustrates a compressive sensing camera according to the prior art.

FIG. 2I illustrates an embodiment of a system that uses four light sensing devices to measure light from four respective quadrants of the light modulation unit 110. The measurements from each light sensing device are used to construct a corresponding sub-image.

FIG. 9 illustrates an embodiment of a method 900 that involves displaying a one-dimensional image, where the image is based on the samples acquired from the light sensing device.

FIG. 12 illustrates an embodiment of a method 1200, also involving algorithmic construction of an image.

FIG. 13 illustrates an embodiment of a method 1300, involving the display of an algorithmically constructed image.

FIG. 14A illustrates an embodiment of a method 1400 for estimating light spillover values based on samples acquired from a light sensing array.

FIG. 15 illustrates an embodiment of a method 1500 for estimating light spillover using a single light sensing element in an array of light sensing elements.

FIG. 16A illustrates an embodiment of a method 1640 for computing a focus indicator based on the amount of noise present in algorithmically constructed sub-images.

FIG. 16B illustrates an embodiment of a method 1660 for computing a focus indicator based on the amount of spillover present in algorithmically constructed images.

FIG. 17 illustrates an embodiment of a method 1700 for computing a focus indicator based on the presentation of high-frequency spatial patterns of the light modulation unit.

FIG. 27D illustrates an embodiment where the TIR prism pair includes a dielectric coating at an interface of the first prism.

Figure 2A:
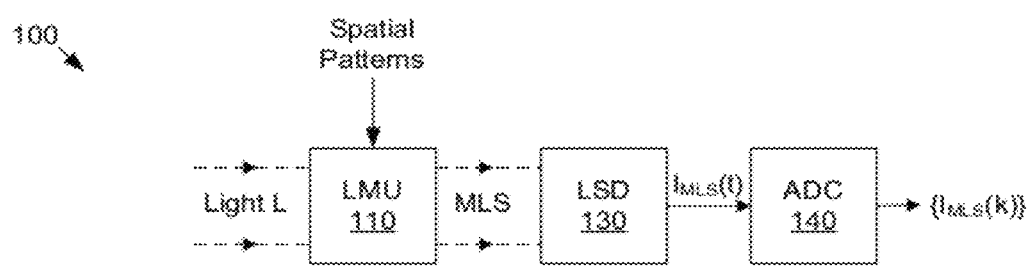
FIG. 2A illustrates one embodiment of a system 100 that is operable to capture compressive imaging samples and also samples of background light level. (LMU is an acronym for "light modulation unit". MLS is an acronym for "modulated light stream". LSD is an acronym for "light sensing device".)

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The following patent applications provide teachings regarding compressive imaging, and each of them is hereby incorporated by reference in its entirety as though fully and completely set forth herein U.S. Provisional Application No. 61/372,826, filed on Aug. 11, 2010, entitled "Compressive Sensing Systems and Methods", invented by Richard Baraniuk, Gary Woods, Kevin Kelly, Robert Bridge, Sujoy Chatterjee and Lenore McMackin.

U.S. application Ser. No. 13/193,553, filed on Jul. 28, 2011, entitled "Determining Light Level Variation in Compressive Imaging by Injecting Calibration Patterns into Pattern Sequence", invented by Richard Baraniuk, Kevin Kelly, Robert Bridge, Sujoy Chatterjee and Lenore McMackin.

U.S. application Ser. No. 13/193,556, filed on Jul. 28, 2011, entitled "Low-Pass Filtering of Compressive Imaging Measurements to Infer Light Level Variation", invented by Richard Baraniuk, Kevin Kelly, Robert Bridge, Sujoy Chatterjee and Lenore McMackin.

U.S. application Ser. No. 13/197,304, filed on Aug. 3, 2011, entitled "Decreasing Image Acquisition Time for Compressive Imaging Devices", invented by Woods et al.

U.S. application Ser. No. 13/207,276, filed on Aug. 10, 2011, entitled "Dynamic Range Optimization and Hot Spot Correction in a Compressive Imaging System", invented by Gary Woods and James Tidman.

U.S. application Ser. No. 13/207,258, filed on Aug. 10, 2011, entitled "Techniques for Removing Noise in a Compressive Imaging Device", invented by Woods et al.

U.S. application Ser. No. 13/207,900, filed on Aug. 11, 2011, entitled "TIR Prism to Separate Incident Light and Modulated Light in Compressive Imaging Device", invented by Lenore McMackin and Sujoy Chatterjee.

Terminology

A memory medium is a non-transitory medium configured for the storage and retrieval of information. Examples of memory media include: various kinds of semiconductor-based memory such as RAM and ROM; various kinds of magnetic media such as magnetic disk, tape, strip and film; various kinds of optical media such as CD-ROM and DVD-ROM; various media based on the storage of electrical charge and/or any of a wide variety of other physical quantities; media fabricated using various lithographic techniques; etc. The term "memory medium" includes within its scope of meaning the possibility that a given memory medium might be a union of two or more memory media that reside at different locations, e.g., on different chips in a system or on different computers in a network. A memory medium is typically computer-readable, e.g., is capable of being read by a computer.

A computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

A computer system is any device (or combination of devices) having at least one processor that is configured to execute program instructions stored on a memory medium. Examples of computer systems include personal computers (PCs), workstations, laptop computers, tablet computers, mainframe computers, server computers, client computers, network or Internet appliances, hand-held devices, mobile devices, personal digital assistants (PDAs), computer-based television systems, grid computing systems, wearable computers, computers implanted in living organisms, computers embedded in head-mounted displays, computers embedded in sensors forming a distributed network, etc.

A programmable hardware element (PHE) is a hardware device that includes multiple programmable function blocks connected via a system of programmable interconnects. Examples of PHEs include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores).

As used herein, the term "light" is meant to encompass within its scope of meaning any electromagnetic radiation whose spectrum lies within the wavelength range $[\lambda_L, \lambda_U]$, where the wavelength range includes the visible spectrum, the ultra-violet (UV) spectrum, infrared (IR) spectrum and the terahertz (THz) spectrum. Thus, for example, visible radiation, or UV radiation, or IR radiation, or THz radiation, or any combination thereof is "light" as used herein.

In some embodiments, a computer system may be configured to include a processor (or a set of processors) and a memory medium, where the memory medium stores program instructions, where the processor is configured to read and execute the program instructions stored in the memory medium, where the program instructions are executable by the processor to implement a method, e.g., any of the various method embodiments described herein, or, any combination of the method embodiments described herein, or, any subset of any of the method embodiments described herein, or, any combination of such subsets.

System 100 for Operating on Light

A system 100 for operating on light may be configured as shown in FIG. 2A. The system 100 may include a light modulation unit 110, a light sensing device 130 and an analog-to-digital converter (ADC) 140.

The light modulation unit 110 is configured to modulate a received stream of light L with a series of spatial patterns in order to produce a modulated light stream (MLS). The spatial patterns of the series may be applied sequentially to the light stream so that successive time slices of the light stream are modulated, respectively, with successive ones of the spatial patterns. (The action of sequentially modulating the light stream L with the spatial patterns imposes the structure of time slices on the light stream.) The light modulation unit 110 includes a plurality of light modulating elements configured to modulate corresponding portions of the light stream. Each of the spatial patterns specifies an amount (or extent or value) of modulation for each of the light modulating elements. Mathematically, one might think of the light modulation unit's action of applying a given spatial pattern as performing an element-wise multiplication of a light field vector $(x_{ij})$ representing a time slice of the light stream L by a vector of scalar modulation values $(m_{ij})$ to obtain a time slice of the modulated light stream: $(m_{ij})*(x_{ij})=(m_{ij}*x_{ij})$. The vector $(m_{ij})$ is specified by the spatial pattern. Each light modulating element effectively scales (multiplies) the intensity of its corresponding stream portion by the corresponding scalar factor.

The light modulation unit 110 may be realized in various ways. In some embodiments, the LMU 110 may be realized by a plurality of mirrors (e.g., micromirrors) whose orientations are independently controllable. In another set of embodiments, the LMU 110 may be realized by an array of elements whose transmittances are independently controllable, e.g., as with an array of LCD shutters. An electrical control signal supplied to each element controls the extent to which light is able to transmit through the element. In yet another set of embodiments, the LMU 110 may be realized by an array of independently-controllable mechanical shutters (e.g., micromechanical shutters) that cover an array of apertures, with the shutters opening and closing in response to electrical control signals, thereby controlling the flow of light through the corresponding apertures. In yet another set of embodiments, the LMU 110 may be realized by a perforated mechanical plate, with the entire plate moving in response to electrical control signals, thereby controlling the flow of light through the corresponding perforations. In yet another set of embodiments, the LMU 110 may be realized by an array of transceiver elements, where each element receives and then retransmits light in a controllable fashion. In yet another set of embodiments, the LMU 110 may be realized by a grating light valve (GLV) device. In yet another embodiment, the LMU 110 may be realized by a liquid-crystal-on-silicon (LCOS) device.

In some embodiments, the light modulating elements are arranged in an array, e.g., a two-dimensional array or a one-dimensional array. Any of various array geometries are contemplated. For example, in some embodiments, the array is a square array or rectangular array. In another embodiment, the array is hexagonal. In some embodiments, the light modulating elements are arranged in a spatially random fashion.

Let N denote the number of light modulating elements in the light modulation unit 110. In various embodiments, the number N may take a wide variety of values. For example, in different sets of embodiments, N may be, respectively, in the range [64, 256], in the range [256, 1024], in the range [1024, 4096], in the range $[2^{12}, 2^{14}]$, in the range $[2^{14}, 2^{16}]$, in the range $[2^{16}, 2^{18}]$, in the range $[2^{18}, 2^{20}]$, in the range $[2^{20}, 2^{22}]$, in the range $[2^{22}, 2^{24}]$, in the range $[2^{24}, 2^{26}]$, in the range from $2^{26}$ to infinity. The particular value used in any given embodiment may depend on one or more factors specific to the embodiment.

The light sensing device 130 is configured to receive the modulated light stream MLS and to generate an analog electrical signal $I_{MLS}(t)$ representing intensity of the modulated light stream as a function of time.

The light sensing device 130 may include one or more light sensing elements. The term "light sensing element" may be interpreted as meaning "a transducer between a light signal and an electrical signal". For example, a photodiode is a light sensing element. In various other embodiments, light sensing elements might include devices such as metal-semiconductor-metal (MSM) photodetectors, phototransistors, phototubes and photomultiplier tubes.

In some embodiments, the light sensing device 130 includes one or more amplifiers (e.g., transimpedance amplifiers) to amplify the analog electrical signals generated by the one or more light sensing elements.

The ADC 140 acquires a sequence of samples $\{I_{MLS}(k)\}$ of the analog electrical signal $I_{MLS}(t)$. Each of the samples may be interpreted as an inner product between a corresponding time slice of the light stream L and a corresponding one of the spatial patterns. The set of samples $\{I_{MLS}(k)\}$ comprises an encoded representation, e.g., a compressed representation, of an image (or a video sequence) and may be used to construct the image (or video sequence) based on any construction algorithm known in the field of compressive sensing. (For video sequence construction, the samples may be partitioned into contiguous subsets, and then the subsets may be processed to construct corresponding images.)

In some embodiments, the samples $\{I_{MLS}(k)\}$ may be used for some purpose other than, or in addition to, image (or video) construction. For example, system 100 (or some other system) may operate on the compensated samples to perform an inference task, such as detecting the presence of a signal or object, identifying a signal or an object, classifying a signal or an object, estimating one or more parameters relating to a signal or an object, tracking a signal or an object, etc. In some embodiments, an object under observation by system 100 may be identified or classified by virtue of its sample set $\{I_{MLS}(k)\}$, or parameters derived from that sample set, being similar to one of a collection of stored sample sets (or parameter sets).

In some embodiments, the light sensing device 130 includes exactly one light sensing element. (For example, the single light sensing element may be a photodiode.) The light sensing element may couple to an amplifier (e.g., a TIA) (e.g., a multi-stage amplifier).

In some embodiments, the light sensing device 130 may include a plurality of light sensing elements (e.g., photodiodes). Each light sensing element may convert light impinging on its light sensing surface into a corresponding analog electrical signal representing intensity of the impinging light as a function of time. In some embodiments, each light sensing element may couple to a corresponding amplifier so that the analog electrical signal produced by the light sensing element can be amplified prior to digitization. System 100 may be configured so that each light sensing element receives, e.g., a corresponding spatial portion (or spectral portion) of the modulated light stream.

In one embodiment, the analog electrical signals produced, respectively, by the light sensing elements may be summed to obtain a sum signal. The sum signal may then be digitized by the ADC 140 to obtain the sequence of samples $\{I_{MLS}(k)\}$. In another embodiment, the analog electrical signals may be individually digitized, each with its own ADC, to obtain corresponding sample sequences. The sample sequences may then be added to obtain the sequence $\{I_{MLS}(k)\}$. In another embodiment, the analog electrical signals produced by the light sensing elements may be sampled by a smaller number of ADCs than light sensing elements through the use of time multiplexing. For example, in one embodiment, system 100 may be configured to sample two or more of the analog electrical signals by switching the input of an ADC among the outputs of the two or more corresponding light sensing elements at a sufficiently high rate.

In some embodiments, the light sensing device 130 may include an array of light sensing elements. Arrays of any of a wide variety of sizes, configurations and material technologies are contemplated. In one embodiment, the light sensing device 130 includes a focal plane array coupled to a readout integrated circuit. In one embodiment, the light sensing device 130 may include an array of cells, where each cell includes a corresponding light sensing element and is configured to integrate and hold photo-induced charge created by the light sensing element, and to convert the integrated charge into a corresponding cell voltage. The light sensing device may also include (or couple to) circuitry configured to sample the cell voltages using one or more ADCs.

In some embodiments, the light sensing device 130 may include a plurality (or array) of light sensing elements, where each light sensing element is configured to receive a corresponding spatial portion of the modulated light stream, and each spatial portion of the modulated light stream comes from a corresponding sub-region of the array of light modulating elements. (For example, the light sensing device 130 may include a quadrant photodiode, where each quadrant of the photodiode is configured to receive modulated light from a corresponding quadrant of the array of light modulating elements. As another example, the light sensing element 130 may include a bi-cell photodiode.) Each light sensing element generates a corresponding signal representing intensity of the corresponding spatial portion as a function of time. Each signal may be digitized (e.g., by a corresponding ADC) to obtain a corresponding sequence of samples. Each sequence of samples may be processed to recover a corresponding sub-image. The sub-images may be joined together to form a whole image.

In some embodiments, the light sensing device 130 includes a small number of light sensing elements (e.g., in respective embodiments, one, two, less than 8, less than 16, less the 32, less than 64, less than 128, less than 256). Because the light sensing device of these embodiments includes a small number of light sensing elements (e.g., far less than the typical modern CCD-based or CMOS-based camera), an entity configuring any of these embodiments may afford to spend more per light sensing element to realize features that are beyond the capabilities of modern array-based image sensors of large pixel count, e.g., features such as higher sensitivity, extended range of sensitivity, new range(s) of sensitivity, extended dynamic range, higher bandwidth/lower response time. Furthermore, because the light sensing device includes a small number of light sensing elements, an entity configuring any of these embodiments may use newer light sensing technologies (e.g., based on new materials or combinations of materials) that are not yet mature enough to be manufactured into focal plane arrays (FPA) with large pixel count. For example, new detector materials such as super-lattices, quantum dots, carbon nanotubes and graphene can significantly enhance the performance of IR detectors by reducing detector noise, increasing sensitivity, and/or decreasing detector cooling requirements.

In one embodiment, the light sensing device 130 is a thermo-electrically cooled InGaAs detector. (InGaAs stands for "Indium Gallium Arsenide".) In other embodiments, the InGaAs detector may be cooled by other mechanisms (e.g., liquid nitrogen or a Sterling engine). In yet other embodiments, the InGaAs detector may operate without cooling. In yet other embodiments, different detector materials may be used, e.g., materials such as MCT (mercury-cadmium-telluride), InSb (Indium Antimonide) and VOx (Vanadium Oxide).

In different embodiments, the light sensing device 130 may be sensitive to light at different wavelengths or wavelength ranges. In some embodiments, the light sensing device 130 may be sensitive to light over a broad range of wavelengths, e.g., over the entire visible spectrum or over the entire range $[\lambda_L, \lambda X_U]$ as defined above.

In some embodiments, the light sensing device 130 may include one or more dual-sandwich photodetectors. A dual sandwich photodetector includes two photodiodes stacked (or layered) one on top of the other.

In one embodiment, the light sensing device 130 may include one or more avalanche photodiodes.

In some embodiments, a filter may be placed in front of the light sensing device 130 to restrict the modulated light stream to a specific range of wavelengths or polarization. Thus, the signal $I_{MLS}(t)$ generated by the light sensing device 130 may be representative of the intensity of the restricted light stream. For example, by using a filter that passes only IR light, the light sensing device may be effectively converted into an IR detector. The sample principle may be applied to effectively convert the light sensing device into a detector for red or blue or green or UV or any desired wavelength band, or, a detector for light of a certain polarization.

In some embodiments, system 100 includes a color wheel whose rotation is synchronized with the application of the spatial patterns to the light modulation unit. As it rotates, the color wheel cyclically applies a number of optical bandpass filters to the modulated light stream MLS. Each bandpass filter restricts the modulated light stream to a corresponding sub-band of wavelengths. Thus, the samples captured by the ADC 140 will include samples of intensity in each of the sub-bands. The samples may be de-multiplexed to form separate sub-band sequences. Each sub-band sequence may be processed to generate a corresponding sub-band image. (As an example, the color wheel may include a red-pass filter, a green-pass filter and a blue-pass filter to support color imaging.)

In some embodiments, the system 100 may include a memory (or a set of memories of one or more kinds).

Figure 2B:
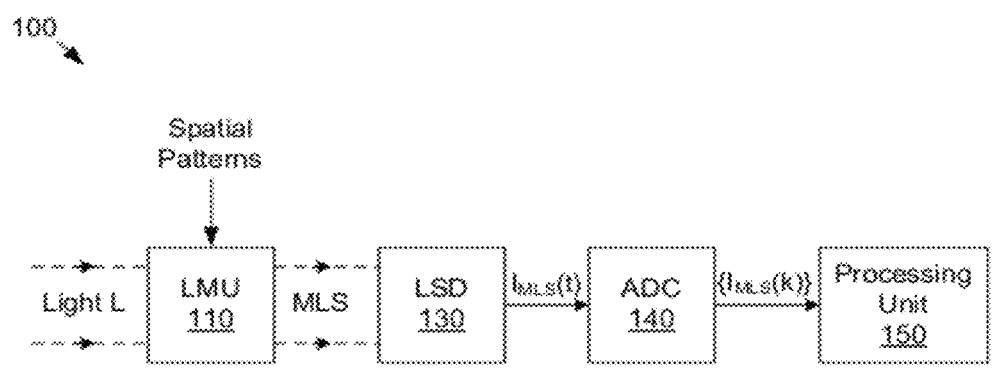
FIG. 2B illustrates an embodiment of system 100 that includes a processing unit 150.

In some embodiments, system 100 may include a processing unit 150, e.g., as shown in FIG. 2B. The processing unit 150 may be a digital circuit or a combination of digital circuits. For example, the processing unit may be a microprocessor (or system of interconnected of microprocessors), a programmable hardware element such as a field-programmable gate array (FPGA), an application specific integrated circuit (ASIC), or any combination such elements. The processing unit 150 may be configured to perform one or more functions such as image/video construction, system control, user interface, statistical analysis, and one or more inferences tasks. In some embodiments, any subset of the various computational operations described herein may be performed by processing unit 150.

The system 100 (e.g., the processing unit 150) may store the samples $\{I_{MLS}(k)\}$ in a memory, e.g., a memory resident in the system 100 or in some other system.

In one embodiment, processing unit 150 is configured to operate on the samples $\{I_{MLS}(k)\}$ to generate the image or video sequence. In this embodiment, the processing unit 150 may include a microprocessor configured to execute software (i.e., program instructions), especially software for performing an image/video construction algorithm. In one embodiment, system 100 is configured to transmit the compensated samples to some other system through a communication channel. (In embodiments where the spatial patterns are randomly-generated, system 100 may also transmit the random seed(s) used to generate the spatial patterns.) That other system may operate on the samples to construct the image/video. System 100 may have one or more interfaces configured for sending (and perhaps also receiving) data through one or more communication channels, e.g., channels such as wireless channels, wired channels, fiber optic channels, acoustic channels, laser-based channels, etc.

In some embodiments, processing unit 150 is configured to use any of a variety of algorithms and/or any of a variety of transformations to perform image/video construction. System 100 may allow a user to choose a desired algorithm and/or a desired transformation for performing the image/video construction.

In some embodiments, the system 100 is configured to acquire a set $Z_M$ of samples from the ADC 140 so that the sample set $Z_M$ corresponds to M of the spatial patterns applied to the light modulation unit 110, where M is a positive integer. The number M is selected so that the sample set $Z_M$ is useable to construct an n-pixel image or n-voxel video sequence that represents the incident light stream, where n is a positive integer less than or equal to the number N of light modulating elements in the light modulation unit 110. System 100 may be configured so that the number M is smaller than n. Thus, system 100 may operate as a compressive sensing device. (The number of "voxels" in a video sequence is the number of images in the video sequence times the number of pixels per image, or equivalently, the sum of the pixel counts of the images in the video sequence.)

In various embodiments, the compression ratio M/n may take any of a wide variety of values. For example, in different sets of embodiments, M/n may be, respectively, in the range [0.9,0.8], in the range [0.8,0.7], in the range [0.7,0.6], in the range [0.6,0.5], in the range [0.5,0.4], in the range [0.4,0.3], in the range [0.3,0.2], in the range [0.2,0.1], in the range [0.1, 0.05], in the range [0.05,0.01], in the range [0.001,0.01].

As noted above, the image constructed from the sample subset $Z_M$ may be an n-pixel image with n≤N. The spatial patterns may be designed to support a value of n less than N, e.g., by forcing the array of light modulating elements to operate at a lower effective resolution than the physical resolution N. For example, the spatial patterns may be designed to force each 2×2 cell of light modulating elements to act in unison. At any given time, the modulation state of the four elements in a 2×2 cell will agree. Thus, the effective resolution of the array of light modulating elements is reduced to N/4. This principle generalizes to any cell size, to cells of any shape, and to collections of cells with non-uniform cell size and/or cell shape. For example, a collection of cells of size $k_H \times k_v$, where $k_H$ and $k_v$ are positive integers, would give an effective resolution equal to $N/(k_H k_v)$. In one alternative embodiment, cells near the center of the array may have smaller sizes than cells near the periphery of the array.

Another way the spatial patterns may be arranged to support the construction of an n-pixel image with n less than N is to allow the spatial patterns to vary only within a subset of the array of light modulating elements. In this mode of operation, the spatial patterns are null (take the value zero) outside the subset. (Control unit 120 may be configured to implement this restriction of the spatial patterns.) Thus, light modulating elements corresponding to positions outside of the subset do not send any light (or send only the minimum amount of light attainable) to the light sensing device. Thus, the constructed image is restricted to the subset. In some embodiments, each spatial pattern (e.g., of a measurement pattern sequence) may be multiplied element-wise by a binary mask that takes the one value only in the allowed subset, and the resulting product pattern may be supplied to the light modulation unit. In some embodiments, the subset is a contiguous region of the array of light modulating elements, e.g., a rectangle or a circular disk or a hexagon. In some embodiments, the size and/or position of the region may vary (e.g., dynamically). The position of the region may vary in order to track a moving object. The size of the region may vary to dynamically control the rate of image acquisition.

In one embodiment, system 100 may include a light transmitter configured to generate a light beam (e.g., a laser beam), to modulate the light beam with a data signal and to transmit the modulated light beam into space or onto an optical fiber. System 100 may also include a light receiver configured to receive a modulated light beam from space or from an optical fiber, and to recover a data stream from the received modulated light beam.

In one embodiment, system 100 may be configured as a low-cost sensor system having minimal processing resources, e.g., processing resources insufficient to perform image (or video) construction in user-acceptable time. In this embodiment, the system 100 may store and/or transmit the samples $\{I_{MLS}(k)\}$ so that another agent, more plentifully endowed with processing resources, may perform the image/video construction based on the samples.

Figure 2C:
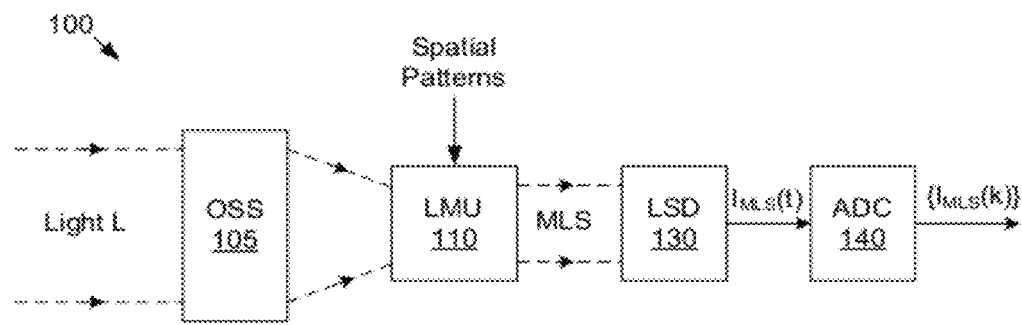
FIG. 2C illustrates an embodiment of system 100 that includes an optical subsystem 105 to focus received light L onto the light modulation unit 110.
Figure 2D:
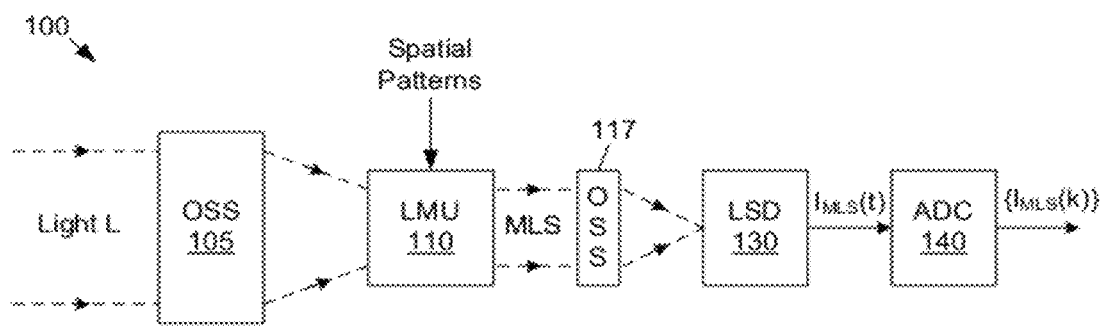
FIG. 2D illustrates an embodiment of system 100 that includes an optical subsystem 117 to direct or focus or concentrate the modulated light stream MLS onto the light sensing device 130.

In some embodiments, system 100 may include an optical subsystem 105 that is configured to modify or condition or operate on the light stream L before it arrives at the light modulation unit 110, e.g., as shown in FIG. 2C. For example, the optical subsystem 105 may be configured to receive the light stream L from the environment and to focus the light stream onto a modulating plane of the light modulation unit 110. The optical subsystem 105 may include a camera lens (or a set of lenses). The lens (or set of lenses) may be adjustable to accommodate a range of distances to external objects being imaged/sensed/captured. In some embodiments, the optical subsystem 105 includes a conventional camera lens unit, e.g., configured for mounting in a standard mount.

In some embodiments, system 100 may include an optical subsystem 117 to direct the modulated light stream MLS onto a light sensing surface (or surfaces) of the light sensing device 130.

In some embodiments, the optical subsystem 117 may include one or more lenses, and/or, one or more mirrors.

In some embodiments, the optical subsystem 117 is configured to focus the modulated light stream onto the light sensing surface (or surfaces). The term "focus" implies an attempt to achieve the condition that rays (photons) diverging from a point on an object plane converge to a point (or an acceptably small spot) on an image plane. The term "focus" also typically implies continuity between the object plane point and the image plane point (or image plane spot)—points close together on the object plane map respectively to points (or spots) close together on the image plane. In at least some of the system embodiments that include an array of light sensing elements, it may be desirable for the modulated light stream MLS to be focused onto the light sensing array so that there is continuity between points on the light modulation unit LMU and points (or spots) on the light sensing array.

In some embodiments, the optical subsystem 117 may be configured to direct the modulated light stream MLS onto the light sensing surface (or surfaces) of the light sensing device 130 in a non-focusing fashion. For example, in a system embodiment that includes only one photodiode, it may not be so important to achieve the "in focus" condition at the light sensing surface of the photodiode since positional information of photons arriving at that light sensing surface will be immediately lost.

In one embodiment, the optical subsystem 117 may be configured to receive the modulated light stream and to concentrate the modulated light stream into an area (e.g., a small area) on a light sensing surface of the light sensing device 130. Thus, the diameter of the modulated light stream may be reduced (possibly, radically reduced) in its transit from the optical subsystem 117 to the light sensing surface (or surfaces) of the light sensing device 130. For example, in some embodiments, the diameter may be reduced by a factor of more than 1.5 to 1. In other embodiments, the diameter may be reduced by a factor of more than 2 to 1. In yet other embodiments, the diameter may be reduced by a factor of more than 10 to 1. In yet other embodiments, the diameter may be reduced by factor of more than 100 to 1. In yet other embodiments, the diameter may be reduced by factor of more than 400 to 1. In one embodiment, the diameter is reduced so that the modulated light stream is concentrated onto the light sensing surface of a single light sensing element (e.g., a single photodiode).

In some embodiments, this feature of concentrating the modulated light stream onto the light sensing surface (or surfaces) of the light sensing device allows the light sensing device to sense, at any given time, the sum (or surface integral) of the intensities of the modulated light portions within the modulated light stream. (Each time slice of the modulated light stream comprises a spatial ensemble of modulated light portions due to the modulation unit's action of applying the corresponding spatial pattern to the light stream.)

In some embodiments, the modulated light stream MLS may be directed onto the light sensing surface of the light sensing device 130 without concentration, i.e., without decrease in diameter of the modulated light stream, e.g., by use of photodiode having a large light sensing surface, large enough to contain the cross section of the modulated light stream without the modulated light stream being concentrated.

Figure 2E:
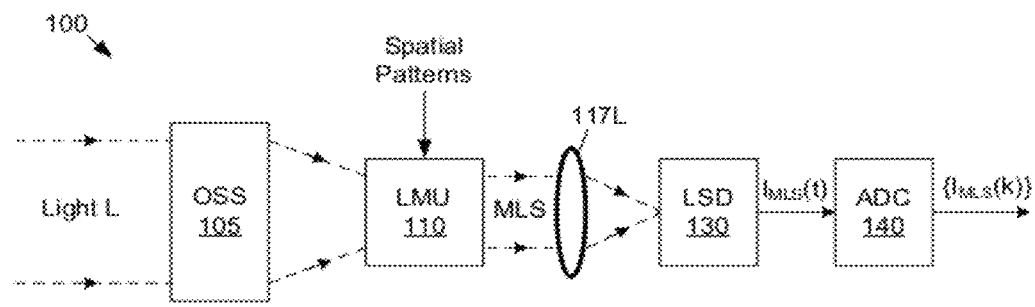
FIG. 2E illustrates an embodiment where the optical subsystem 117 is realized by a lens 117L.

In some embodiments, the optical subsystem 117 may include one or more lenses. FIG. 2E shows an embodiment where optical subsystem 117 is realized by a lens 117L, e.g., a biconvex lens or a condenser lens.

In some embodiments, the optical subsystem 117 may include one or more mirrors. In one embodiment, the optical subsystem 117 includes a parabolic mirror (or spherical mirror) to concentrate the modulated light stream onto a neighborhood (e.g., a small neighborhood) of the parabolic focal point. In this embodiment, the light sensing surface of the light sensing device may be positioned at the focal point.

In some embodiments, system 100 may include an optical mechanism (e.g., an optical mechanism including one or more prisms and/or one or more diffraction gratings) for splitting or separating the modulated light stream MLS into two or more separate streams (perhaps numerous streams), where each of the streams is confined to a different wavelength range. The separate streams may each be sensed by a separate light sensing device. (In some embodiments, the number of wavelength ranges may be, e.g., greater than 8, or greater than 16, or greater than 64, or greater than 256, or greater than 1024.) Furthermore, each separate stream may be directed (e.g., focused or concentrated) onto the corresponding light sensing device as described above in connection with optical subsystem 117. The samples captured from each light sensing device may be used to construct a corresponding image for the corresponding wavelength range. In one embodiment, the modulated light stream is separated into red, green and blue streams to support color (R,G,B) measurements. In another embodiment, the modulated light stream may be separated into IR, red, green, blue and UV streams to support five-channel multi-spectral imaging: (IR, R, G, B, UV). In some embodiments, the modulated light stream may be separated into a number of sub-bands (e.g., adjacent sub-bands) within the IR band to support multi-spectral or hyper-spectral IR imaging. In some embodiments, the number of IR sub-bands may be, e.g., greater than 8, or greater than 16, or greater than 64, or greater than 256, or greater than 1024. In some embodiments, the modulated light stream may experience two or more stages of spectral separation. For example, in a first stage the modulated light stream may be separated into an IR stream confined to the IR band and one or more additional streams confined to other bands. In a second stage, the IR stream may be separated into a number of sub-bands (e.g., numerous sub-bands) (e.g., adjacent sub-bands) within the IR band to support multispectral or hyper-spectral IR imaging.

In some embodiments, system 100 may include an optical mechanism (e.g., a mechanism including one or more beam splitters) for splitting or separating the modulated light stream MLS into two or more separate streams, e.g., where each of the streams have the same (or approximately the same) spectral characteristics or wavelength range. The separate streams may then pass through respective bandpass filters to obtain corresponding modified streams, wherein each modified stream is restricted to a corresponding band of wavelengths. Each of the modified streams may be sensed by a separate light sensing device. (In some embodiments, the number of wavelength bands may be, e.g., greater than 8, or greater than 16, or greater than 64, or greater than 256, or greater than 1024.) Furthermore, each of the modified streams may be directed (e.g., focused or concentrated) onto the corresponding light sensing device as described above in connection with optical subsystem 117. The samples captured from each light sensing device may be used to construct a corresponding image for the corresponding wavelength band. In one embodiment, the modulated light stream is separated into three streams which are then filtered, respectively, with a red-pass filter, a green-pass filter and a blue-pass filter. The resulting red, green and blue streams are then respectively detected by three light sensing devices to support color (R,G,B) acquisition. In another similar embodiment, five streams are generated, filtered with five respective filters, and then measured with five respective light sensing devices to support (IR, R, G, B, UV) multi-spectral acquisition. In yet another embodiment, the modulated light stream of a given band may be separated into a number of (e.g., numerous) sub-bands to support multi-spectral or hyper-spectral imaging.

In some embodiments, system 100 may include an optical mechanism for splitting or separating the modulated light stream MLS into two or more separate streams. The separate streams may be directed to (e.g., concentrated onto) respective light sensing devices. The light sensing devices may be configured to be sensitive in different wavelength ranges, e.g., by virtue of their different material properties. Samples captured from each light sensing device may be used to construct a corresponding image for the corresponding wavelength range.

Figure 2F:
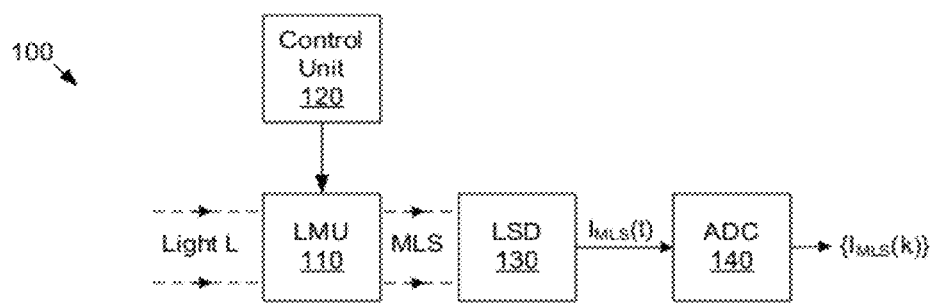
FIG. 2F illustrates an embodiment of system 100 that includes a control unit that is configured to supply a series of spatial patterns to the light modulation unit 110.

In some embodiments, system 100 may include a control unit 120 configured to supply the spatial patterns to the light modulation unit 110, as shown in FIG. 2F. The control unit may itself generate the patterns or may receive the patterns from some other agent. The control unit 120 and the light sensing device 130 may be controlled by a common clock signal so that the light sensing device 130 can coordinate (synchronize) its action of capturing the samples $\{I_{MLS}(k)\}$ with the control unit's action of supplying spatial patterns to the light modulation unit 110. (System 100 may include clock generation circuitry.)

In some embodiments, the control unit 120 may supply the spatial patterns to the light modulation unit in a periodic fashion.

The control unit 120 may be a digital circuit or a combination of digital circuits. For example, the control unit may include a microprocessor (or system of interconnected of microprocessors), a programmable hardware element such as a field-programmable gate array (FPGA), an application specific integrated circuit (ASIC), or any combination such elements.

In some embodiments, the control unit 120 may include a random number generator (RNG) or a set of random number generators to generate the spatial patterns or some subset of the spatial patterns.

In some embodiments, system 100 is battery powered. In some embodiments, the system 100 includes a set of one or more solar cells and associated circuitry to derive power from sunlight.

In some embodiments, system 100 includes its own light source for illuminating the environment or a target portion of the environment.

In some embodiments, system 100 may include a display (or an interface configured for coupling to a display) for displaying constructed images/videos, and/or, for displaying any of the various kinds of information described herein. The display may be based on any of a wide variety of display technologies. In one embodiment, the display may be an LCD display.

In some embodiments, system 100 may include one or more input devices (and/or, one or more interfaces for input devices), e.g., any combination or subset of the following devices: a set of buttons and/or knobs, a keyboard, a keypad, a mouse, a touch-sensitive pad such as a trackpad, a touch-sensitive display screen, one or more microphones, one or more temperature sensors, one or more chemical sensors, one or more pressure sensors, one or more accelerometers, one or more orientation sensors (e.g., a three-axis gyroscopic sensor), one or more proximity sensors, one or more antennas, etc.

Regarding the spatial patterns that are used to modulate the light stream L, it should be understood that there are a wide variety of possibilities. In some embodiments, the control unit 120 may be programmable so that any desired set of spatial patterns may be used.

In some embodiments, the spatial patterns are binary valued. Such an embodiment may be used, e.g., when the light modulating elements are two-state devices. In some embodiments, the spatial patterns are n-state valued, where each element of each pattern takes one of n states, where n is an integer greater than two. (Such an embodiment may be used, e.g., when the light modulating elements are each able to achieve n or more modulation states). In some embodiments, the spatial patterns are real valued, e.g., when each of the light modulating elements admits a continuous range of modulation. (It is noted that even a two-state modulating element may be made to effectively apply a continuous range of modulation by duty cycling the two states during modulation intervals.)

The spatial patterns may belong to a set of measurement vectors that is incoherent with a set of vectors in which the image/video is approximately sparse ("the sparsity vector set"). (See "Sparse Signal Detection from Incoherent Projections", Proc. Int. Conf. Acoustics, Speech Signal Processing—ICASSP, May 2006, Duarte et al.) Given two sets of vectors A={$a_i$} and B={$b_i$} in the same N-dimensional space, A and B are said to be incoherent if their coherence measure µ(A,B) is sufficiently small. The coherence measure is defined as:

$$\mu(A, B) = \max_{i,j} |\langle a_i, b_j \rangle|.$$

The number of compressive sensing measurements (i.e., samples of the sequence {$I_{MLS}(k)$} needed to construct an N-pixel image (or N-voxel video sequence) that accurately represents the scene being captured is a strictly increasing function of the coherence between the measurement vector set and the sparsity vector set. Thus, better compression can be achieved with smaller values of the coherence.

In some embodiments, the measurement vector set may be based on a code. Any of various codes from information theory may be used, e.g., codes such as exponentiated Kerdock codes, exponentiated Delsarte-Goethals codes, run-length limited codes, LDPC codes, Reed Solomon codes and Reed Muller codes.

In some embodiments, the measurement vector set corresponds to a permuted basis such as a permuted DCT basis or a permuted Walsh-Hadamard basis, etc.

In some embodiments, the spatial patterns may be random or pseudo-random patterns, e.g., generated according to a random number generation (RNG) algorithm using one or more seeds. In some embodiments, the elements of each pattern are generated by a series of Bernoulli trials, where each trial has a probability p of giving the value one and probability 1-p of giving the value zero. (For example, in one embodiment p=½.) In some embodiments, the elements of each pattern are generated by a series of draws from a Gaussian random variable.)

The system 100 may be configured to operate in a compressive fashion, where the number of the samples {$I_{MLS}(k)$} captured by the system 100 is less than (e.g., much less than) the number of pixels in the image (or video) to be constructed from the samples. In many applications, this compressive realization is very desirable because it saves on power consumption, memory utilization and transmission bandwidth consumption. However, non-compressive realizations are contemplated as well.

In some embodiments, the system 100 is configured as a camera or imager that captures information representing an image (or a series of images) from the external environment, e.g., an image (or a series of images) of some external object or scene. The camera system may take different forms in different applications domains, e.g., domains such as visible light photography, infrared photography, ultraviolet photography, high-speed photography, low-light photography, underwater photography, multi-spectral imaging, hyperspectral imaging, etc. In some embodiments, system 100 is configured to operate in conjunction with (or as part of) another system, e.g., in conjunction with (or as part of) a microscope, a telescope, a robot, a security system, a surveillance system, a fire sensor, a node in a distributed sensor network, etc.

In some embodiments, system 100 is configured as a spectrometer.

In some embodiments, system 100 is configured as a multi-spectral or hyper-spectral imager.

In some embodiments, system 100 may also be configured to operate as a projector. Thus, system 100 may include a light source, e.g., a light source located at or near a focal point of optical subsystem 117. In projection mode, the light modulation unit 110 may be supplied with an image (or a video sequence) so that the image (or video sequence) can be displayed on a display surface (e.g., screen).

In some embodiments, system 100 includes an interface for communicating with a host computer. The host computer may send control information and/or program code to the system 100 via the interface. Furthermore, the host computer may receive status information and/or compressive sensing measurements from system 100 via the interface.

Figure 2G:
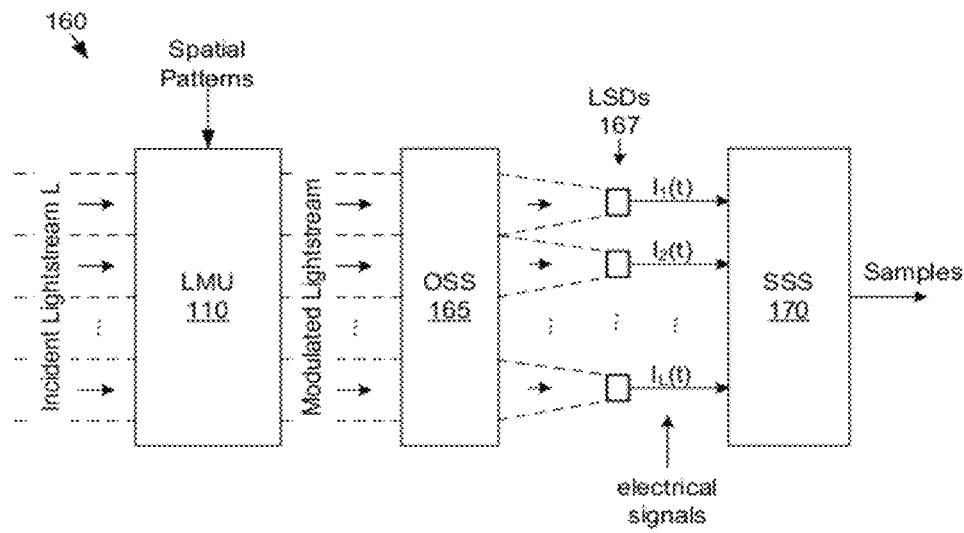
FIG. 2G illustrates an embodiment of a system 160 that includes a plurality of light sensing devices, each of which receives light from a corresponding spatial portion of the light modulation unit.

In one set of embodiments, a system 160 may be configured as shown in FIG. 2G. System 160 may include the light modulation unit 110 as described above, and may also include an optical subsystem 165, a plurality of light sensing devices (collectively referenced by item number 167), and a sampling subsystem 170. (Furthermore, any subset of the features, embodiments and elements described in this patent.)

The light modulation unit 110 is configured to modulate an incident stream of light L with a sequence of spatial patterns in order to produce a modulated light stream MLS. The light modulation unit includes an array of light modulating elements. The light modulation unit (LMU) 110 may be realized in any of the various ways described herein. In particular, the fact that FIG. 2G shows light entering at the left side of the LMU and exiting the right side is not meant to limit the LMU to transmissive embodiments.

The optical subsystem 165 is configured to deliver light from each of a plurality of spatial subsets of the modulated light stream onto a respective one of the light sensing devices 167. (The linear arrangement of the light sensing devices in FIG. 2G is not meant to be limiting. Various other arrangements, especially two-dimensional arrangements, are possible.) (The fact that the light sensing devices in FIG. 2G are shown as being separated from each other is not meant to be limiting. In some embodiments, the light sensing devices are physically adjacent (or contiguous), arranged in an array, or in close proximity to one another.) In other words, light from a first subset of the modulated light stream is delivered onto a first light sensing device; light from a second subset of the modulated light stream is delivered onto a second light sensing device; and so on. The spatial subsets of the modulated light stream are produced by respective subsets of the array of light modulating elements. Each subset of the array of light modulating elements produces the respective spatial subset of the modulated light stream by modulating a respective spatial subset of the incident light stream. The light sensing devices 165 are configured to generate respective electrical signals. Each of the electrical signals represents intensity of the respective spatial subset of the modulated light stream as a function of time.

By saying that light from a given spatial subset of the modulated light stream is "delivered" onto the respective light sensing device means that most of the flux (i.e., photons) arriving at the respective light sensing device comes from the spatial subset. However, it should be understood that light crossover may occur in the delivery of light from spatial subsets of the modulated light stream onto the respective light sensing devices. Light crossover occurs when a photon of a given spatial subset arrives a light sensing device other than the respective light sensing device (e.g., when a photon from the first spatial subset arrives at the second light sensing device). Light crossover might occur, e.g., for photons produced from the light modulation unit along the boundaries of the spatial subsets, e.g., due to imperfections in the optical subsystem 165. Crossover for a given light sensing device might be defined as the ratio of the amount of light power received at the light sensing device from spatial subsets other than the respective spatial subset to the amount of light power received at the light sensing device from the respective spatial subset. The crossover for a given system might be defined, e.g., as the maximum crossover taken over all the light sensing devices.

In different embodiments, different amounts of crossover may be tolerated, e.g., depending on the targeted quality of image/video reconstruction. For example, in different sets of embodiments, the maximum crossover may be required, respectively, to be less than $1/2$, less than $1/4$, less than $1/8$, less than $1/32$, less than $1/128$, less than $1/1024$, less than $1/4096$, less than $1/16384$, less than $2^{-16}$.

Furthermore, the "delivery" of light from a given spatial subset of the modulated light stream onto the respective light sensing device does not require that 100% of the photons from the spatial subset arrive at the respective light sensing device (or that 100% of the photons that arrive be converted into electrical charge). Small amounts of light loss may be unavoidable.

The sampling subsystem 170 is configured to acquire samples of the electrical signals generated respectively by the light sensing devices 167. The samples include sample subsets that correspond respectively to the electrical signals. Each sample subset includes a plurality of samples of the respective electrical signal. In the discussion below, the electrical signals are denoted as $I_1(t), I_2(t), \ldots, I_L(t)$, where L is the number of the light sensing devices, and the sample subsets are denoted as $\{I_1(k)\}, \{I_2(k)\}, \ldots, \{I_L(k)\}$. The number L is greater than one but less than N, where N is the number of light modulating elements in the array of light modulating elements.

In various embodiments, the number N may take a wide variety of values. For example, in different sets of embodiments, N may be, respectively, in the range [64, 256], in the range [256, 1024], in the range [1024,4096], in the range $[2^{12},2^{14}]$, in the range $[2^{14},2^{16}]$, in the range $[2^{16},2^{18}]$, in the range $[2^{18},2^{20}]$, in the range $[2^{20},2^{22}]$, in the range $[2^{22},2^{24}]$, in the range $[2^{24},2^{26}]$, in the range from $2^{26}$ to infinity. The particular value used in any given embodiment may depend on one or more factors specific to the embodiment.

Likewise, the number L may take any of a wide variety of values. For example, in different sets of embodiments, L may be, respectively, in the range [2,4], in the range [4,8], in the range [8,16], in the range [16,32], in the range [32,64], in the range [64, 256], in the range [256,1024], in the range [1024, 4096], in the range $[2^{12},2^{14}]$, in the range $[2^{14},2^{16}]$, in the range $[2^{16},2^{18}]$, in the range $[2^{18},2^{20}]$, in the range $[2^{20},2^{22}]$, in the range $[2^{22},2^{24}]$, in the range $[2^{24},2^{26}]$.

Furthermore, the ratio N/L make take any of a wide of values, e.g., any value in the range from 2 to N/2. In different sets of embodiments, the ratio N/L may be, respectively, in the range [2,4], in the range [4,8], in the range [8,16], in the range [16,64], in the range [64,256], in the range [256,1024], in the range [1024,4096], in the range $[4096,2^{14}]$, in the range $[2^{14},2^{16}]$, in the range $[2^{16},2^{18}]$, in the range $[2^{18},2^{20}]$, in the range $[2^{20},2^{22}]$, in the range $[2^{22},2^{24}]$, in the range from $2^{24}$ to infinity.

As noted above, the samples acquired by the sampling subsystem 170 include a sample subset for each of the electrical signals. In some embodiments, each sample subset is acquired over the same window in time, or, approximately the same window in time.

In some embodiments, the samples of each subset are acquired at the same rate. In other embodiments, not all the sample subsets are acquired at the same rate.

In some embodiments, each of the sample subsets is acquired at the same rate, and, the samples $I_1(k), I_2(k), \ldots, I_L(k)$ corresponding to same time index value k are acquired at the same time $t_k$, or at least, close together in time. The samples $I_1(k), I_2(k), \ldots, I_L(k)$ corresponding to the same time index value k may be referred to herein as a "sample group".

In some embodiments, each sample group $\{I_1(k), I_2(k), \ldots, I_L(k)\}$ corresponds to a respective one of the patterns of the sequence of spatial patterns. In particular, the sample $I_j(k), j=1, 2, 3, \ldots, L$, may represent an inner product between (a) the restriction of a time-slice of the incident light stream to the $j^{th}$ subset of the array of light modulating elements and (b) the restriction of a $k^{th}$ one of the spatial patterns to the $j^{th}$ subset.

Figure 2H:
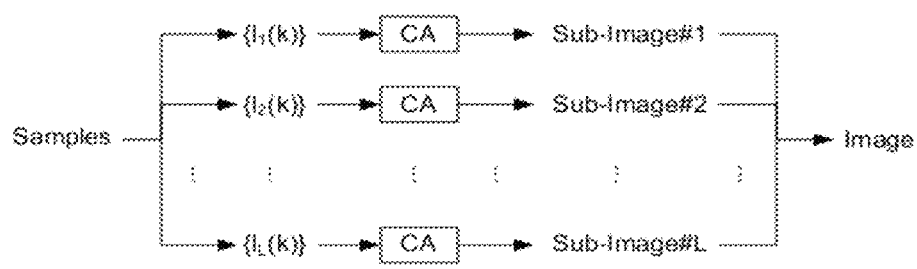
FIG. 2H illustrates an embodiment of a method for constructing an image, involving the construction of sub-image corresponding respectively the light sensing devices of FIG. 2G.

Each of the L sample subsets is usable to construct a respective sub-image of an image, as suggested in FIG. 2H. (See also FIG. 2I.) (CA is an acronym for "construction algorithm".) In other words, the sample subset $\{I_1(k)\}$ is usable to construct a first sub-image; the sample subset $\{I_2(k)\}$ is usable to construct a second sub-image; and so on. Each sub-image represents a respective one of the spatial subsets of the incident light stream (over the time interval of acquisition). The sub-images may be joined together to form the image. The image may represent the whole of the incident light stream (or the portion of the incident light stream that impinges upon the array of light modulating elements) over the time interval of acquisition. The number of pixels in each sub-image may equal the number of light modulating elements in the respective subset of the array of light modulating elements. Each pixel of the $j^{th}$ sub-image may correspond to a respective one of the light modulating elements in the $j^{th}$ subset of the array. Thus, the final image may be in an N-pixel image, with each of the N pixels corresponding to a respective one of the N light modulating elements of the array. In some embodiments, each sub-image is N/L pixels in size. However, in other embodiments, the sub-images may be non-identically sized.

Each sub-image may be constructed using the respective sample subset and the restriction of the sequence of spatial patterns to the corresponding subset of the array of light modulating elements. For example, to construct the first sub-image, the construction algorithm operates on the first sample subset (obtained from the first light sensing device) and the spatial patterns restricted to the first subset of the array of light modulating elements. The construction of the sub-images may be performed by system 160 and/or by some other system. In the latter case, system 160 may send the sample subsets to the other system. The sub-images may be constructed using any image construction algorithm known in the field of compressive sensing, or any combination of such algorithms.

In some embodiments, each sample subset is a compressed representation of the corresponding sub-image, i.e., the number of samples $m_{SS}$ in the sample subset is smaller than the number of pixels $n_{PSI}$ in the corresponding sub-image. For example, in different embodiments, the ratio of $m_{SS}/n_{PSI}$ may be, respectively, less than or equal to 0.8, less than or equal to 0.6, less than or equal to 0.4, less than or equal to 0.3, less than or equal to 0.2, less than or equal to 0.1, less than or equal to 0.05, less than or equal to 0.025. In some embodiments, no compression is achieved, i.e., $m_{SS}$ is greater than or equal to $n_{PSI}$. (Such might be the case when the ratio N/L is small or when the signal-to-noise ratio is small.)

FIG. 2I illustrates one embodiment of the processes of sample acquisition and image construction in a case (L=4) where there are four light sensing devices LSD1-LSD4. At the left is a visualization of the modulated light stream at the modulating plane of the light modulation unit 110 (at a snapshot in time). The light modulation unit includes N light modulating elements. The four light sensing devices receive light from four respective quadrants of the modulation plane.

The electrical signal generated by each light sensing device is sampled to generate a respective sample subset. (See the A/D convert blocks.) Each sample subset is processed by a construction algorithm (CA) to generate a respective sub-image. (The construction algorithm may be any construction algorithm known in the field of compressive sensing.) The sub-images are stitched together to form an N-pixel image.

For more information on various embodiments of system 160, please see U.S. patent application Ser. No. 13/197,304, filed on Aug. 3, 2011, entitled "Decreasing Image Acquisition Time for Compressive Imaging Devices", invented by Woods et al., which is hereby incorporated by reference in its entirety as though fully and completely included herein. (In the parlance of that Patent Application, system 160 is referred to as "system 600".)

Figure 3A:
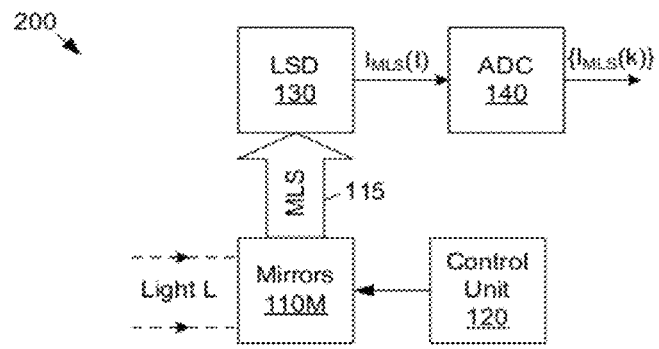
FIG. 3A illustrates system 200, where the light modulation unit 110 is realized by a plurality of mirrors (collectively referenced by label 110M).

In one realization 200 of system 100, the light modulation unit 110 may be realized by a plurality of mirrors, e.g., as shown in FIG. 3A. (The mirrors are collectively indicated by the label 110M.) The mirrors 110M are configured to receive corresponding portions of the light L received from the environment, albeit not necessarily directly from the environment. (There may be one or more optical elements, e.g., one or more lenses along the input path to the mirrors 110M.) Each of the mirrors is configured to controllably switch between two orientation states. In addition, each of the mirrors is configured to (a) reflect the corresponding portion of the light onto a sensing path 115 when the mirror is in a first of the two orientation states and (b) reflect the corresponding portion of the light away from the sensing path when the mirror is in a second of the two orientation states.

In some embodiments, the mirrors 110M are arranged in an array, e.g., a two-dimensional array or a one-dimensional array. Any of various array geometries are contemplated. For example, in different embodiments, the array may be a square array, a rectangular array, a hexagonal array, etc. In some embodiments, the mirrors are arranged in a spatially-random fashion.

The mirrors 110M may be part of a digital micromirror device (DMD). For example, in some embodiments, one of the DMDs manufactured by Texas Instruments may be used.

The control unit 120 may be configured to drive the orientation states of the mirrors through the series of spatial patterns, where each of the patterns of the series specifies an orientation state for each of the mirrors.

The light sensing device 130 may be configured to receive the light portions reflected at any given time onto the sensing path 115 by the subset of mirrors in the first orientation state and to generate an analog electrical signal representing $I_{MLS}(t)$ representing a cumulative intensity of the received light portions as function of time. As the mirrors are driven through the series of spatial patterns, the subset of mirrors in the first orientation state will vary from one spatial pattern to the next. Thus, the cumulative intensity of light portions reflected onto the sensing path 115 and arriving at the light sensing device will vary as a function time. Note that the term "cumulative" is meant to suggest a summation (spatial integration) over the light portions arriving at the light sensing device at any given time. This summation may be implemented, at least in part, optically (e.g., by means of a lens and/or mirror that concentrates or focuses the light portions onto a concentrated area as described above).

Figure 3B:
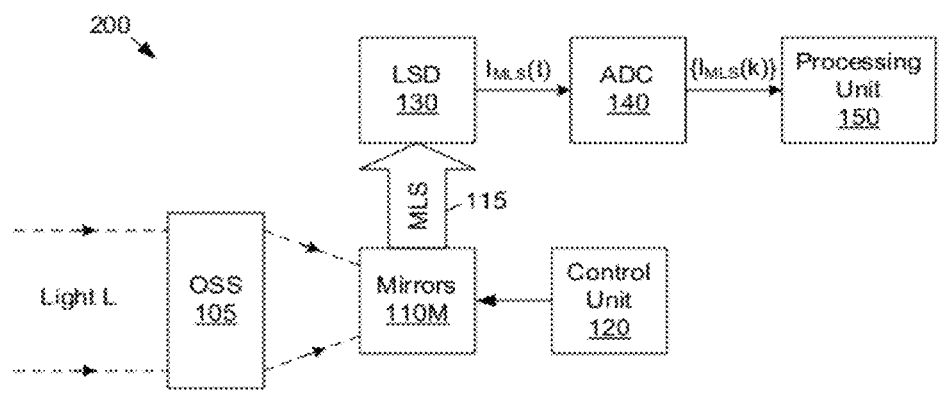
FIG. 3B shows an embodiment of system 200 that includes the processing unit 150.

System realization 200 may include any subset of the features, embodiments and elements discussed above with respect to system 100. For example, system realization 200 may include the optical subsystem 105 to operate on the incoming light L before it arrives at the mirrors 110M, e.g., as shown in FIG. 3B.

Figure 4:
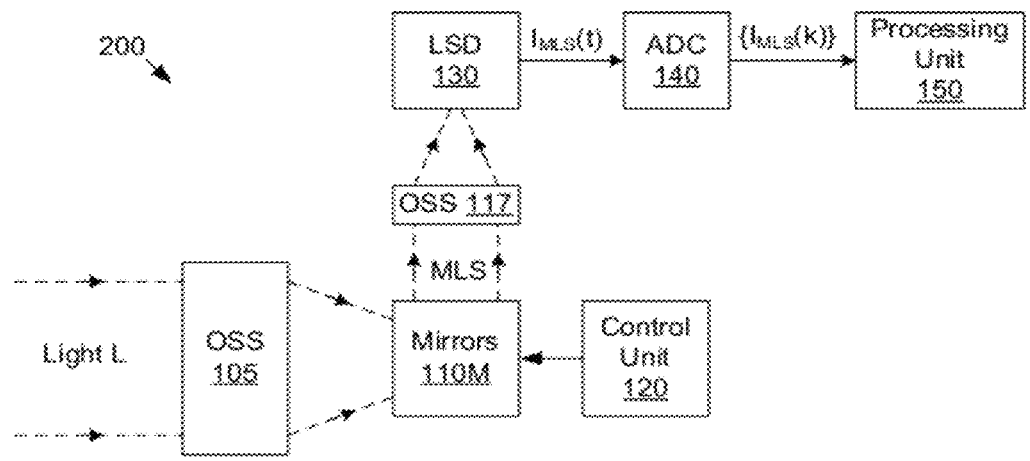
FIG. 4 shows an embodiment of system 200 that includes the optical subsystem 117 to direct or focus or concentrate the modulated light stream MLS onto the light sensing device 130.
Figure 5A:
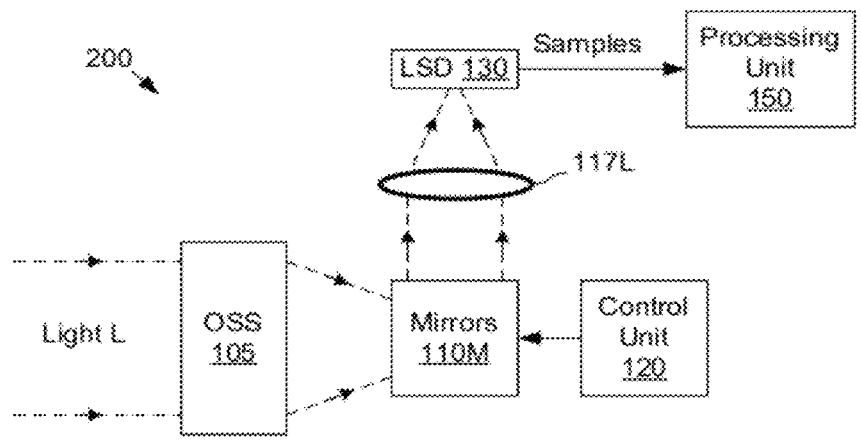
FIG. 5A shows an embodiment of system 200 where the optical subsystem 117 is realized by the lens 117L.

In some embodiments, system realization 200 may include the optical subsystem 117 along the sensing path as shown in FIG. 4. The optical subsystem 117 receives the light portions reflected onto the sensing path 115 and directs (e.g., focuses or concentrates) the received light portions onto a light sensing surface (or surfaces) of the light sensing device 130. In one embodiment, the optical subsystem 117 may include a lens 117L, e.g., as shown in FIG. 5A.

Figure 5B:
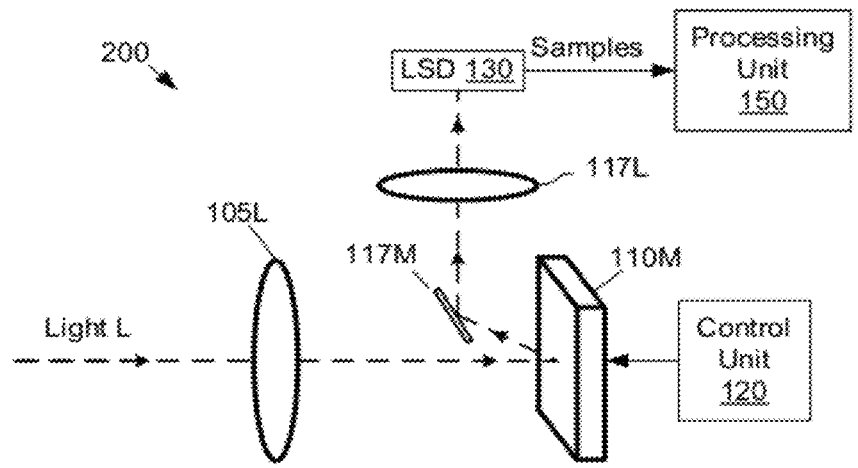
FIG. 5B shows an embodiment of system 200 where the optical subsystem 117 is realized by a mirror 117M and lens 117L in series.

In some embodiments, the optical subsystem 117 may include one or more mirrors, e.g., a mirror 117M as shown in FIG. 5B. Thus, the sensing path may be a bent path having more than one segment. FIG. 5B also shows one possible embodiment of optical subsystem 105, as a lens 105L.

Figure 5C:
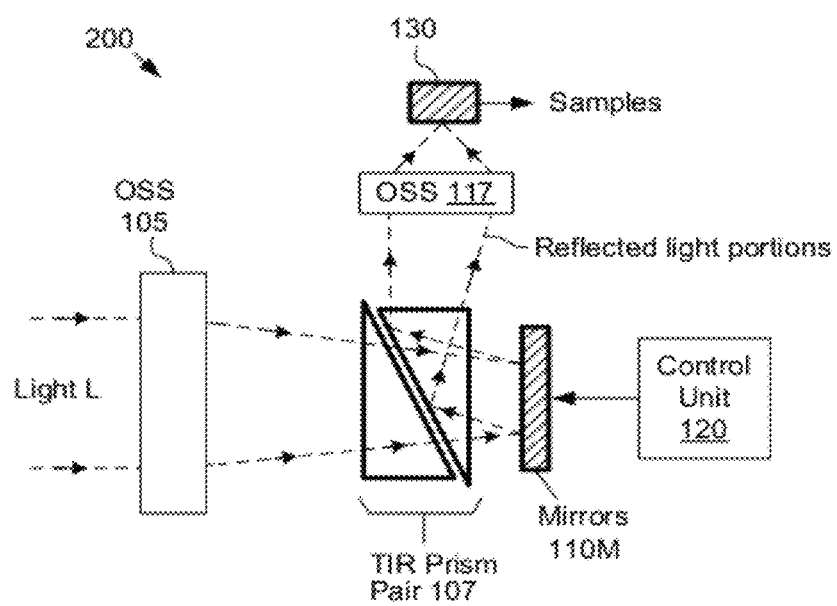
FIG. 5C shows another embodiment of system 200 that includes a TIR prism pair 107.

In some embodiments, there may be one or more optical elements intervening between the optical subsystem 105 and the mirrors 110M. For example, as shown in FIG. 5C, a TIR prism pair 107 may be positioned between the optical subsystem 105 and the mirrors 110M. (TIR is an acronym for "total internal reflection".) Light from optical subsystem 105 is transmitted through the TIR prism pair and then interacts with the mirrors 110M. After having interacted with the mirrors 110M, light portions from mirrors in the first orientation state are reflected by a second prism of the pair onto the sensing path 115. Light portions from mirrors in the second orientation state may be reflected away from the sensing path.

Scanning a Region Along a 1D Path

Figure 6:
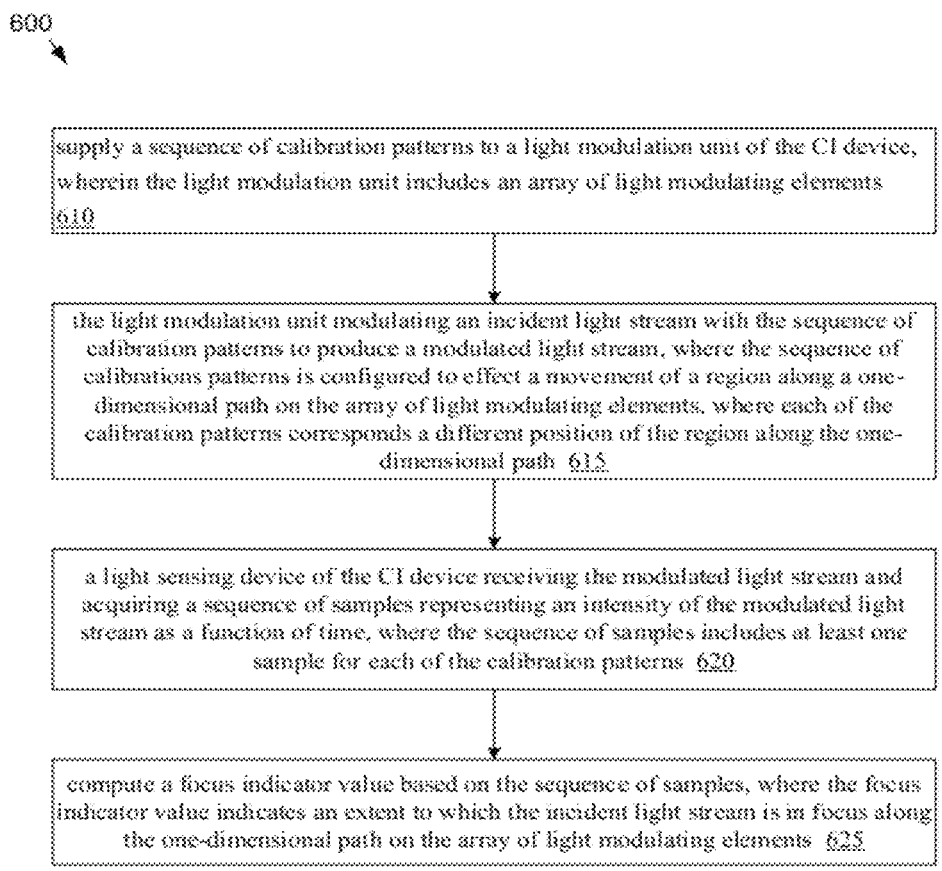
FIG. 6 illustrates an embodiment of a method 600 for computing focus-related information based on a one-dimensional path scan on the surface of the light modulation unit.

In one set of embodiments, a method 600 for focusing a compressive imaging device may include the actions shown in FIG. 6. A compressive imaging (CI) device is a device that captures a compressed representation(s) of an image(s) using a light modulation unit and a light sensing device, as variously described above. (FIGS. 2A through 5C illustrate different embodiments of a CI device.) (The set of samples captured from the light sensing device is the compressed representation of the image.) In some embodiments, the CI device also includes the optical subsystem 105 as described above. The optical subsystem 105 may have an adjustable focus setting, e.g., as is typical with many camera lens units.

Action 610 includes supplying a sequence of calibration patterns to a light modulation unit of the CI device, e.g., the light modulation unit 110 as variously described above. The light modulation unit includes an array of light modulating elements, e.g., as variously described above. The calibration patterns are intended to facilitate the process of focusing the CI device.

Action 615 includes modulating an incident light stream L with the sequence of calibration patterns to produce a modulated light stream MLS. (The light modulation unit performs this modulation operation.) (See, e.g., FIGS. 2A through 5C.) The sequence of calibrations patterns is configured to effect a movement of a region along a one-dimensional path on the array of light modulating elements. Each of the calibration patterns corresponds a different position of the region along the one-dimensional path.

The region may be a small region, e.g., a region comprising less than or equal to 128 light modulating elements in diameter. For example, in different embodiments, the region may be, respectively, a 1×1 region, a 1×2 region, a 2×1 region, a 2×2 region, a 2×3 region, a 3×2 region, a 2×4 region, a 4×2 region, a 4×4 region, etc. (The dimensions are in terms of number of light modulating elements covered.) More generally, the region may be a $k_X \times k_Y$ region with $k = k_X \times k_Y$ being a positive integer. In different sets of embodiments, the integer k may be, respectively, less than or equal to 512, less than or equal to 256, less than or equal to 128, less than or equal to 64, less than or equal to 32, less than or equal to 16, less than or equal to 8, less than or equal to 4.

In the one-dimensional path may take any of a wide variety of forms. For example, in different embodiments, the path may be line segment, a polyline, a circle, a triangle, a square, an arbitrary curve, a diamond, a hexagon, etc.

At 620, a light sensing device of the CI device (e.g., light sensing device 130 as variously described above) receives the modulated light stream MLS and acquires a sequence of samples $\{I_{MLS}(k)\}$ representing an intensity of the modulated light stream as a function of time. (The light sensing device may include the A/D converter 140 as described above.) The sequence of samples includes at least one sample for each of the calibration patterns. For example, the operation of the control unit 120 and A/D converter 140 may be coordinated to ensure this condition.

Action 625 includes computing a focus indicator value based on the sequence of samples. This computing action may be performed by processing unit 150 as described above. The focus indicator value indicates an extent to which the incident light stream is in focus along the one-dimensional path on the array of light modulating elements. The sequence of samples may be interpreted as (or may be condensed so as to represent) a one-dimensional image with position along the image corresponding to position along the one-dimensional path on the array of light modulating elements.

The focus indicator value may be computed by evaluating a conventional 1D focus metric (of which there are many known in the art) on the sequence of samples. In some embodiments, two or more conventional 1D focus metrics may be evaluated and combined (for example, by averaging, or taking the maximum) to obtain a composite focus metric.

In some embodiments, the focus metric may involve: a measure of frequency content (such as might be derived from a Fourier transform of the image), global variance, Sobel Tenenbaum's Algorithm, Boddeke's Algorithm, any estimate of the second derivative (e.g., using the Laplacian Operator or a numerical second difference), an estimate of the gradient in the image, an estimate of the variance or a function on the data such as the variance of the gradient or variance of the second derivative, a threshold absolute gradient and/or threshold squared gradient, Tenenbaum gradient, etc. (This list is not meant to be limiting. Indeed, a wide variety of other focus metrics may be used.)

In some embodiments, the CI device includes the optical subsystem 105. (See, e.g., FIGS. 2C-2E and FIGS. 3B through 5C.) Optical subsystem 105 receives and operates on the incident light stream prior to the incident light stream arriving at the light modulation unit. It is desirable for optical subsystem 105 to operate on the incident light stream in such as way that the incident light stream comes into focus at the array of light modulating elements. However, that condition may fail to hold when, e.g., the external object (that is being imaged) moves, or when the CI device is moved with respect to the external object. The present method may be used to restore that condition of focus.

In some embodiments, the method 600 may also include changing a focus setting of the optical subsystem 105 based on data including the focus indicator value. The data may also include a current focus setting, a previous focus setting, and a previous focus indicator value corresponding to the previous focus setting. Processing unit 150 may operate on the data to determine an amount (direction and magnitude) to change the focus setting (e.g., using the Newton-Raphson method).

In some embodiments, the method 600 may include repeatedly performing a set of operations. The set of operations may include: changing the focus setting of the optical subsystem 105; and performing actions 610 through 625. The set of operations may be repeated until the focus indicator value becomes less than a threshold value. The threshold value is selected so that the final focus setting is close enough to the optimal setting. "Close enough" might have different meanings in different application contexts, or in different modes of operation. The threshold value may be a programmable parameter.

In some embodiments, the method 600 may also include changing an optical distance between the light modulation unit 110 and the optical subsystem 105 based on data including the focus indicator value. The data may also include a current value of the optical distance, a previous value of the optical distance, and a previous focus indicator value corresponding to the previous optical distance value. Changing the distance between the light modulation unit and the optical subsystem may involve translating the light modulation unit, e.g., along the optical path of the incident light stream.

The term "optical distance" is used as a synonym for "optical path length" and refers to the length of travel of a light stream (or beam) between two given elements of a system. Optical distance is not necessarily the same as the straight-line distance between the two elements since the light stream travelling between the two elements need not follow a straight-line path. For example, optical devices such as mirrors, beam splitters, lenses, prisms, etc. may be used direct the flow of a light stream along any desired path.

In some embodiments, the light modulation unit and the light sensing device (and any optics intervening between the light modulation unit and the light sensing device) may be configured to translate together, as a unit. For example, those elements may be mounted on a translatable platform. The platform may be translated relative to the optical subsystem 105. In one such embodiment, the light sensing device may be configured to additionally translate with respect to the platform.

In some embodiments, the light modulation unit may be configured to translate independently of other elements of the system (the CI device).

In some embodiments, the method 600 may also include repeatedly performing a set of operations, where the set of operations includes: changing an optical distance $d_{OM}$ between the light modulation unit and the optical subsystem; and performing actions 610 through 625. The set of operations may be repeated until the focus indicator value becomes less than a threshold value. The comments above regarding the threshold value may apply here as well.

In some embodiments, the method 600 may also include changing an optical distance $d_{MS}$ (optical path length) between the light modulation unit and the light sensing device based on a final optical distance $d_{OM(final)}$ between the light modulation unit and the optical subsystem after the focus indicator value becomes less than the threshold value. The functional relationship between $d_{OM}$ and $d_{MS}$ may be known by calibration.

Adaptively Adding Another 1D Path

In some embodiments, method 600 may also include: determining that the focus indicator value computed at 625 is inaccurate (by any of various means), and then performing actions 610 through 625 a second time, using a second sequence of calibration patterns, to obtain a second sequence of samples and a second focus indicator value. The second sequence of calibration patterns is configured to effect the movement of the region along a second one-dimensional path on the array of light modulating elements (i.e., different from the one-dimensional path used in the first execution of action 615). Hopefully, the second one-dimensional path will cut through a portion of the incident light stream that has more dynamic information content, and thus, give rise to a more accurate focus indicator value in the second iteration. If that second focus indicator value is found to be inaccurate, a third iteration of 610 through 625 may be performed, and so on.

The original focus indicator value may be determined to be inaccurate by computing a measure of the dynamic variation of the original sequence of samples and determining that the measure is smaller than a threshold. For example, if the RMS value (or the average of the absolute value) of the second derivative of the sample sequence is smaller than the threshold, the focus indicator value may be declared to be inaccurate. As another example, if the standard deviation of the sample sequence is too small, the focus indicator value may be declared to be inaccurate. There are a wide variety of ways known in the field of image processing for measuring the dynamic variation of a sequence (or 1D image), and any of those methods may be used here.

A Plurality of 1D Paths for the Current State of Focus

In some embodiments, the method 600 may also include performing actions 610 through 625 a plurality of times, using a respective plurality of calibration sequences to obtain a respective plurality of focus indicator values for a respective plurality of one-dimensional paths on the array of light modulating elements. (Processing unit 150 may direct the plurality of iterations.) The one-dimensional paths are different paths, i.e., the set of light modulating elements covered by any one of them is not the same as the set of light modulating elements covered by any other one of them. In other words, no two of the paths are entirely coincident (sitting on top of each other). Note however that the one-dimensional paths are allowed to intersect in some embodiments. (The optical distance $d_{OM}$ and the focus setting of the optical subsystem 105 may be held constant during the plurality of iterations of 610 through 625 so that the resulting focus indicator values are indicative of the current state of focus of the incident light stream.) Using a plurality of one-dimensional paths increases the probability that at one of them will cut through a spatially dynamic portion (e.g., one or more edges) in the image carried by the incident light field. The processing unit 150 may operate on the plurality of focus indicator values to determine a representative focus indicator value for a current state of focus of the incident light stream on the array of light modulating elements. For example, the focus indicator value corresponding to the path (1-D image) with the highest measure of dynamic variability may be selected as the representative.

Adaptive Algorithm for Locating Improved (or Optimal) Focus

In some embodiments, the method 600 may also include: directing an actuator to change an optical distance between the optical subsystem 105 and the light modulation unit 110 according to a first displacement value; performing actions 610 through 625 a second time, to obtain an additional focus indicator value for an additional sequence of samples (e.g., using the same one-dimensional path as in the first iteration of actions 610 through 625); and computing a second displacement value for the optical distance based on data including the focus indicator value for the original sequence of samples, the focus indicator value for the additional sequence of samples and the first displacement value. In some embodiments, the data may also include past-history information, e.g., focus indicator values and corresponding displacement values from one or more previous states of the optical distance. (In some embodiments, the actuator allows variable-sized steps. In other embodiments, the actuator may allow only unit-sized steps.) The method 600 may also include directing the actuator to change the optical distance according to the second displacement value.

In some embodiments, the method 600 may also include: directing an actuator to change a focus setting of the optical subsystem 105 according to a first displacement value; performing actions 610 through 625 a second time, to obtain an additional focus indicator value for an additional sequence of samples (e.g., for the same one-dimensional path); and computing a second displacement value for the focus setting based on data including the focus indicator value for the original sequence of samples, the focus indicator value for the additional sequence of samples and the first displacement value. In some embodiments, the data may also include past-history information, e.g., focus indicator values and corresponding displacement values from one or more previous states of the focus setting. The method 600 may also include directing the actuator to change the focus setting of the optical subsystem 105 according to the second displacement value.

Batch Algorithm

In some embodiments, method 600 may also include: directing an actuator to change an optical distance between the optical subsystem 105 and the light modulation unit 110 through a range; performing actions 610 through 625 for each of a plurality of optical distances within the range in order to obtain a corresponding plurality of sample sequences and a corresponding plurality of focus indicator values (e.g., using the same one-dimensional path for each of the plurality of distances); determining an optimal value for the optical distance based on an analysis of data including the plurality of focus indicator values. The optimal value may be determined maximizing (or minimizing) the function of optical distance defined by the focus indicator values. Numerical methods for finding the minimum or maximum of a function are well known. Any such method may be used here. The actuator may then be directed to change the optical distance to the optimal value.

In some embodiments, the method 600 may also include: directing an actuator to change a focus setting of the optical subsystem 105 through a range of settings; performing actions 610 through 625 for each of a plurality of settings within the range in order to obtain a corresponding plurality of sample sequences and a corresponding plurality of focus indicator values (e.g., using the same one-dimensional path for each of the plurality of settings); and determining an optimal value for the focus setting based on an analysis of data including the plurality of focus indicator values, e.g., by computing the minimum or maximum of the function of focus setting defined by the focus indicator values. The method 600 may also include directing the actuator to change the focus setting to the optimal value.

In some embodiments, the light sensing device 130 includes a plurality of light sensing elements. (In some embodiments, the light sensing elements are organized in an array.) Each of the light sensing elements generates a respective electrical signal representing intensity of a respective spatial portion of the modulated light stream. The action of acquiring the sequence of samples (referred to at 620 of FIG. 6) may involve adding the electrical signals to obtain a sum signal and sampling the sum signal. For more information on how to deliver spatial portions of the modulated light stream onto respective light sensing elements, please see U.S. patent application Ser. No. 13/197,304, filed on Aug. 3, 2011, entitled "Decreasing Image Acquisition Time for Compressive Imaging Devices", invented by Woods et al., which is hereby incorporated by reference in its entirety as though fully and completely included herein.

In some embodiments, instead of summing the electrical signals (from the respective light sensing elements) in the analog domain, they are summed in the digital domain. Thus, the action of acquiring the sequence of samples (referred to at 620 of FIG. 6) may include sampling each of the electrical signals and adding the sampled versions of the electrical signals in the digital domain.

In some embodiments, the light sensing device 130 includes only one light sensing element (e.g., an elementary transducer between light energy and electrical energy).

In some embodiments, the action of computing a focus indicator value includes: computing a discrete Fourier transform of the sequence of samples $\{I_{MLS}(k)\}$ (or, a one-dimensional image derived from sequence of samples); and computing an amount of energy present in the discrete Fourier transform at frequencies above a cutoff frequency. In some embodiments, the computed energy may be one of a plurality of factors that determine the focus indicator value.

Method 700

Figure 7:
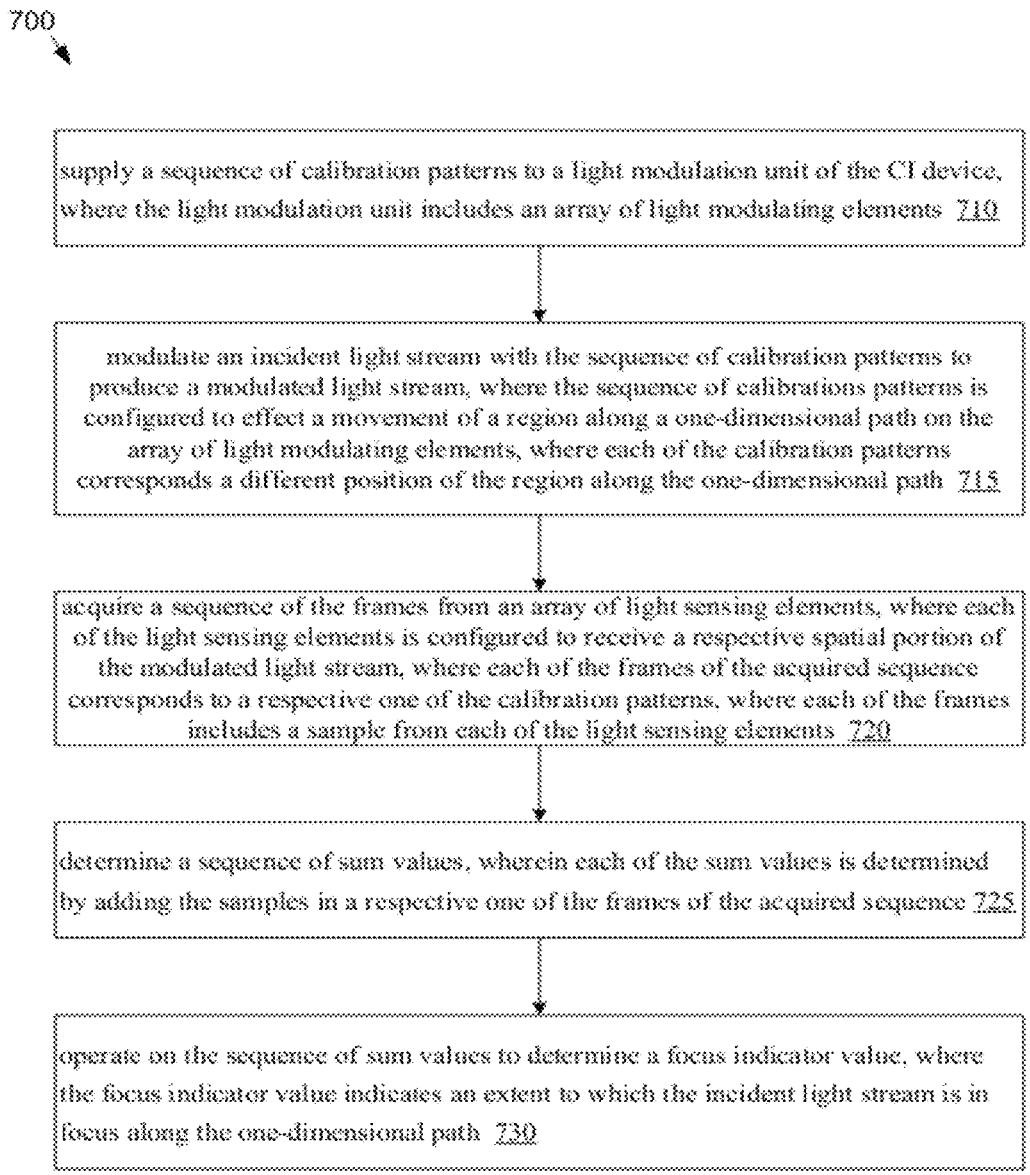
FIG. 7 illustrates an embodiment of a method 700, also based on the one-dimensional path scan, but using an array of light sensing elements.

In one set of embodiments, a method 700 for focusing a compressive imaging (CI) device may include the actions shown in FIG. 7. (Furthermore, method 700 may also include any subset of the actions, embodiments and features described above in connection with method 600.)

Action 710 includes supplying a sequence of calibration patterns to a light modulation unit of the CI device (e.g., the light modulation unit 110), where the light modulation unit includes an array of light modulating elements, e.g., as variously described above.

Action 715 includes modulating an incident light stream with the sequence of calibration patterns to produce a modulated light stream, e.g., as variously described above. (The modulating is performed by the light modulation unit.) The sequence of calibrations patterns is configured to effect a movement of a region along a one-dimensional path on the array of light modulating elements, where each of the calibration patterns corresponds a different position of the region along the one-dimensional path, e.g., as variously described above.

Action 720 includes acquiring a sequence of the frames from an array of light sensing elements, wherein each of the light sensing elements is configured to receive a respective spatial portion of the modulated light stream, wherein each of the frames of the acquired sequence corresponds to a respective one of the calibration patterns, wherein each of the frames includes one sample from each of the light sensing elements. In some embodiments, the CI device may include a readout integrated circuit to read frames of samples from the light sensing array. See U.S. application Ser. No. 13/197,304 for more information on circuitry for reading frames of samples (or "groups of samples in the parlance of that application) from a light sensing array.

Action 725 includes determining a sequence of sum values, wherein each of the sum values is determined by adding the samples in a respective one of the frames of the acquired sequence. The sum is over the array of light sensing elements. Processing unit 150 may be configured to performing this summing action.

Action 730 includes operating on the sequence of sum values to determine a focus indicator value, wherein the focus indicator value indicates an extent to which the incident light stream is in focus along the one-dimensional path.

Method 800

Figure 8:
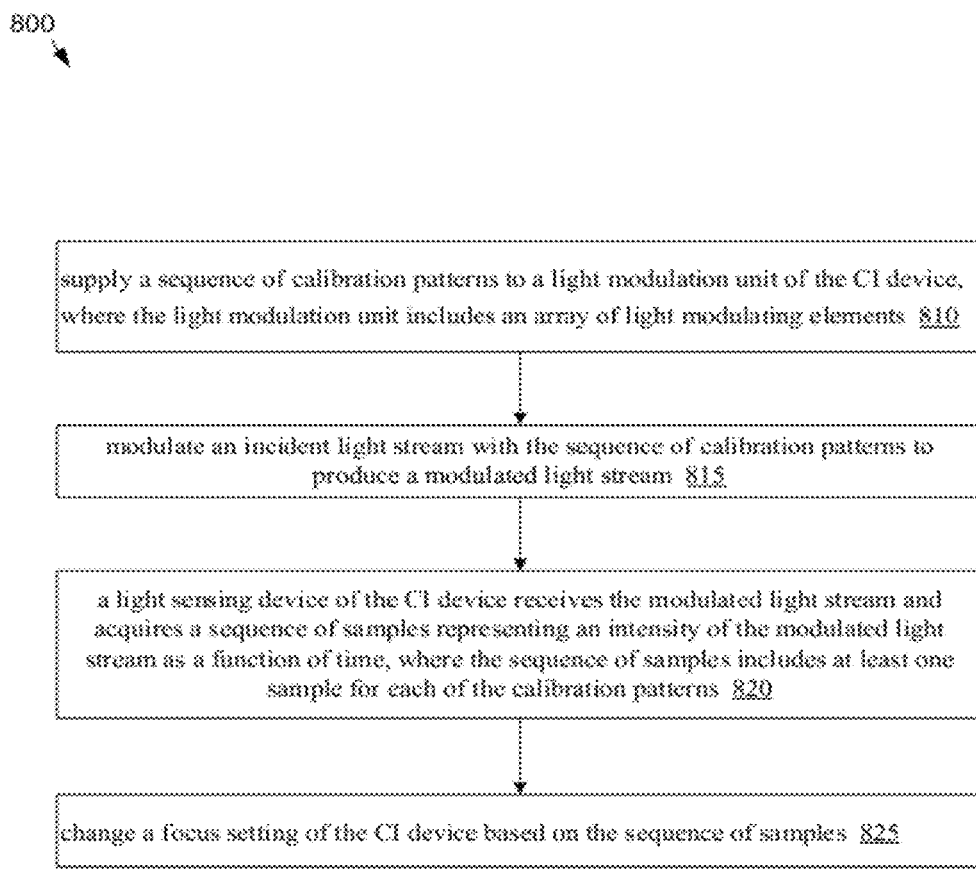
FIG. 8 illustrates an embodiment of a method 800 for changing a focus setting of a compressive imaging device based on samples acquired from the light sensing device.

In one set of embodiments, a method 800 for focusing a compressive imaging (CI) device may include the actions shown in FIG. 8. (Furthermore, method 800 may also include any subset of the actions, embodiments and features described above in connection with method 600 and method 700.)

Action 810 includes supplying a sequence of calibration patterns to a light modulation unit of the CI device, e.g., as variously described above. The light modulation unit includes an array of light modulating elements, e.g., as variously described above.

Action 815 includes modulating an incident light stream with the sequence of calibration patterns to produce a modulated light stream, e.g., as variously described above.

At 820, a light sensing device of the CI device (e.g., light sensing device 130) receives the modulated light stream and acquires a sequence of samples representing an intensity of the modulated light stream as a function of time, where the sequence of samples includes at least one sample for each of the calibration patterns.

Action 825 includes changing a focus setting of the CI device based on the sequence of samples.

In some embodiments, the focus setting of the CI device includes an optical distance between an optical subsystem of the CI device (e.g., the optical subsystem 105 described above) and the light modulation unit 110.

In some embodiments, the focus setting of the CI device includes a focus setting of an optical subsystem of the CI device (e.g., of the optical subsystem 105 described above).

In some embodiments, the method 800 may include repeating actions 810 through 825 until a focus metric based on the sequence of samples (in the most recent iteration of 810 through 825) is optimized.

In some embodiments, the sequence of calibrations patterns is configured to effect the movement of a region along a one-dimensional path on a surface of the light modulation unit, wherein each of the calibration patterns corresponds a different position of the region along the one-dimensional path.

Display Acquired 1-D Image and Let User Control Focus Adjustment

In one set of embodiments, a method 900 for focusing a compressive imaging (CI) device may include the actions shown in FIG. 9. (Furthermore, method 900 may also include any subset of the actions, embodiments and features described above in connection with method 600, method 700 and method 800.)

Action 910 includes supplying a sequence of calibration patterns to a light modulation unit of the CI device, wherein the light modulation unit includes an array of light modulating elements, e.g., as variously described above.

Action 915 includes modulating an incident light stream with the sequence of calibration patterns to produce a modulated light stream, e.g., as variously described above. The sequence of calibrations patterns is configured to effect a movement of a region along a one-dimensional path on the light modulation unit, wherein each of the calibration patterns corresponds a different position of the region along the one-dimensional path, e.g., as variously described above.

At 920, a light sensing device of the CI device receives the modulated light stream and acquires a sequence of samples representing an intensity of the modulated light stream as a function of time, where the sequence of samples includes at least one sample for each of the calibration patterns.

Action 925 includes displaying a one-dimensional image on a display (e.g., a display as variously described above). The one-dimensional image is based on the sequence of samples. In cases where one exactly one sample is acquired per calibration pattern, the sequence of samples may serve as the one-dimensional image. In cases where two or more samples are acquired per calibration pattern, the two or more samples per calibration pattern may be reduced to one refined sample per calibration pattern, e.g., by averaging the two or more samples, and/or, discarding any of the two or more samples that correspond to pattern-transition transients. The refined samples, one per calibration pattern, may be used as the one-dimensional image. See U.S. application Ser. No. 13/207,258 for more information on such averaging.

Action 930 includes adjusting a focus setting of the CI device based on user input. The user input may specify the direction and/or magnitude of the focus setting adjustment. For example, the CI device (e.g., system 100 in any of its various embodiments) may include a graphical user interface (GUI) or other interface to allow the user to specify focus adjustments. In some embodiments, the CI device may include a set of one or more physical input devices such as buttons, knobs, sliders and dials, or, one or more GUI equivalents thereof.

In some embodiments, the focus setting of the CI device is a focus setting of an optical subsystem of the CI device (e.g., optical subsystem 105).

In some embodiments, the focus setting of the CI device is an optical distance between an optical subsystem of the CI device (e.g., optical subsystem 105) and the light modulation unit.

In some embodiments, method 900 may include performing actions 910 through 930 a plurality of times.

In some embodiments, method 900 may include receiving user input specifying a position and/or orientation of the one-dimensional path on the array of light modulating elements.

Focusing External Light on the Modulator Using Reconstructed Images

Figure 10:
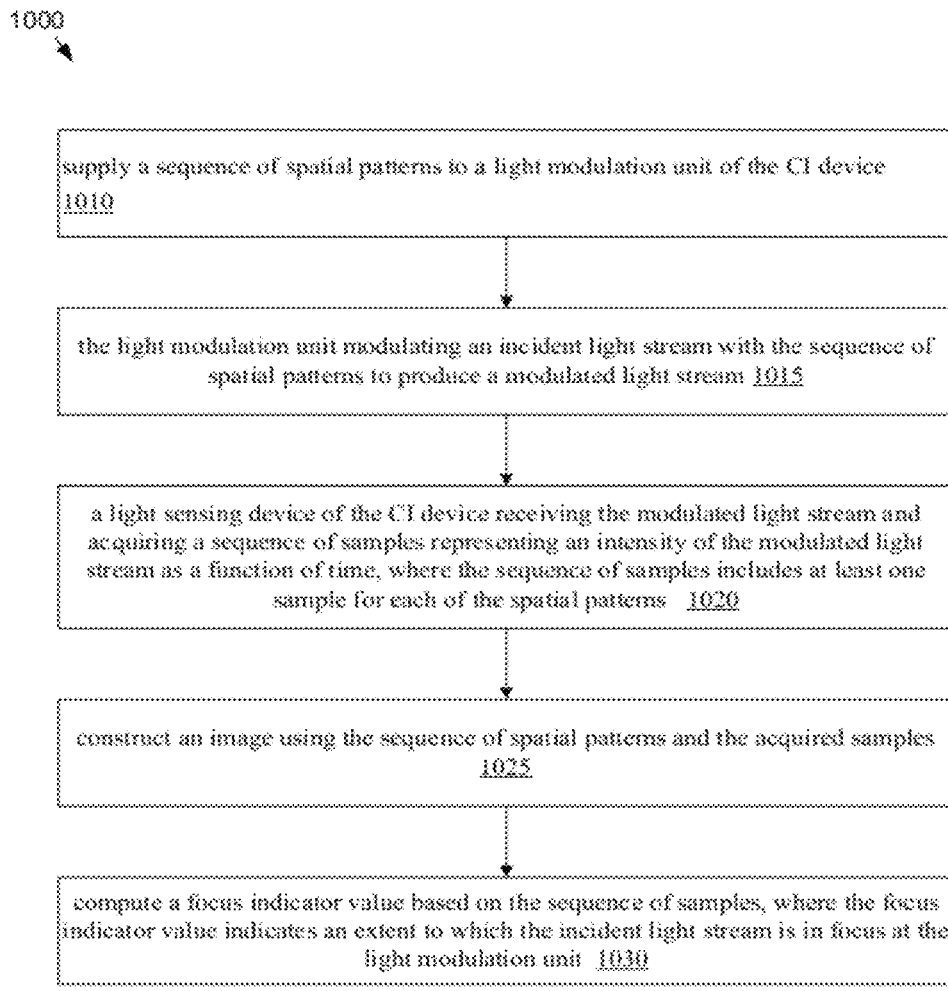
FIG. 10 illustrates an embodiment of a method 1000 for computing focus-related information based on algorithmically constructing an image.

In one set of embodiments, a method 1000 focusing a compressive imaging (CI) device may include the actions shown in FIG. 10. (Furthermore, method 1000 may include any subset of the actions, embodiments and features described above in connection with methods 600, 700, 800 and 900.)

Action 1010 includes supplying a sequence of spatial patterns to a light modulation unit of the CI device (e.g., the light modulation unit 110 as described above). The light modulation unit includes an array of light modulating elements, e.g., as variously described above.

Action 1015 includes modulating an incident light stream with the sequence of spatial patterns to produce a modulated light stream, e.g., as variously described above. (The modulating action is performed by the light modulation unit.)

At 1020, a light sensing device of the CI device (e.g., the light sensing device 130 as described above) receives the modulated light stream and acquires a sequence of samples $\{I(k)\}$ representing an intensity of the modulated light stream as a function of time, e.g., as variously described above. The sequence of samples includes at least one sample for each of the spatial patterns.

Action 1025 includes constructing an image using the sequence of spatial patterns and the acquired samples, e.g., using any image construction algorithm known in the field compressive sensing. The spatial patterns used to modulate the incident light stream are preferably drawn from a set of measurement vectors that is incoherent with respect to a sparsity vector set that is used to perform the image construction. The image may be two-dimensional image. (However, in alternative embodiments, the image may be a one-dimensional image.)

In some embodiments, the image is an n-pixel image with n less than the number N of light modulating elements in the light modulation unit, and the number m of spatial patterns in the sequence of spatial patterns is less than n. The compression ratio m/n may be different in different embodiments. For example, in different sets of embodiments, the compression ratio m/n may, respectively be less than or equal to 0.9, less than or equal to 0.8, less than or equal to 0.7, less than or equal to 0.6, less than or equal to 0.5, less than or equal to 0.4, less than or equal to 0.3, less than or equal to 0.2, less than or equal to 0.1, less than or equal to 0.05, less than or equal to 0.025.

Action 1030 includes computing a focus indicator value based on the constructed image, where the focus indicator value indicates an extent to which the incident light stream is in focus at the light modulation unit (i.e., the array of light modulating elements).

In some embodiments, the focus indicator may be computed by evaluating a focus metric on the image, e.g., a focus metric based on a measure of frequency content (such as might be derived from a Fourier transform of the image), global variance, Sobel Tenenbaum's Algorithm, Boddeke's Algorithm, any estimate of the second derivative (e.g., using the Laplacian Operator or a numerical second difference), an estimate of the gradient in the image, an estimate of the variance or a function on the data such as the variance of the gradient or variance of the second derivative, a threshold absolute gradient and/or threshold squared gradient, Tenenbaum gradient, etc. (This list is not meant to be limiting. Indeed, a wide variety of other focus metrics may be used.) In some embodiments, the focus indicator value may be a combination (e.g., a functional combination or average or minimum or maximum or a statistic) of a combination of two or more focus metrics evaluated on the image.

In some embodiments, each of the spatial patterns is restricted to a subset S of the array of light modulating elements. By restricting the spatial patterns to a subset of the light modulating array, the number of spatial patterns $m_R$ (and corresponding samples) required to construct the image (of action 1025) decreases with respect to the number that would be required if the spatial patterns were free to vary over the whole light modulating array. Here the term "restriction" of a spatial patterns to a subset S of the light modulating array means that the spatial pattern is null (or zero) outside the subset S.

In some embodiments, the subset S is a contiguous two-dimensional region of the array. (However, in alternative embodiments, the subset S may be a one-dimensional region.)

In some embodiments, the subset S is a union of contiguous regions of the light modulating array.

In some embodiments, the subset S is a user-specified region of interest. The CI device may include a graphical user interface for specifying the region of interest.

In some embodiments, the subset S corresponds to a region of interest determined based on an analysis of a previously-acquired image (i.e., an image that has been previously constructed based on previously acquired samples.)

In some embodiments, the subset S is a convex region located at the center of the light modulating array.

Method 1000 may be performed to enable focusing of the CI device. The compression ratio m/n used when executing method 1000 for focusing based on subset S may the same as (or on the same order of magnitude) as the compression ratio M/N used when acquiring full scale images, e.g., during normal operational mode as a compressive imager. Larger values of M/N imply reconstructed images of higher quality, and thus, small deviations from best focus may be more perceptible. Thus, when the CI device uses larger values of M/N, it may also use larger values of m/n during the focusing procedure based on subset S, so that the focus image generated at 1025 may be of commensurate quality. Thus, any focusing procedure based on the focus image will be able to converge closer to the state of best focus.

In some embodiments, the CI device includes the optical subsystem 105 as described above. The optical subsystem 105 receives and operates on the incident light stream prior to the incident light stream arriving at the light modulation unit.

In some embodiments, method 1000 may include changing a focus setting of the optical subsystem 105 based on data including the focus indicator value.

In some embodiments, method 1000 may include repeatedly performing a set of operations, where the set of operations includes: changing a focus setting of the optical subsystem 105; and performing actions 1010 through 1030. The set of operations may be repeated until the focus indicator value becomes less than a threshold value. The threshold value may be different in different embodiments.

In some embodiments, the method 1000 may include changing an optical distance between the optical subsystem 105 and the light modulation unit 110 (i.e., the optical path length of the incident light stream between the optical subsystem 105 and the light modulation unit 110) based on data including the focus indicator value. As described above, the optical distance may be changed by translating the light modulation unit 110. Alternatively, the optical distance may be changed by translating the optical subsystem 105.

In some embodiments, the method 1000 may include repeatedly performing a set of operations, where the set of operations includes: changing an optical distance between the optical subsystem 105 and the light modulation unit 110; and performing actions 1010 through 1030. The set of operations may be repeated until the focus indicator value becomes less than a threshold value.

In some embodiments, the method 1000 may include changing an optical path length between the light modulation unit and the light sensing device based on a final distance between the light modulation unit and the optical subsystem after the focus indicator value becomes less than the threshold value.

In some embodiments, the method 1000 may include changing an angle of orientation of the light modulation unit based on data including the focus indicator value.

In some embodiments, the method 1000 may also include: directing an actuator to change an optical distance between the optical subsystem and the light modulation unit according to a first displacement value; performing actions 1010 through 1030 a second time (e.g., using the same subset S of the light modulating array), in order to obtain an additional image and a focus indicator value for the additional image; and computing a second displacement value for the optical distance based on data including the focus indicator value for the image, the focus indicator value for the additional image and the first displacement value. (As described above, the displacement values may variable in size and direction, or, perhaps only in direction.) The method 1000 may also include directing the actuator to change the optical distance according to the second displacement value.

In some embodiments, the method 1000 may also include: directing an actuator to change a focus setting of the optical subsystem 105 according to a first displacement value; performing actions 1010 through 1030 a second time (e.g., using the same subset S of the light modulating array), in order to obtain an additional image and a focus indicator value for the additional image; and computing a second displacement value for the focus setting based on data including the focus indicator value for the image, the focus indicator value for the additional image and the first displacement value. The method 1000 may also include directing the actuator to change the focus setting of the optical subsystem according to the second displacement value.

In some embodiments, the method 1000 may also include: directing an actuator to change an optical distance between the optical subsystem and the light modulation unit through a range of distances; performing actions 1010 through 1030 for each of a plurality of optical distances within the range in order to obtain a corresponding plurality of images and a corresponding plurality of focus indicator values (e.g., with the array subset S being held constant for the plurality of distances); and determining an optimal value for the optical distance based on an analysis of data including the focus indicator values (and in some embodiments, also the corresponding optical distances). As described above, the optimal value may be determined by maximizing (or minimizing) the function of optical distance defined by the focus indicator values. The actuator may then be directed to change the optical distance to the optimal value.

In some embodiments, the method 1000 may also include: directing an actuator to change the focus setting of the optical subsystem 105 through a range of settings; performing actions 1010 through 1030 for each of a plurality of focus settings within the range in order to obtain a corresponding plurality of images and a corresponding plurality of focus indicator values (e.g., with the array subset S being held constant for the plurality of settings); and determining an optimal value for the focus setting based on an analysis of data including the plurality of focus indicator values (and in some embodiments, also the corresponding focus settings). As described above, the optimal value may be determined by maximizing (or minimizing) the function of focus setting defined by the focus indicator values. The actuator may then be directed to change the focus setting to the optimal value.

In some embodiments, the light sensing device includes a plurality of light sensing elements, where each of the light sensing elements generates a respective electrical signal representing intensity of a respective spatial portion of the modulated light stream. The action of acquiring the sequence of samples {I(k)} (referred to at 1020 of FIG. 10) may include adding the electrical signals to obtain a sum signal and sampling the sum signal. In one embodiment, the CI device includes one A/D converter to sample the sum signal and also one A/D converter per light sensing element (to sample the respective electrical signals). Thus, with L light sensing elements, the CI device may include L+1 A/D converters. However, other embodiments may include fewer A/D converters.

In some embodiments, the action of acquiring the sequence of samples comprises sampling each of the electrical signals and adding the sampled versions of the electrical signals in the digital domain.

In some embodiments, the light sensing device includes only one light sensing element.

Method 1100

Figure 11:
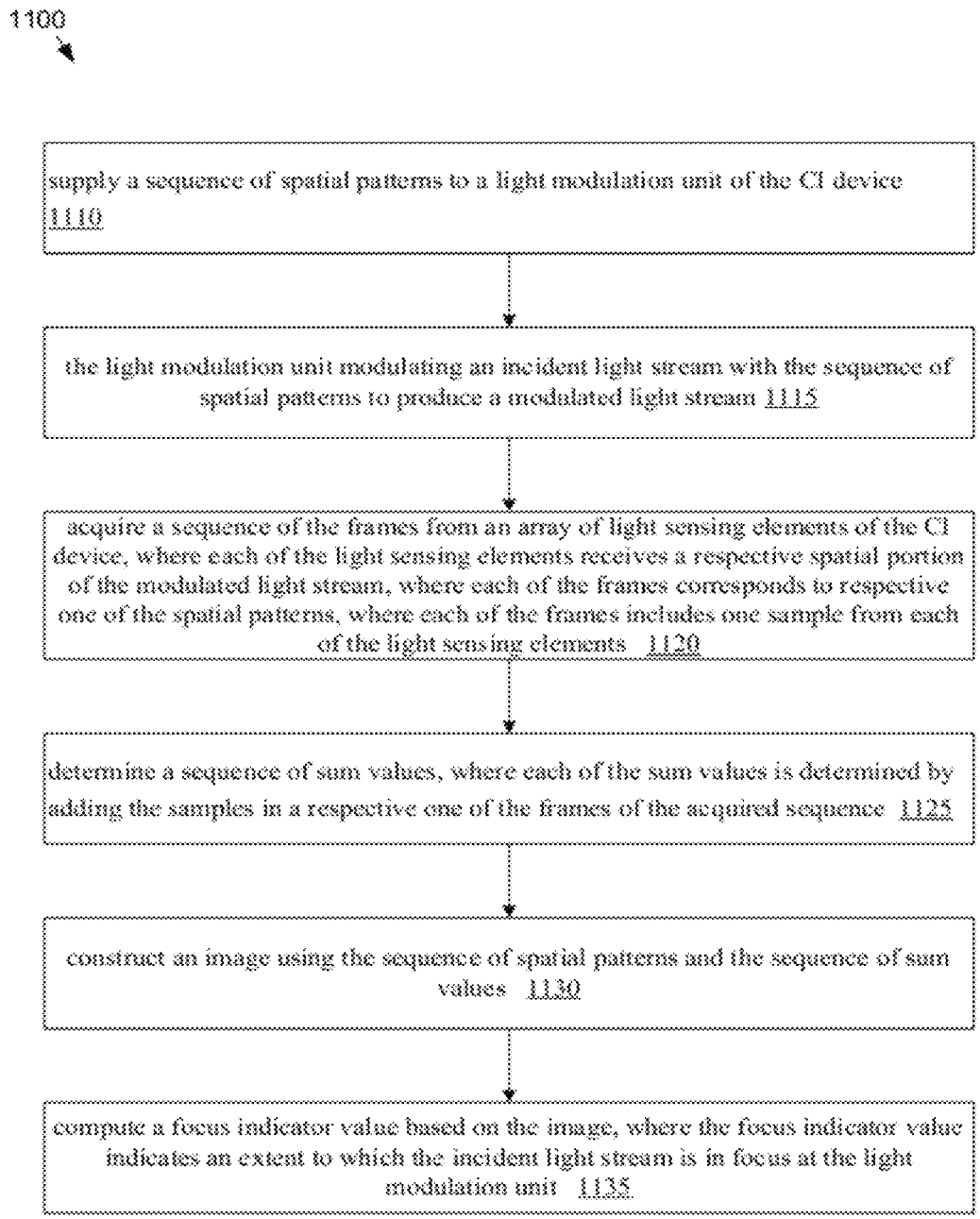
FIG. 11 illustrates an embodiment of a method 1100, also involving algorithmic construction of an image, and use of an array of light sensing elements.

In one set of embodiments, a method 1100 may include the actions shown in FIG. 11. (Furthermore, method 1100 may include any subset of the actions, embodiments and features described above in connection with methods 600, 700, 800, 900 and 1000.)

Action 1110 may include supplying a sequence of spatial patterns to a light modulation unit of the CI device (e.g., the light modulation unit 110 as described above).

Action 1115 may include modulating an incident light stream with the sequence of spatial patterns to produce a modulated light stream. (The modulating action is performed by the light modulation unit.)

Action 1120 may include acquiring a sequence of the frames from an array of light sensing elements of the CI device. Each of the light sensing elements receives a respective spatial portion of the modulated light stream. Each of the frames corresponds to respective one of the spatial patterns. Furthermore, each of the frames includes one sample from each of the light sensing elements.

Action 1125 may include determining a sequence of sum values, wherein each of the sum values is determined by adding the samples in a respective one of the frames of the acquired sequence.

Action 1130 may include constructing an image using the sequence of spatial patterns and the sequence of sum values, e.g., using any image reconstruction algorithm known in the field of compressive sensing.

Action 1135 may include computing a focus indicator value based on the image, where the focus indicator value indicates an extent to which the incident light stream is in focus at the light modulation unit (or in focus within the portion of the light modulation unit corresponding to the image).

Method 1200

In one set of embodiments, a method 1200 for determining focus-related information for a compressive imaging (CI) device includes the actions shown in FIG. 12. (Furthermore, method 1200 may include any subset of the actions, embodiments and features described above in connection with methods 600 through 1100.)

Action 1210 includes modulating an incident light stream with a sequence of spatial patterns, thereby generating a modulated light stream, e.g., as variously described above. The modulation is performed by a light modulation unit of the CI device (e.g., by the light modulation unit 110 as described above).

Action 1215 includes generating an electrical signal representing intensity of the modulated light stream as a function of time, where the electrical signal is generated by a light sensing device of the CI device (e.g., by the light sensing device 130 as variously described above).

Action 1220 includes acquiring samples of the electrical signal, e.g., as variously described above.

Action 1225 includes constructing an image using the sequence of spatial patterns and a subset of the acquired samples that corresponds to the sequence of spatial patterns. The subset includes at least one sample for each of the spatial patterns.

Action 1230 includes computing focus information based on the image, wherein the focus information comprises information regarding at extent to which the incident light stream is in focus at the light modulation unit.

In some embodiments, the image is an n-pixel image with n less than the number N of light modulating elements in the light modulation unit, and the number m of spatial patterns in the sequence of spatial patterns is less than n. The compression ratio m/n may be different in different embodiments. For example, in different sets of embodiments, the compression ratio m/n may, respectively be less than or equal to 0.9, less than or equal to 0.8, less than or equal to 0.7, less than or equal to 0.6, less than or equal to 0.5, less than or equal to 0.4, less than or equal to 0.3, less than or equal to 0.2, less than or equal to 0.1, less than or equal to 0.05, less than or equal to 0.025.

Furthermore, the ratio n/N may be different in different embodiments. For example, in different sets of embodiments, the ratio n/N may be, respectively, less than or equal to $1/2$, less than or equal to $1/4$, less than or equal to $1/8$, less than or equal to $1/16$, less than or equal to $1/32$, less than or equal to $1/64$, less than or equal to $1/128$, less than or equal to $1/256$, less than or equal to $1/512$, less than or equal to $1/1024$, less than or equal to $1/2048$, less than or equal to $1/4096$, less than or equal to $2^{-13}$, less than or equal to $2^{-14}$, less than or equal to $2^{-15}$.

In some embodiments, the method 1200 may also include changing an optical distance between an optical subsystem of the CI device (e.g., optical subsystem 105) and the light modulation unit based on the focus information, e.g., as variously described above.

In some embodiments, the method 1200 may also include changing a focus setting of the optical subsystem based on the focus information, e.g., as variously described above.

Display the Reconstructed Image and Let User Control Focus Adjustment

In one set of embodiments, a method 1300 for focusing a compressive imaging (CI) device may include the actions shown in FIG. 13. (Furthermore, method 1300 may include any subset of the actions, embodiments and features described above in connection with methods 600 through 1200.)

Action 1310 includes modulating an incident light stream with a sequence of spatial patterns to obtain a modulated light stream, e.g., as variously described above. The modulation is performed by a light modulation unit of the CI device (e.g., by the light modulation unit 110 as described above).

Action 1315 includes generating an electrical signal representing intensity of the modulated light stream as a function of time, where the electrical signal is generated by a light sensing device of the CI device (e.g., by the light sensing device 130 as described above).

Action 1320 includes acquiring samples of the electrical signal, e.g., as variously described above. The acquired samples include at least one sample for each of the spatial patterns.

Action 1325 includes constructing an image using the sequence of spatial patterns and the acquired samples, e.g., using any of the signal reconstruction methods known in the field of compressed sensing.

Action 1330 includes displaying the image on a display (e.g., a display of the CI device).

Action 1335 includes changing a focus setting of the CI device based on user input.

In some embodiments, the focus setting of the CI device is an optical distance between an optical subsystem of the CI device (e.g., optical subsystem 105) and the light modulation unit. In some embodiments, the focus setting of the CI device is a focus setting of the optical subsystem.

In some embodiments, the method 1300 may also include performing actions 1310 through 1335 one or more additional times.

Minimizing Spillover to Achieve Focus on Sensor Array

In one set of embodiments, a method for focusing a compressive imaging (CI) device may include the actions shown in FIG. 14A. (Furthermore, method 1400 may include any subset of the actions, embodiments and features described above in connection with system 100, system realization 200, and methods 600 through 1300.)

Action 1410 includes modulating an incident light stream with calibration patterns to obtain a modulated light stream. The modulation is performed by a light modulation unit of the CI device (e.g., the light modulation unit 110 as described above). The light modulation unit includes an array of light modulating elements.

At 1415, an array of light sensing elements of the CI device receives the modulated light stream. (The light sensing array may be as variously described above, or as variously described in U.S. patent application Ser. No. 13/197,304.) The light sensing elements receive respective spatial portions of the modulated light stream and generate respective electrical signals. Each electrical signal represents intensity of the respective spatial portion as a function of time. The light sensing elements correspond to respective non-overlapping regions within the array of light modulating elements. Each of the calibration patterns specifies that the light modulating elements inside a respective one of the regions are to be set to an OFF state and specifies that at least a subset of the light modulating elements outside the respective region are to be set to an ON state. For example, in the context of FIG. 2I, a calibration pattern corresponding to the top left quadrant of the light modulation unit might turn OFF the light modulating elements in the top left quadrant, and turn ON all (or at least some) of the light modulating elements in the remaining three quadrants. The number of calibrations patterns may be less than or equal to the number of light sensing elements in the array of light sensing elements.

The ON state or maximum transfer state of a light modulating element is the state in which the ratio of the intensity of the light portion outputted from the element (onto the path that leads to the light sensing array) to the intensity of the light portion incident upon the element is maximized, within the range of control supported by the element. (For example, for an element having controllable transmittance, such as an LCD shutter, the maximum transfer state is the state of maximum transparency. As another example, for a reflective element such as a micromirror in a DMD, the maximal transfer state is the orientation state that reflects the received light portion onto the sensing path 115.)

The OFF state or minimum transfer state of a light modulating element is the state in which the ratio of the intensity of the light portion outputted from the element (onto the path that leads to the light sensing array) to the intensity of the light portion incident upon the element is minimized, within the range of control supported by the element. (For example, for an element having controllable transmittance, such as an LCD shutter, the minimum transfer state is the state of minimum transparency, i.e., maximum blockage of light. As another example, for a reflective element such as a micromirror in a DMD, the minimum transfer state is the orientation state that reflects the received light portion away from the sensing path 115.)

As indicated at 1420, for each of the calibration patterns, a respective group of samples is acquired from the array of light sensing elements, e.g., as variously described above, and/or, as variously described in U.S. patent application Ser. No. 13/197,304. Each of the sample groups includes at least one sample of each of the electrical signals, i.e., one sample from each of the light sensing elements). (In some embodiments, two or more groups of samples may be acquired per calibration pattern. Corresponding samples in the two or more groups are averaged to obtain a refined sample group per calibration pattern, with the refined sample group including one refined sample per electrical signal. In these embodiments, the refined sample groups will substitute for the sample groups described in the operations below.)

Action 1425 includes determining spillover values corresponding respectively to the calibration patterns. Each of the spillover values is determined based on the sample group corresponding to the respective calibration pattern. Each of the spillover values indicates an extent to which modulated light from outside the respective region of the array of light modulating elements reaches the light sensing element corresponding to the respective region. For example, a first of the spillover values indicates an extent to which modulated light from light modulating elements outside a first of the regions (of the light modulating array) reaches a first of the light sensing elements. In the context of FIG. 2I, the first spillover value may correspond to a first calibration pattern that turns ON only the second, third and fourth quadrants of the light modulating array. The first spillover value may be determined simply by extracting the sample from the sample group that corresponds to the light sensing device of the first quadrant. That sample indicates how much light has spilled over from the second, third and fourth quadrants.

Action 1430 includes computing a composite spillover value for the array of light sensing elements based on the spillover values. In some embodiments, the composite spillover value may be computed based on an average (or a maximum or a statistic) of the spillover values.

In some embodiments, method 1400 may also include directing an actuator to change an optical distance between the light modulation unit and the array of light sensing elements based on data including the composite spillover value. The optical distance may be changed, e.g., by translating the array of light sensing elements along the axis of the modulated light stream.

In some embodiments, the method 1400 may include repeatedly performing a set of operations, wherein the set of operations includes changing the optical distance between the light modulation unit and the array of light sensing elements, and performing actions 1410 through 1430. The set of operations may be repeated until the composite spillover value is minimized or becomes less than a threshold value. The minimizing state of the optical distance may be interpreted as a state of optimal (or acceptable) focus. In some embodiments, having achieved this minimization, another one of the focus methods described herein may be used to further improve the state of focus.

In some embodiments, the method 1400 may also include directing an actuator to change an angle of orientation of the array of light modulating elements based on data including the composite spillover value.

In some embodiments, the method 1400 may include repeatedly performing a set of operations, where the set of operations includes changing the angle of orientation of the array of light sensing elements, and performing actions 1410 through 1430. The set of operations may be repeated until the composite spillover value is minimized or becomes less than a threshold value.

In some embodiments, each calibration pattern specifies that the light modulating elements within the respective region are to take the OFF state and that the light modulating elements outside the respective region are to take the ON state.

Generic Step of an Adaptive Algorithm

In some embodiments, the method 1400 may also include: directing an actuator to change the optical distance between the light modulation unit and the array of light sensing elements according to a first displacement value; performing actions 1410 through 1430 a second time, in order to obtain an additional composite spillover value (after the actuator has changed the optical distance); and computing a second displacement value for the optical distance based on data including the composite spillover value, the additional composite spillover value and the first displacement value. (In some embodiments, the displacement values may vary in direction and magnitude. In other embodiments, the displacement values may be unit steps, varying only in direction.) The actuator may then be directed to change the optical distance according to the second displacement value.

In some embodiments, the method 1440 may also include: directing an actuator to change the angle of orientation of the array of light sensing elements according to a first displacement value; performing actions 1410 through 1430 a second time, in order to obtain an additional composite spillover value (after the actuator has changed the angle of orientation); and computing a second displacement value for the angular orientation based on data including the composite spillover value, the additional composite spillover value and the first displacement value. (In some embodiments, the actuator allows variable-sized steps. In other embodiments, the actuator may allow only unit-sized steps.) The actuator may then be directed to change the angle of orientation of the array of light sensing elements according to the second displacement value.

Batch Algorithm

In some embodiments, the method 1400 may include: directing an actuator to change the optical distance between the light modulation unit and the array of light sensing elements through a range of distances; performing actions 1410 through 1430 for each of a plurality of optical distances within the range in order to obtain a corresponding plurality of composite spillover values; and determining an optimal value for the optical distance based on an analysis of data including the plurality of composite spillover values (and in some embodiments, also the plurality of optical distances). The actuator may then be directed to change the distance to the optimal value. The optimal value may be determined, e.g., by minimizing the function of optical distance given by the composite spillover values and the plurality of optical distances.

In some embodiments, the method 1400 may include: directing an actuator to change the orientation angle of the array of light sensing elements through a range of angles; performing actions 1410 through 1430 for each of a plurality of angles within the range in order to obtain a corresponding plurality of composite spillover values; and determining an optimal value for the angle based on an analysis of data including the plurality of composite spillover values (and in some embodiments, also the plurality of angles). The actuator may then be directed to change the angular orientation to the optimal value. The optimal value may be determined, e.g., by minimizing the function of angle given by the composite spillover values and the plurality of angles).

In some embodiments, the number of the calibration patterns is four. In one embodiment, the four regions of the light modulating array that correspond to the four calibration patterns are located at (or near) the four corners of the light modulating array.

In some embodiments, the number of regions of the light modulating array (which is the same as the number of light sensing elements) is large enough so that not all the regions are in contact with the boundary of the light modulating array. For example, with a 4×4 matrix of regions, there is a 2×2 submatrix of regions in the interior, not contacting any of the boundary of the light modulating array. In some embodiments, the regions corresponding to the calibration patterns are interior regions of the light modulating array, i.e., regions not touching the boundary of the light modulating array.

Figure 21:
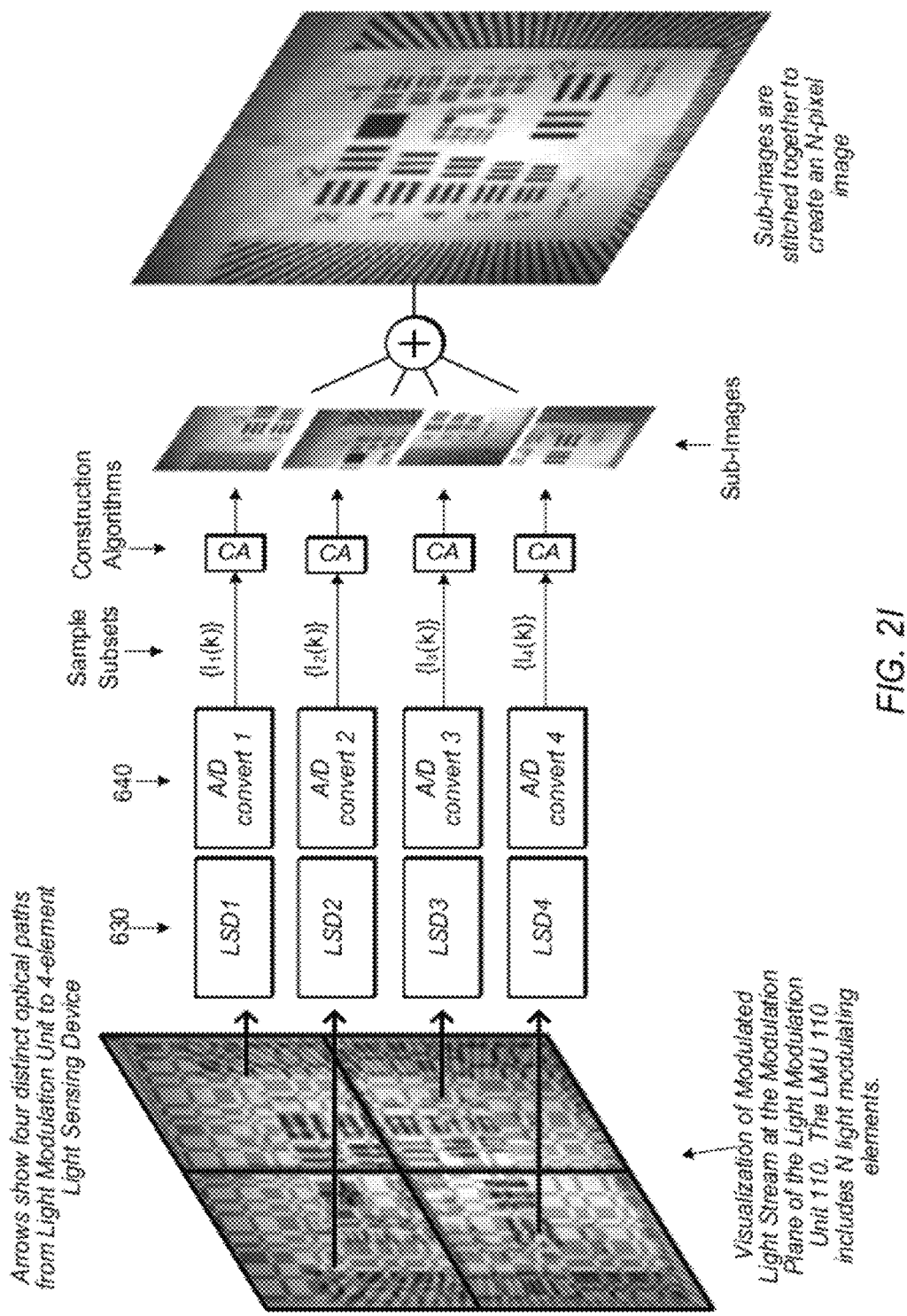
FIG. 21 illustrates an embodiment of system 2100 including a range finder.
Figure 14B:
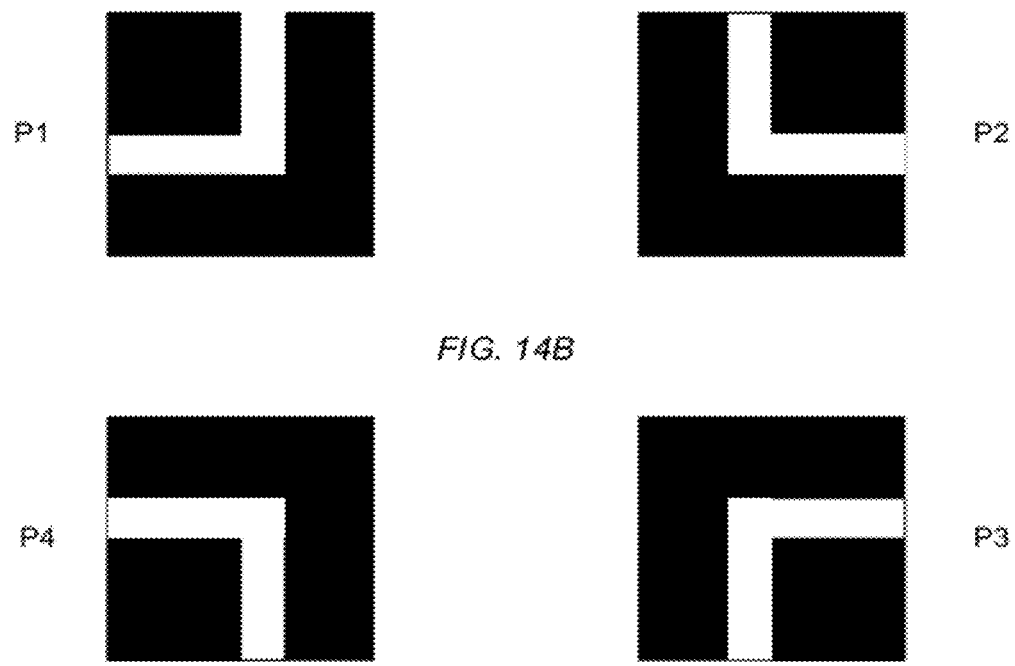
FIG. 14B illustrates a set of patterns, according to one embodiment, that may be used to determine spillover values for a 2×2 array of light sensing devices.

FIG. 14B illustrates one embodiment of the calibration patterns in the case where there are four light sensing elements arranged in a 2×2 array, e.g., as shown in FIG. 21. Each of the calibration patterns P1-P4 is turned OFF in a respective quadrant of the light modulating array, and is turned ON along portions of the remaining quadrants that bound the respective quadrant. This principle of pattern creation generalizes to any number of regions.

Method 1500: Single Calibration Pattern—Single Spillover Value

In one set of embodiments, a method 1500 may include the actions shown in FIG. 15. (Furthermore, method 1500 may include any subset of the actions, embodiments and features described above in connection with system 100, system realization 200 and methods 600 through 1400.)

Action 1510 includes modulating an incident light stream with a calibration pattern to obtain a modulated light stream. The action of modulating the incident light stream is performed by a light modulation unit of the CI device (e.g., by the light modulation unit 110 as described above). The light modulation unit includes an array of light modulating elements.

At 1515, an array of light sensing elements of the CI device receiving the modulated light stream, where the light sensing elements receive respective spatial portions of the modulated light stream and generate respective electrical signals, where each electrical signal represents intensity of the respective spatial portion as a function of time, where the light sensing elements correspond to respective non-overlapping regions within the array of light modulating elements, where the calibration pattern specifies that the light modulating elements inside a particular one of the regions are to be set to an off state and specifies that at least a subset of the light modulating elements outside the particular region are to be set to an on state. The particular region corresponds to a particular one of the light sensing elements.

Action 1520 includes acquiring samples of the electrical signal generated by the particular light sensing element in response to said modulating the incident light stream with the calibration pattern. Each of the samples indicates an extent to which modulated light from outside the particular region of the array of light modulating elements reaches the particular light sensing element. Thus, each of the samples may be interpreted as a measure of spillover S. In some embodiments, the samples or a subset of the samples may be averaged, and the average may be used as the measure of spillover S.

Any subset of the embodiments described above in connection with method 1400 may be incorporated into method 1500, with the provision that the "composite spillover" of method 1400 is replaced by the spillover measure S mentioned above.

Alternative Spillover Measurement

In one set of embodiments, a method for focusing a compressive imaging (CI) device may include the following actions. (Any subset of the embodiments described above in connection with method 1400 may be incorporated into this method. Furthermore, any subset of the actions, embodiments, features described in this patent may be incorporated into this method.)

An incident light stream may be modulated with calibration patterns to obtain a modulated light stream. The action of modulating is performed by a light modulation unit of the CI device (e.g., the light modulation unit 110 as described above). The light modulation unit includes an array of light modulating elements.

An array of light sensing elements of the CI device receives the modulated light stream. Each of the light sensing elements receives a respective spatial portion of the modulated light stream and generates a respective electrical signal representing intensity of the respective spatial portion as a function of time. The calibration patterns correspond to respective regions of the array of light modulating elements and correspond to respective ones of the light sensing elements. Each of the calibration patterns specifies that at least a subset of the light modulating elements inside the respective region are to be set to an on state and specifies that the light modulating elements outside the respective region are to be set to an off state. The regions are preferably non-overlapping regions of the light modulating array. The number of calibrations patterns may be less than or equal to the number of light sensing elements in the array of light sensing elements.

For each of the calibration patterns, a respective group of samples is acquired from the array of light sensing elements. Each of the sample groups includes at least one sample of each of the electrical signals, i.e., one sample from each of the light sensing elements. (In some embodiments, a two are more sample groups are acquired per calibration pattern, in which case corresponds samples in the two or more sample groups may be averaged to obtain a refined sample group, the refined sample groups containing one refined (averaged) sample per light sensing device.)

Spillover values are computed, where the spillover values correspond respectively to the calibration patterns. Each of the spillover values is computed based on the sample group corresponding to the respective calibration pattern. Each of the spillover values indicates an extent to which modulated light from the respective region of the array of light modulating elements reaches light sensing elements of the array other than the respective light sensing element. For example, a first of the spillover values indicates an extent to which modulated light from a first one of the regions of the light modulating array reaches light modulating elements other than a first of the light sensing elements. In the context of FIG. 2I, the first spillover value may correspond to a calibration pattern that turns on light modulating element only in the first quadrant. The first spillover value may be computed by summing the samples of the sample group corresponding to the light sensing devices for quadrants two, three and four.

A composite spillover value may be computed for the array of light sensing elements based on the spillover values. In some embodiments, the composite spillover value may be computed based on an average (or a maximum or a statistic) of the spillover values.

In some embodiments, each of the calibration patterns specifies that all the light modulating elements within the respective region are to take an ON state.

In one set of embodiments, a method for focusing a compressive imaging (CI) device may include the following actions. (Any subset of the embodiments described above in connection with method 1400 may be incorporated into this method. Furthermore, any subset of the actions, embodiments, features described in this patent may be incorporated into this method.)

An incident light stream is modulated with a calibration pattern to obtain a modulated light stream. The operation of modulating is performed by a light modulation unit of the CI device (e.g., by the light modulation unit 110 as described above). The light modulation unit includes an array of light modulating elements.

An array of light sensing elements of the CI device receives the modulated light stream. Each of the light sensing elements receives a respective spatial portion of the modulated light stream and generates a respective electrical signal representing intensity of the respective spatial portion as a function of time. The calibration pattern corresponds to a region of the array of light modulating elements and to one of the light sensing elements. Furthermore, the calibration pattern specifies that at least a subset of the light modulating elements within the region are to be set to the on state, and specifies that the light modulating elements outside the region are to be set to the off state.

A group of samples corresponding to the calibration pattern is acquired, wherein the sample group includes at least one sample of each of the electrical signals.

A spillover value for the calibration pattern is computed. The spillover value is computed based on the sample group and indicates an extent to which modulated light (i.e., light of the modulated light stream) from the region of the array of light modulating elements reaches light sensing elements other than the corresponding light sensing element (i.e., the element that corresponds to the region and the calibration pattern).

Measuring Noise in Reconstructed Sub-Images Corresponding to Respective Light Sensing Elements In one set of embodiments, a method 1640 for determining focus-related information for a compressive imaging (CI) device may include the actions shown in FIG. 16A. (Furthermore, method 1640 may include any subset of the actions, embodiments and features described herein, and especially, in connection with methods 600 through 1500.)

Action 1642 includes modulating an incident light stream with a sequence of spatial patterns to obtain a modulated light stream. The modulation is performed by a light modulation unit of the CI device. The light modulation unit includes an array of light modulating elements. The light sensing elements correspond to respective non-overlapping regions on the array of light modulating elements (e.g., as suggested in FIG. 2I). The spatial patterns may each have the same number of elements as the light modulating array.

At 1644, the array of light sensing elements of the CI device receiving the modulated light stream, where the light sensing elements receive respective spatial portions of the modulated light stream and generate respective electrical signals, where each of the electrical signals represents intensity of the respective spatial portion as a function of time.

Action 1646 includes acquiring measurements from the array of light sensing elements, where the measurements include sample sets that correspond respectively to the light sensing elements, where each sample set includes samples of the electrical signal generated by the respective light sensing element, with the samples including at least one (e.g., exactly one) sample for each of the spatial patterns;

Action 1648 includes computing a focus indicator value based on two or more noise values for two or more respective ones of the light sensing devices. The focus indicator value indicates an extent to which the modulated light stream is in focus at the sensor array. The focus indicator value may be determined by computing an average (or a maximum or a statistic) of the two or more noise values.

Each of the two or more noise values may be computed by: constructing a respective sub-image based on the sample set of the respective light sensing element and also on a restriction of the spatial patterns to the region (of the light modulating array) corresponding to the respective light sensing element; and computing an amount of noise present in the respective sub-image. (Here, the term "restriction" of a spatial pattern to a region means restriction of the domain of the spatial pattern so that the restricted pattern exists only on the region.)

For example, in the context of FIG. 2I, a first noise value may be computed by constructing a first sub-image based on the samples from the first light sensing element and the restriction of the spatial patterns to the first quadrant of the light modulating array (i.e., the quadrant that is supposed to supply the first light sensing element), and then computing an amount of noise present in the first sub-image.

The noise value for a sub-image may be computed by evaluating a blind noise measure on the sub-image, "blind" meaning that the measure is evaluated without using a reference sub-image (an ideal sub-image of which the constructed sub-image is an approximation). Any of a wide variety of blind noise measures known in the field of image processing may be used. Alternatively, if a reference image is available, the noise value for the constructed sub-image may be determined, e.g., by computing a standard deviation (or a variance, or an average of absolute values, or a sum of absolute values) of pixel-wise differences between the constructed sub-image and the corresponding sub-image of the reference image. In some embodiments, the noise value may be determined based on averaging or summing values $f(|d_{i,j}|)$, where $\{d_{i,j}\}$ are the pixel differences and f is any increasing function. In some situations, a user may print and display a reference image and set up the reference image at a target distance from the CI device prior to the execution of method 1640.

Because each sub-image is computed based on a restriction of spatial patterns to the respective region, it has a pixel count equal to the element count of the region, which is smaller than the element count of the whole light modulating array.

In some embodiments, the method 1640 may also include: determining a displacement value for the array of light sensing elements based on data including the focus indicator value (e.g., a displacement for the position of the array along an axis of the modulated light stream); and directing the array of light sensing elements to be translated according to the displacement value. The light sensing array may be mounted on a translation stage that admits translation along an axis of the modulated light stream so as to increase and decrease the optical distance between the light modulation unit and the light sensing array.

In some embodiments, method 1640 may include: determining an angular displacement value for the array of light sensing elements based on data including the focus indicator value; and directing the array of light sensing elements to be rotated according to the angular displacement value. The light sensing array may be mounted on a rotation stage that admits one or more axes of rotation. If the light sensing array is initially not oriented correctly with respect to the modulated light stream, knowledge of the focus indicator value (and perhaps also one or more previously-determined focus indicator values, corresponding to one or more previous states of the orientation angle) may be used to correctly orient the light sensing array, e.g., so that the plane of the array is perpendicular to the axis of the modulated light stream.

In some embodiments, the method 1640 may also include changing an optical distance between the light modulation unit 110 and the array of light sensing elements, e.g., by translating the array of light sensing elements, as variously describe herein. The action of changing the optical distance and actions 1642 through 1648 may be performed one or more times until the focus indicator value is optimized (e.g., minimized).

In some embodiments, the method 1640 may also include changing an angular orientation of the array of light sensing elements. The actions of changing the angular orientation and actions 1642 through 1648 may be performed one or more times until the focus indicator value is optimized (e.g., minimized).

Measuring Noise in a Single Reconstructed Sub-Image

In some embodiments, a method for determining focus-related information for a compressive imaging (CI) device may include the following actions. (Furthermore, this method may include any subset of the actions, features and embodiments disclosed herein, e.g., as subset of the embodiments described in connection with method 1640.)

An incident light stream may be modulated with a sequence of spatial patterns to obtain a modulated light stream. The modulating is performed by a light modulation unit of the CI device, where the light modulation unit includes an array of light modulating elements.

An array of light sensing elements of the CI device receives the modulated light stream, where the light sensing elements receive respective spatial portions of the modulated light stream and generate respective electrical signals. Each of the electrical signals represents intensity of the respective spatial portion as a function of time. The light sensing elements correspond to respective non-overlapping regions of the array of light modulating elements. In other words, each light sensing element is supposed to receive light from the respective region of the light sensing array. However, until proper focus is achieved, significant amounts of light from regions other than the respective region may be received at the light sensing element.

A set of samples is acquired from a particular one of the light sensing elements. The sample set includes samples of the electrical signal generated by the particular light sensing element, with the samples including at least one sample (e.g., exactly one sample) for each of the spatial patterns.

A focus indicator value may be computed for the particular light sensing device. The focus indicator value indicates an extent to which the modulated light stream is in focus at the sensor array. The focus indicator value may be computed by: constructing a sub-image based on the sample set and on a restriction of the spatial patterns to the region of the array of light modulating elements that corresponds to the first light sensing element; and computing an amount of noise present in the sub-image. The noise amount may be taken as the focus indicator value.

The amount of noise may be computed in a blind fashion and/or using a reference, as variously described above.

Measuring Spillover in Reconstructed Images Corresponding to Respective Light Sensing Elements In one set of embodiments, a method 1660 for determining focus-related information for a compressive imaging (CI) device may include the actions shown in FIG. 16B. (Furthermore, method 1660 may include any subset of the actions, embodiments and features described herein, e.g., any subset of the actions, embodiments and features described in connection with methods 600 through 1640.)

Action 1662 includes modulating an incident light stream with a sequence of spatial patterns to obtain a modulated light stream, e.g., as variously described above. The action of modulating is performed by a light modulation unit of the CI device. The light modulation unit includes an array of light modulating elements.

Action 1664 includes an array of light sensing elements of the CI device receiving the modulated light stream, where the light sensing elements receive respective spatial portions of the modulated light stream and generate respective electrical signals, where each of the electrical signals represents intensity of the respective spatial portion as a function of time, where the light sensing elements correspond to respective non-overlapping regions on the array of light modulating elements.

Action 1666 includes acquiring measurements from the array of light sensing elements, where the measurements include sample sets that correspond respectively to the light sensing elements. Each sample set includes samples of the electrical signal generated by the respective light sensing element, with the samples including at least one (e.g., exactly one) sample for each of the spatial patterns.

Action 1668 includes computing a focus indicator value based on two or more spillover values for two or more respective ones of the light sensing devices, wherein the focus indicator value indicates an extent to which the modulated light stream is in focus at the sensor array. Each of the two or more spillover values is computed by: constructing a respective image based on the sample set of the respective light sensing element and also on the spatial patterns; and summing pixels in the image outside the region corresponding to the respective light sensing element.

Because each image is constructed using the spatial patterns without restriction of spatial domain, the pixel dimensions of the image are the same as the element dimensions of the light modulating array. (However, in alternative embodiments, the spatial patterns used to construct a given image may be restricted at least partially. For example, one might construct an image for a given light sensing device using patterns restricted to the corresponding region plus a boundary zone around the corresponding region.)

Figure 16C:
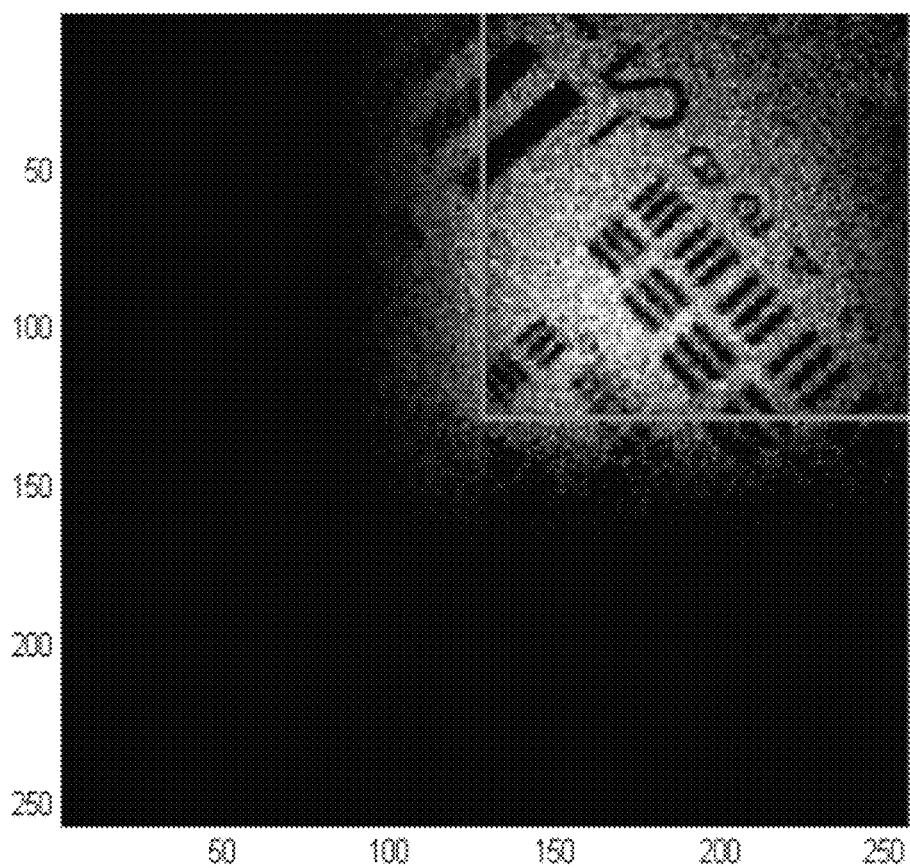
FIG. 16C illustrates an example of an algorithmically constructed image, based on the samples from a single one of the light sensing elements.

For example, in the context of FIG. 2I, a first spillover value for a first light sensing device may be computed by constructing an image based on the samples acquired by the first light sensing device, e.g., an image whose pixel dimensions agree with the element dimensions of the light sensing array. FIG. 16C shows such an image, where the first light sensing device corresponds to (is supposed to receive light from) the top right quadrant of the light modulating array. Portions of the image outside the top-right image quadrant are due to light spillover from the other quadrants of the light modulating array to the first light sensing device. Thus, the first spillover value may be determined by computing a sum of the pixels in the other three image quadrants (top left, bottom left and bottom right).

Any of various mechanisms for adjusting focus described herein may be included in this method.

Measuring Spillover in a Single Reconstructed Image Corresponding to a Single Light Sensing Element In one set of embodiments, a method for determining focus-related information for a compressive imaging (CI) device may include the following actions. (Furthermore, this method may include any subset of the actions, features and embodiments disclosed herein, e.g., as subset of the embodiments described in connection with methods 60 through 1660.)

An incident light stream may be modulated with a sequence of spatial patterns to obtain a modulated light stream. The action of modulating is performed by a light modulation unit of the CI device. The light modulation unit includes an array of light modulating elements.

An array of light sensing elements of the CI device receives the modulated light stream, where the light sensing elements receive respective spatial portions of the modulated light stream and generate respective electrical signals. Each of the electrical signals represents intensity of the respective spatial portion as a function of time. The light sensing elements correspond to respective non-overlapping regions on the array of light modulating elements, e.g., as variously described above.

Measurements are acquired from the array of light sensing elements. The measurements include sample sets that correspond respectively to the light sensing elements. Each sample set includes samples of the electrical signal generated by the respective light sensing element, with the samples including at least one (e.g., exactly one) sample for each of the spatial patterns.

A spillover value is computed for a particular one of the light sensing devices. The spillover value indicates an extent to which the modulated light stream is in focus at the sensor array (or at least at the particular light sensing device). The spillover value may be computed by: constructing an image based on the sample set corresponding to the particular light sensing element and also on the spatial patterns (so the pixel dimensions of the image are the same pixel dimensions of each spatial pattern); and summing pixels in the image outside the region corresponding to the particular light sensing element.

Focusing CI Device Using High Frequency Spatial Patterns

In one set of embodiments, a method 1700 for focusing a compressive imaging (CI) device may include the actions shown in FIG. 17. (Furthermore, method 1700 may include any subset of the actions, embodiments and features described in this patent.)

Action 1710 includes supplying a sequence of high-frequency spatial patterns to a light modulation unit of the CI device. The light modulation unit includes an array of light modulating elements, e.g., as variously described above. Each of the high-frequency spatial patterns is a spatial pattern whose spatial AC component includes only spatial frequencies greater than or equal to a cutoff frequency. In general, a spatial pattern—whether high-frequency or not—may be interpreted as an spatial array of scalar multipliers. See the above discussion of spatial patterns in connection with system 100. The AC component of a spatial pattern is the spatial pattern minus its DC value. The DC value is the average value of the spatial pattern. In some embodiments, each of the high-frequency spatial patterns is configured to have the same DC value.

Action 1715 includes modulating an incident light stream with the sequence of high-frequency spatial patterns to produce a modulated light stream. The modulation is performed a light modulation unit of the CI device (e.g., by the light modulation unit 110).

At 1720, a light sensing device of the CI device (e.g., the light sensing device 130 described above) receives the modulated light stream and acquires a sequence of samples representing an intensity of the modulated light stream as a function of time. The sequence of samples may include at least one sample for each of the high-frequency spatial patterns.

Action 1725 includes computing a focus indicator value based on the sequence of samples. The focus indicator value indicates an extent to which the incident light stream is in focus at the array of light modulating elements.

In some embodiments, each of the high-frequency spatial patterns corresponds to spatial sinusoid whose spatial frequency is greater than or equal to the cutoff frequency. For example, each high-frequency spatial pattern may be a DC-shifted sinusoid.

In some embodiments, the cutoff-frequency is programmable.

In some embodiments, a known image K may be printed (or otherwise displayed) and set up at a desired distance from the CI device. The CI device may be pointed at the printed image. Then method 1700, in any of its various embodiments, may be performed to focus the CI device on the printed image. The image K may be designed so that it has significant high-frequency (small wavelength) content. For example, the image K may include series of vertical and/or horizontal lines that are sharp and densely spaced. (Any of the various method embodiments described herein may likewise use a print out of a known image to facilitate determination of proper focus, e.g., during calibration of the CI device.)

In some embodiments, the CI device also includes an optical subsystem (e.g., the optical subsystem 105) that receives and operates on the incident light stream prior to the incident light stream arriving at the light modulation unit. Thus, the method 1700 may include changing a focus setting of the optical subsystem, e.g., based on data including the focus indicator value.

In some embodiments, the method 1700 may include repeatedly performing a set of operations, where the set of operations includes: changing a focus setting of the optical subsystem; and performing actions 1710 through 1725. The set of operations may be repeated until the focus indicator value becomes less than a threshold value.

In some embodiments, method 1700 may include changing an optical distance between the light modulation unit and the optical subsystem, e.g., based on data including the focus information. As variously described above, the optical distance may be changed by translating the light modulation unit, or alternatively, by translating the optical subsystem.

In some embodiments, the method 1700 may include repeatedly performing a set of operations, where the set of operations includes: changing an optical distance between the light modulation unit and the optical subsystem; and performing actions 1710 through 1725. The set of operations may be repeated until the focus indicator value becomes less than a threshold value.

In some embodiments, the method 1700 may also include: directing an actuator to change an optical distance between the optical subsystem and the light modulation unit according to a first displacement value; performing actions 1710 through 1725 a second time, to obtain an additional focus indicator value for an additional sequence of samples (e.g., using the same sequence of high-frequency spatial patterns); and computing a second displacement value for the optical distance based on data including the focus indicator value for the sequence of samples, the focus indicator value for the additional sequence of samples and the first displacement value. The actuator may then be directed to change the optical distance based on the second displacement value.

In some embodiments, the method 1700 may also include: directing an actuator to change a focus setting of the optical subsystem according to a first displacement value; performing actions 1710 through 1725 a second time, to obtain an additional focus indicator value for an additional sequence of samples (e.g., using the same sequence of high-frequency spatial patterns); and computing a second displacement value for the focus setting based on data including the focus indicator value for the sequence of samples, the focus indicator value for the additional sequence of samples and the first displacement value. The actuator may then be directed to change the focus setting of the optical subsystem according to the second displacement value.

In some embodiments, the action 1725 of computing the focus indicator value includes: removing a temporal DC component of the sequence of samples to obtain an AC sequence of samples; and computing an average magnitude of the AC sequence of samples. The average magnitude may be used as the focus indicator value. The temporal DC component may be removed, e.g., by highpass filtering the sequence of samples, or, by numerically computing the average value of the sequence and then subtracting the average value of each sample of the sequence.

Compressive Imaging Device with Time-of-Flight Determining Device

Figure 18:
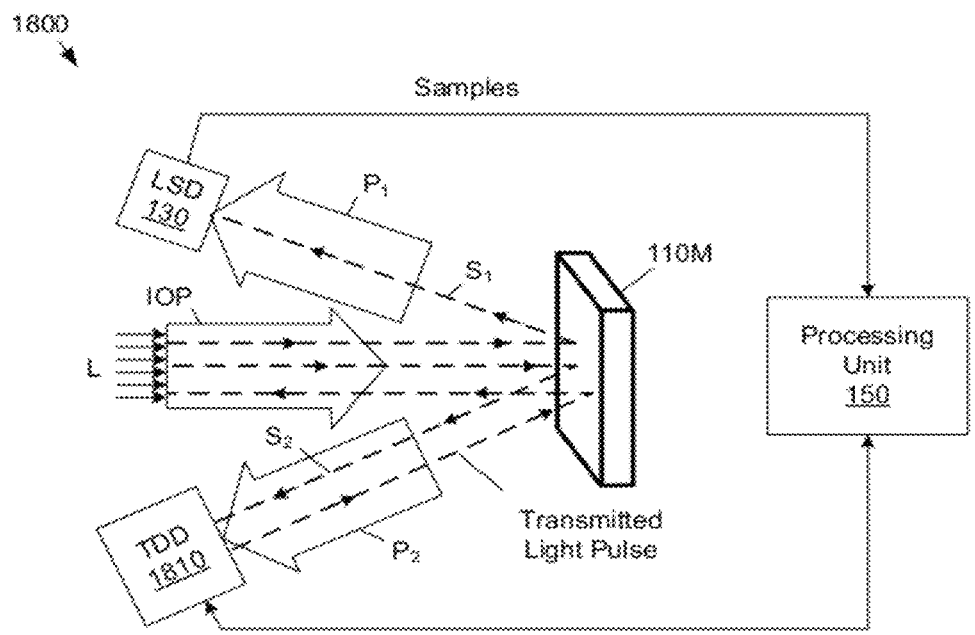
FIG. 18 illustrates an embodiment of a system 1800 that include a time-of-flight determining device.

In one set of embodiments, a system 1800 may be configured as shown in FIG. 18. System 1800 may include the light modulation unit 110M, the light sensing device 130 and processing unit 150 as described above, and may also include a time-of-flight determining device (TDD) 1810.

The light modulation unit 110M is configured to receive an incident light stream L from an optical input path IOP, e.g., as variously described above, especially in connection with system realization 200. (See, e.g., FIGS. 3A through 5C.) The incident light stream L is indicated as a bundle of rays entering the input optical path. Thereafter, it is indicated only by representative rays to avoid clutter in the diagram.

The light modulation unit 110M includes an array of mirrors configured to receive respective portions of the incident light stream. Each of the mirrors is configured to (a) reflect the respective portion of the incident light stream L onto a first optical path $P_1$ when the mirror is in a first orientation state and (b) reflect the respective portion of the incident light stream L onto a second optical path $P_2$ when the mirror is in a second orientation state. Each mirror includes at least two orientation states. (In some embodiments, each mirror has more than two orientation states.)

The light sensing device 130 is configured to receive a first light stream $S_1$ comprising the portions of the incident light stream L that are reflected onto the first optical path $P_1$ by mirrors in the first orientation state. Furthermore, the light sensing device is configured to generate a sequence of samples representing intensity of the first light stream $S_1$ as function of time.

The time-of-flight determining device (TDD) 1810 is configured to: (a) transmit a light pulse onto the second optical path $P_2$ so that the light pulse is reflected onto the input optical path IOP and out of the system by mirrors that are in the second orientation state, (b) receive a second light stream $S_2$ comprising the portions of the incident light stream L that are reflected onto the second optical path by the mirrors in the second orientation state, (c) detect a reflected pulse occurring in the second light stream $S_2$, and (d) determine a time of flight between the transmission of the light pulse and detection of the reflected pulse. Thus, the second optical path $P_2$ carries both incoming and outgoing light signals. Furthermore, the input output path duels as an output path for the transmitted light pulse.

The processing unit 150 may be configured to determine a range between the system (e.g., the light modulation unit 110M) to an external object based on the time of flight. For example, the range may be determined according to the relation $R=c\Delta t/2$, where c is the speed of light and $\Delta t$ is the time of flight.

In some embodiments, the light used by the TDD 1810 for transmitting the light pulse may reside in (or be restricted to) a wavelength range that is outside the wavelength range sensed by the light sensing device LSD 130.

In some embodiments, the light used by the TDD 1810 for transmitting the light pulse may be monochromatic light of a single wavelength, e.g., laser light.

In some embodiments, the light used by the TDD 1810 for transmitting the light pulse may be light in the visible range or in the UV range or in the IR range.

In some embodiments, the beam used by the TDD 1810 to transmit the light pulse is configured so that its central axis is pointed at the center of the array of light modulating elements.

The diameter of the beam used by the TDD to transmit the light pulse may be different in different embodiments, e.g., in one embodiment, being large enough so that the beam covers the whole (or the vast majority) of the light modulating array, in another embodiment, being so small that the beam covers only a few light modulating elements, and in other embodiments, any state between those extremes.

In some embodiments, the system 1800 also includes the optical subsystem 105 described above. The optical subsystem 105 is positioned along the input optical path IOP and configured to operate on the incident light stream before it is provided to the light modulation unit 110M. In some embodiments, the optical subsystem 105 includes a camera lens.

In some embodiments, the system 1800 also includes a first actuator configured to adjust a first optical distance $d_1$ between the optical subsystem 105 and the light modulation unit 110M (e.g., by translating the light modulation unit). The processing unit may be configured to compute an adjustment value $\Delta d_1$ for the first optical distance based on the determined range and to direct the first actuator to adjust the first optical distance according to the adjustment value $\Delta d_1$. Alternatively, the processing unit may compute an optimal value for the first optical distance (based on the determined range) and direct the first actuator to set the first optical distance to the optimal value.

In some embodiments, system 1800 also includes a second actuator configured to adjust a second optical distance $d_2$ between the light modulation unit 100M and the light sensing device 130. The processing unit 150 may be configured to compute an adjustment value $\Delta d_2$ for the second optical distance based on the adjustment value $\Delta d_1$ (or based on the determined range R) and to direct the second actuator to adjust the second optical distance according to the adjustment value $\Delta d_2$.

In some embodiments, the system 1800 may also include a third actuator configured to adjust an angular orientation of the light sensing device. The processing unit 150 may be configured to compute an angle adjustment value $\Delta\theta$ for the angular orientation based on the first adjustment value $\Delta d_1$ (or based on the determined range) and to direct the second actuator to adjust the angular orientation according to the angle adjustment value.

In some embodiments, the system 1800 may also include an actuator configured to adjust a focus setting of the optical subsystem 105. The processing unit 150 may be configured to direct the actuator to adjust said focus setting based on the determined range.

Figure 19:
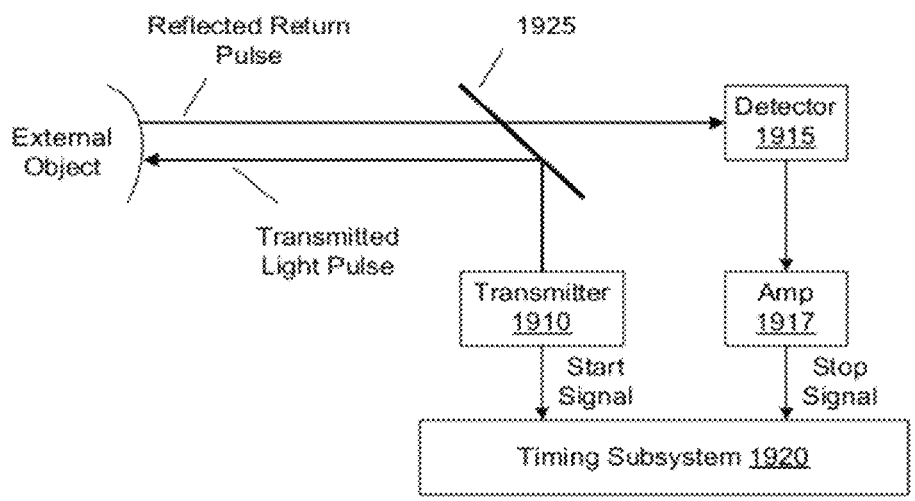
FIG. 19 illustrates one embodiment of the time-of-flight determining device.

In some embodiments, the TDD 1810 includes a transmitter 1910, a detector 1915, and a timing subsystem 1920, e.g., as shown in FIG. 19. The transmitter is configured to generate the light pulse. The detector is configured to receive the second light stream and to detect the reflected pulse occurring in the second light stream. The timing subsystem is configured to determine the time of flight between the transmission of the light pulse and the detection of the reflected pulse. In some embodiments, the TDD may also include an amplifier 1917 and a beam splitter 1925. In some embodiments, the transmitter 1910 includes a laser light source.

In some embodiments, the TDD 1810 is a laser range finder. Laser range finders are widely available from a variety of manufacturers and vendors.

In some embodiments, the system 1800 may also include the control unit 120 as described above. The control unit is configured to drive the array of mirrors through a sequence of spatial patterns. The TDD 1810 may be is configured to transmit the light pulse and detect the reflected pulse within a period of time corresponding to a single one of the spatial patterns. The TDD may receive a pattern clock signal (e.g., from control unit 120 or processing unit 150) that controls the transitions from one pattern to the next. The TDD may detect an active edge of the pattern clock, wait for a predetermined amount of time to allow transients to decay, and then transmit the light pulse after than predetermined wait time has expired.

In some embodiments, the sequence of samples corresponds to M of the spatial patterns, wherein the sequence of samples is usable to construct an N-pixel image, wherein M is less than N.

In some embodiments, the TDD 1810 is configured to determine a Doppler shift between the light pulse and the reflected pulse. The processing unit may be configured to compute a range velocity based on the Doppler shift. The range velocity may be used to continuously (or periodically or intermittently) adjust the focus setting of the optical subsystem 105 and/or to continuously (or periodically or intermittently) adjust the optical distance between the optical subsystem and the light modulation unit.

In some embodiments, the light pulse transmission may be repeated a number of times, and the resulting time-of-flight values may be averaged to determined an improved time of flight value.

In some embodiments, system 1800 may also include the optical subsystem 117 described above. The optical subsystem 117 may be configured to deliver (or focus or concentrate) the first light stream $S_1$ onto a light sensing surface of the light sensing device 130. Similarly, system 1800 may also include an optical subsystem configured to deliver (or focus or concentrate) the second light stream onto a light sensing surface (or port) of the TDD 1810.

Figure 20A:
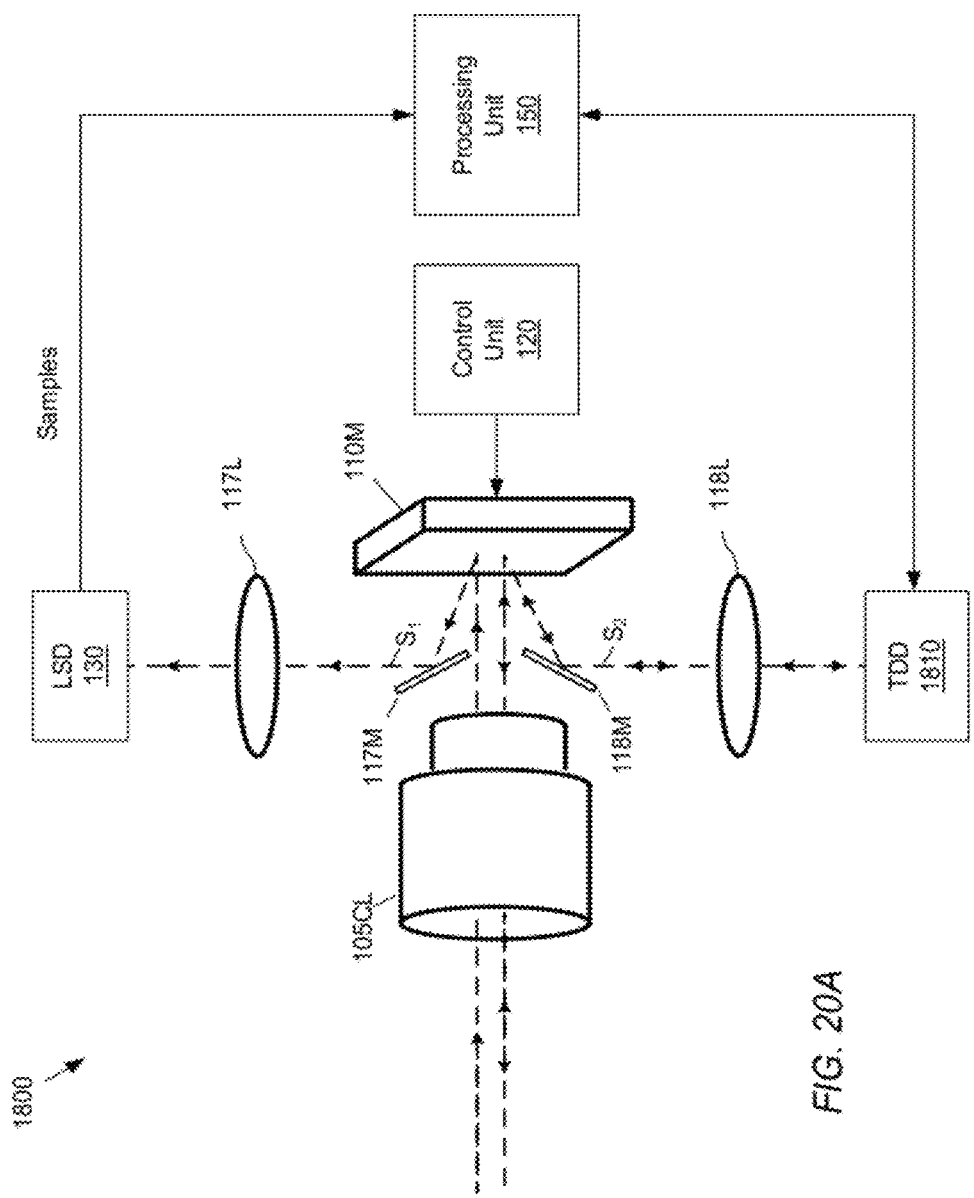
FIG. 20A illustrates an embodiment of system 1800, where mirrors are used to reflect the light streams $S_1$ and $S_2$ respectively.

In some embodiments, system 1800 may be configured as shown in FIG. 20A. The mirror 117M and lens 117L are configured to deliver the first light stream $S_1$ to the light sensing device 130. The mirror 118M and the lens 118L are configured to deliver the second light stream $S_2$ to the TDD 1810 and also to deliver the transmitted light pulse from the TDD to the light modulation unit 110M. In FIG. 20, the input optical path passes through camera lens 105CL.

Figure 20B:
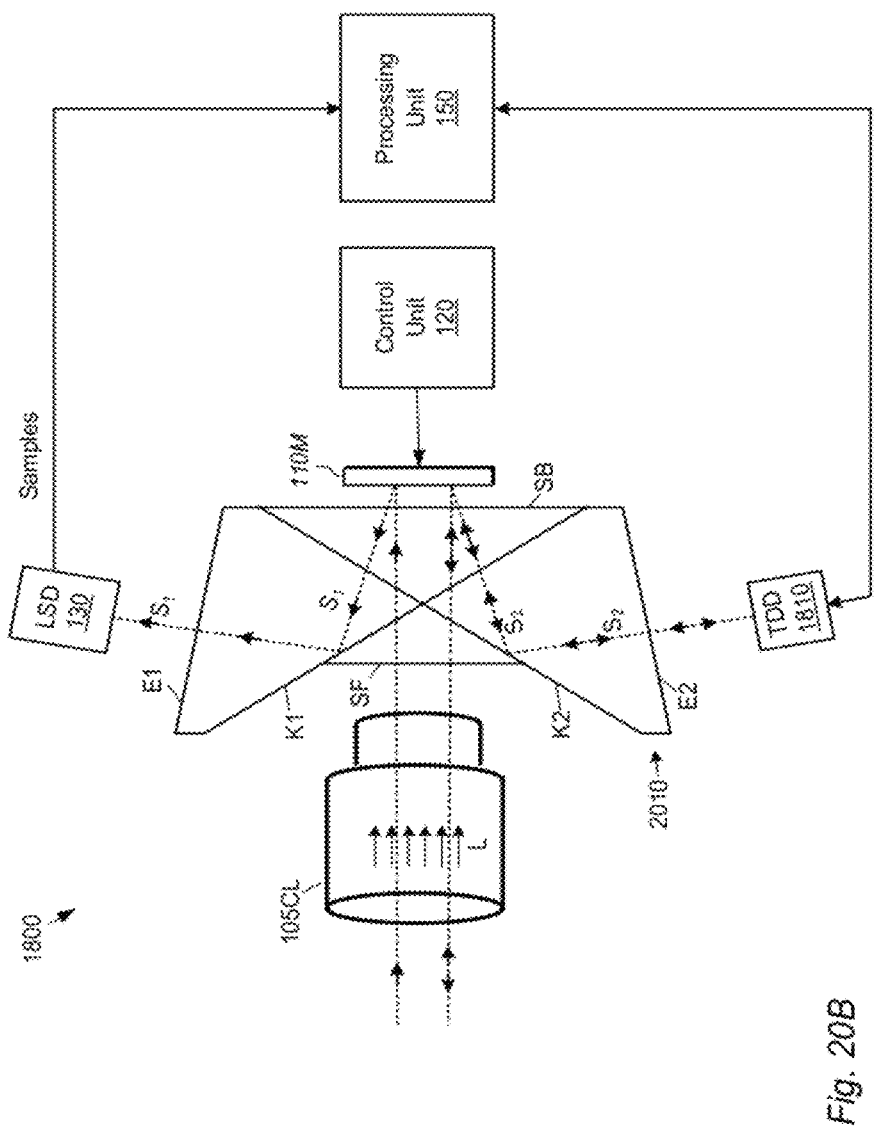
FIG. 20B illustrates an embodiment of system 1800, where a dual TIR prism is used to separate the incident light stream and the reflected light streams $S_1$ and $S_2$.
Figure 21:
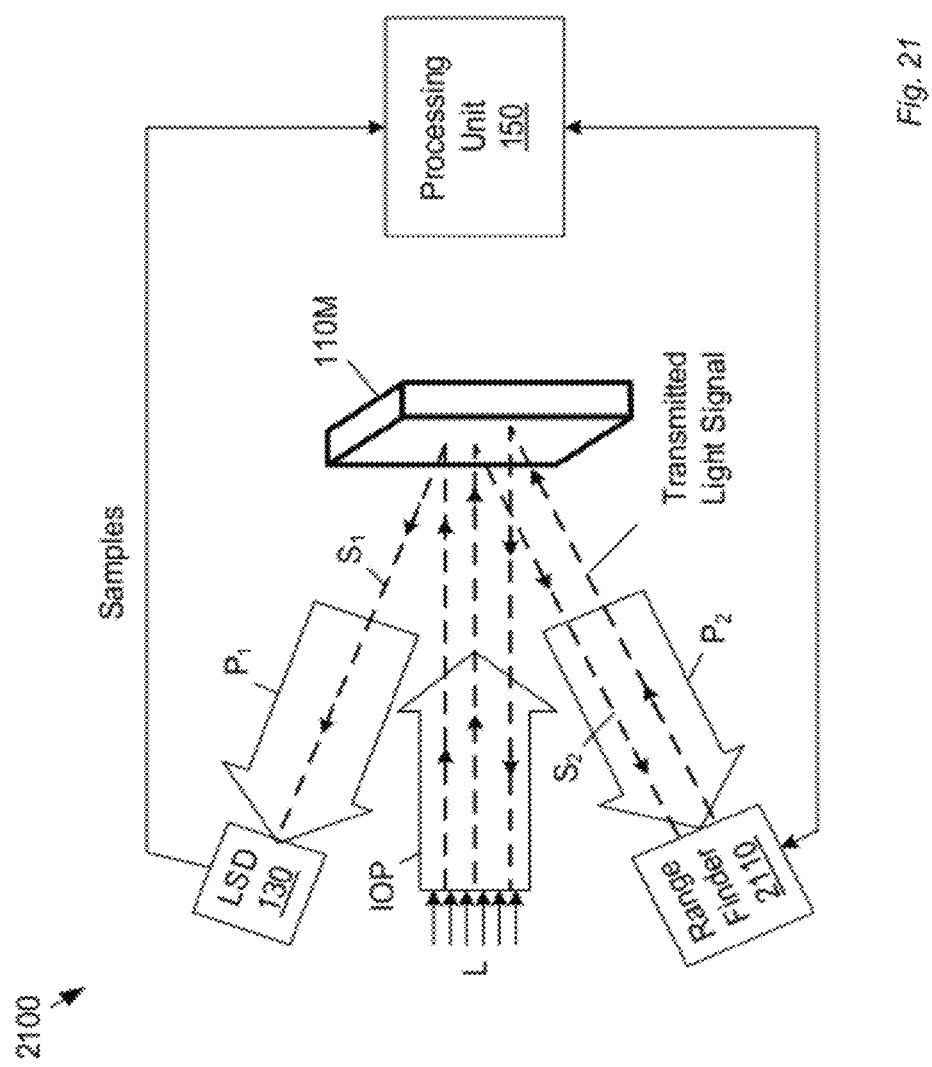

In some embodiments, system 1800 may include a dual TIR prism 2010 as shown in FIG. 20B. The dual TIR prism 2010 is configured to separate the incident light stream L from the first light stream $S_1$ and the second light stream $S_2$. (The dual TIR prism 2210 may be the same as or similar to the dual TIR prism 2210 used in system 2200. See the discussion of system 2200 below.) Note that the first light stream $S_1$ is totally internally reflected at partially-internal surface K1, and thus, directed onto the optical path that leads to the light sensing device 130. The second light stream $S_2$ is totally internally reflected at partially-internal surface K2, and thus, directed onto the optical path that leads to the TDD 1810. Furthermore, the light pulse transmitted by the TDD is totally internally reflected at the partially-internal surface K2, and thus, directed to the light modulation unit 110M, where it is transmitted out of the system via the mirrors in the OFF state.

Compressive Imaging Device with Range Finder

In one set of embodiments, a system 1800 may be configured as shown in FIG. 21. (Furthermore, system 2100 may include any subset of the features, embodiments and elements described above in connection with system 1800, and/or, any subset of the features, embodiments and elements described in this patent.)

The system 2100 may include the light modulation unit 110M and the light sensing device 130 as described above, and may also include a range finder 2110.

The light modulation unit 100M is configured to receive an incident light stream L from an optical input path IOP. The light modulation unit includes an array of mirrors configured to receive respective portions of the incident light stream. Each of the mirrors is configured to (a) reflect the respective portion of the incident light stream onto a first optical path $P_1$ when the mirror is in a first orientation state and (b) reflect the respective portion of the incident light stream onto a second optical path $P_2$ when the mirror is in a second orientation state.

The light sensing device 130 is configured to receive a first light stream $S_1$ comprising the portions of the incident light stream that are reflected onto the first optical path $P_1$ by mirrors in the first orientation state. The light sensing device is configured to generate a sequence of samples representing intensity of the first light stream $S_1$ as function of time.

The range finder 2110 is configured to transmit a light signal onto the second optical path $P_2$ so that the light signal is reflected onto the input optical path IOP and out of the system by mirrors that are in the second orientation state. The range finder receives a second light stream $S_2$ comprising the portions of the incident light stream that are reflected onto the second optical path $P_2$ by the mirrors in the second orientation state. The second light stream $S_2$ includes a reflected light signal due to reflection of the transmitted light signal from an external object. The range finder is configured to determine a range to the external object based on the transmitted light signal and the reflected light signal.

Note that the term "light signal" is broader in its scope of meaning than the term "light pulse". Thus, system 2100 encompasses embodiments that transmit light pulses and also embodiments that transmit light signals that cannot be characterized as pulses.

The range finder 2110 may be a prior art range finder (e.g., a laser range finder) or a prior art LIDAR device. (LIDAR is acronym for "Light Detection and Ranging".) Laser range finders and LIDAR devices are well known and widely available.

In some embodiments, the ranger finder 2110 may transmit the light signal at a wavelength (or in a wavelength band) that is outside the visible range, or, outside the range sensed by the light sensing device 130.

In some embodiments, the system 2100 may include the processing unit 150 and the optical subsystem 105. The optical subsystem 105 is positioned along the input optical path IOP and configured to operate on (e.g., refract) the incident light stream before it is provided to the light modulation unit.

In some embodiments, the system 2100 may include a first actuator configured to adjust an optical distance $d_{OM}$ between the optical subsystem 105 and the light modulation unit 110 (e.g., by translating the light modulation unit). The processing unit may be configured to compute an optimal value $V_{OM}$ (value of best focus) for the optical distance $d_{OM}$ based on the range (determined by the range finder) and to direct the first actuator to set the optical distance $d_{OM}$ to the optimal value $V_{OM}$.

In some embodiments, the system 2100 may also include a second actuator configured to adjust an optical distance $d_{MS}$ between the light modulation unit and the light sensing device. The processing unit may be configured to compute an optimal value $V_{MS}$ for the optical distance $d_{MS}$ based on the optimal value $V_{OM}$ for the optical distance $d_{OM}$ (or based directly on the determined range) and to direct the second actuator to set the optical distance $d_{MS}$ to the optimal value $V_{MS}$.

The functional relationships between any two of the range, $d_{OM}$ and $d_{MS}$ may be determined by calibration.

In those embodiments where the system 2100 includes the first actuator (that is configured to adjust the optical distance $d_{OM}$ between the optical subsystem and the light modulation unit), the processing unit may be configured to: compute a first adjustment value $\Delta V_1$ (e.g., an adjustment value that will translate to the optimal value from the current value) for the optical distance $d_{OM}$ based on the determined range, and direct the first actuator to adjust the optical distance $d_{OM}$ according to the first adjustment value.

Furthermore, in those embodiments that also include the second actuator (configured to adjust the optical distance $d_{MS}$ between the light modulation unit and the light sensing device), the processing unit may be configured to compute a second adjustment value $\Delta V_2$ (e.g., an adjustment value that will translate to the optimal value from the current value) for the optical distance $d_{MS}$ based on the first adjustment value $\Delta V_1$ (or based on the determined range) and to direct the second actuator to adjust the optical distance $d_{MS}$ according to the second adjustment value.

In some embodiments, the system 2100 may include a rotational actuator configured to adjust an angular orientation of the light sensing device. The processing unit may be configured to compute an angle adjustment value $\Delta\theta$ for the angular orientation based on the first adjustment value $\Delta V_1$ (or based on the determined range) and to direct the rotational actuator to adjust the angular orientation according to the angle adjustment value.

In some embodiments, the system 2100 may include an actuator $A_F$ configured to adjust a focus setting of the optical subsystem 105. The processing unit may be configured to: compute an optimal value $V_{FS}$ (a value of best focus) for the focus setting based on the determined range; and direct the actuator to set the focus setting to the optimal value $V_{FS}$. Alternatively, the processing unit may be configured to direct the actuator $A_F$ to adjust said focus setting by a certain amount $\Delta_{FS}$ that is based on the determined range and on the current value of the focus setting.

In some embodiments, the system 2100 may also include an actuator $A_{MS}$ configured to adjust the optical distance $d_{MS}$ between the light modulation unit and the light sensing device (e.g., by translating the light sensing device). The processing unit may be configured to compute an optimal value $V_{MS}$ for the optical distance $d_{MS}$ based on the optimal value $V_{FS}$ for the focus setting (or based directly on the determined range) and to direct the actuator $A_{MS}$ to set the optical distance $d_{MS}$ to the optimal value $V_{MS}$.

In some embodiments, the ranger finder 2110 transmits a modulated stream of monochromatic light, e.g., laser light.

As various described above, the control unit 120 is configured to drive the array of mirrors through a sequence of spatial patterns, e.g., as part of the compressive acquisition of images. The range finder may be configured to transmit the light signal and receive the reflected light signal while the array of mirrors is being driven through the sequence of spatial patterns, i.e., not requiring all the mirrors to rest in the second orientation state (the off state). (However, in some embodiments or in some modes of operation, all the mirrors may indeed be put into the second orientation state to facilitate determination of range.) Thus, the acquisition of range information may operate in parallel with the compressive acquisition of images.

In some embodiments, the sequence of samples (generated by the light sensing device 130) corresponds to M of the spatial patterns, and the sequence of samples is usable to construct an N-pixel image, where M is less than N. Thus, the system may operate compressively, e.g., as variously described above.

In some embodiments, the range finder 2110 is configured to determine a Doppler shift between the transmitted light signal and the reflected light signal. The processing unit is configured to compute a range velocity based on the Doppler shift. The processing unit may then direct one or more actuators of the CI device to make continuous changes focus parameters such as the focus setting of optical subsystem 105, the optical distance $d_{OM}$ and the optical distance $d_{MS}$.

Figure 22:
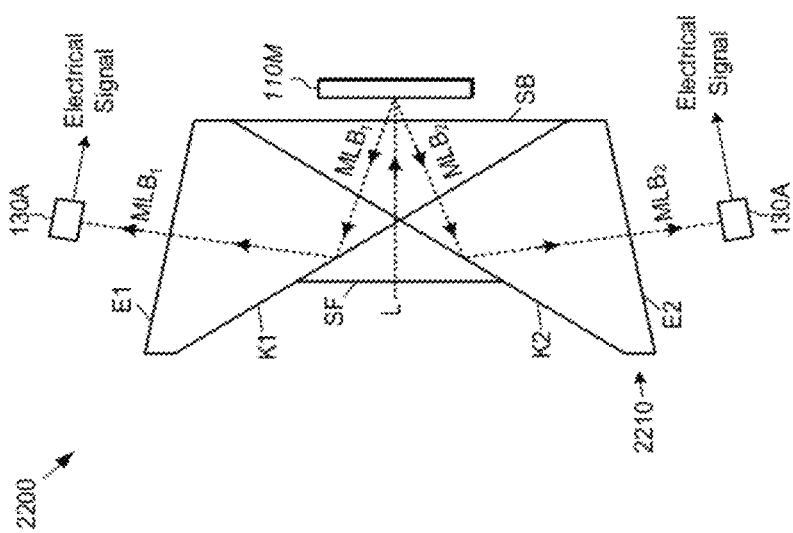

Dual TIR Prism to Separate Incident Light from On-State Reflection and Off-State Reflection In one set of embodiments, a system 2200 may be configured as shown in FIG. 22. System 2200 includes the light modulation unit 110M as described above, and may also include a dual TIR prism 2210, a first light sensing device 130A and a second light sensing device 130B. (Furthermore, system 2200 may also include any subset of the features, embodiments and elements described herein.)

The light modulation unit 110M includes an array of mirrors, where each of the mirrors is configured to controllably switch between two orientation states, e.g., as variously described above.

The dual TIR prism 2210 has a front surface SF, a back surface SB, a first partially-internal surface K1, a second partially-internal surface K1, a first exiting surface E1 and a second exiting surface E2.

The dual TIR prism 2210 is configured to receive an incident light beam L at the front surface SF and output the incident light beam at the back surface SB. The dual TIR prism is further configured to receive a first modulated light beam $MLB_1$ at the back surface SB and from the array of mirrors, totally internally reflect the first modulated light beam at the first partially-internal surface K1, and output the first modulated light beam onto a first sensing path at the first exiting surface E1. The dual TIR prism is further configured to receive a second modulated light beam $MLB_2$ at the back surface SB and from the array of mirrors, totally internally reflect the second modulated light beam at the second partially-internal surface K2, and output the second modulated light beam onto a second sensing path at the second exiting surface E2. The first modulated light beam $MLB_1$ comprises pieces of the incident light beam L that are reflected by mirrors in a first of the two orientation states. The second modulated light beam $MLB_2$ comprises pieces of the incident light beam that are reflected by mirrors in a second of the two orientation states.

In some embodiments, the first modulated light beam $MLB_1$ and the second modulated light beam $MLB_2$ may have angles of incidence upon the back surface that are equal in magnitude but opposite in sign. In other embodiments—for example, embodiments where the DMD is tilted at an angle with respect to the imaging path axis, $MLB_1$ and $MLB_2$ may have angles of incidence that are different in magnitude.

For more information on dual TIR prisms, please see U.S. patent application Ser. No. 12/665,237 (Publication No. 2010/0189344 A1), PCT filed on Jun. 18, 2008, invented by Dirk L. A. Maes. See also "Dual TIR prism, a way to boost the performance of a DLP projector", SID MEC Spring Meeting 2008, 13 Mar. 2008, Dirk Maes, available at http://www.iof-fraunhofer.de/sid/_media/dirk_maes.pdf.

The first light sensing device 130A may be configured to receive at least a portion of the first modulated light beam $MLB_1$ from the first sensing path, and generate a first electrical signal representing intensity of the "at least a portion" of the first modulated light beam. The first light sensing device 130A may an instance of the light sensing device 130 described above, in any of its various embodiments.

The second light sensing 130B may be device configured to receive at least a portion of the second modulated light beam $MLB_2$ from the second sensing path, and generate a second electrical signal representing intensity of the "at least a portion" of the second modulated light beam. The first light sensing device 130B may an instance of the light sensing device 130 described above, in any of its various embodiments.

In some embodiments, the front surface SF is substantially perpendicular to a central axis of the incident light beam, or, to a central axis of the optical subsystem 105.

In some embodiments, the back surface SB is substantially parallel to a plane of the array of mirrors.

In some embodiments, the front and back surfaces are parallel, where the first and second partially-internal surfaces have mirror-image symmetry with respect to a plane orthogonal to the first and second surfaces.

Figure 23:
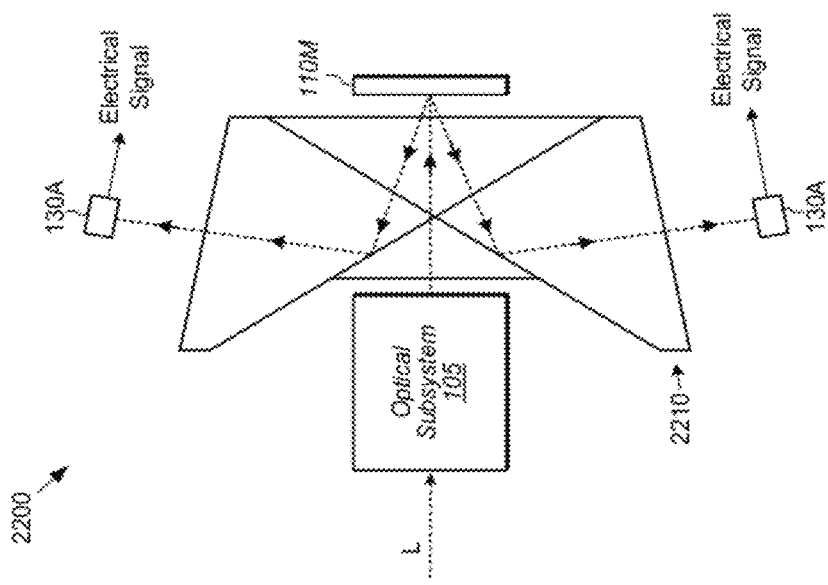
FIGS. 22 and 23 illustrate the use of a dual TIR prism in a compressive image device.

In some embodiments, system 2200 includes the optical subsystem 105 (e.g., a camera lens) as described above, e.g., as shown in FIG. 23.

The input optical subsystem 105 may be configured to receive the incident light beam L and to provide the incident light beam to the front surface of the dual TIR prism, e.g., as shown in FIG. 23.

The input optical subsystem may be configured so that an image carried by the incident light beam is in focus at the array of mirrors. In some embodiments, the input optical subsystem has an adjustable focus mechanism so that it can focus on objects at a range of distances from the system.

Off-State Image Sensor to Collect Images for Focusing On-State Detector

Figure 24:
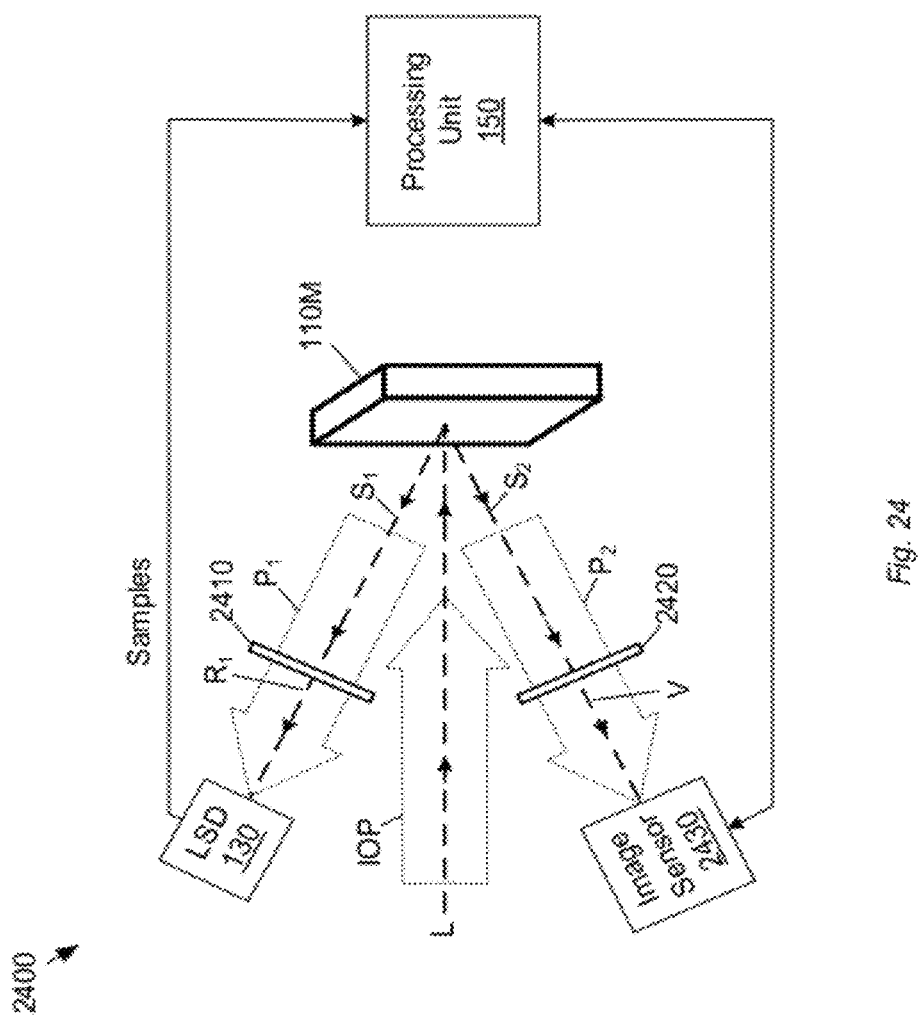
FIG. 24 illustrates an embodiment of a system 2400 that includes an image sensor to capture images of a light stream $S_2$ (off-state light).

In one set of embodiments, a system 2400 may be configured as shown in FIG. 24. The system 2400 may include the light modulation unit 110M and the light sensing device as described above, and may also include a bandpass filter 2410, a bandpass filter 2420 and an image sensor 2430.

The light modulation unit 110M is configured to receive an incident light stream L from an optical input path IOP, e.g., as variously described above. The light modulation unit includes an array of mirrors configured to receive respective portions of the incident light stream. Each of the mirrors is configured to (a) reflect the respective portion of the incident light stream onto a first optical path $P_1$ when the mirror is in a first orientation state and (b) reflect the respective portion of the incident light stream onto a second optical path $P_2$ when the mirror is in a second orientation state.

The bandpass filter 2410 is configured to restrict a first light stream $S_1$ to a first wavelength range in order to produce a restricted light stream $R_1$. The first light stream $S_1$ comprises the portions of the incident light stream that are reflected onto the first optical path $P_1$ by mirrors in the first orientation state. Bandpass filters are well known in the field of optics and need not be explained here. In other embodiments, the first light stream may be restricted to the first wavelength range by means other than a bandpass filter.

The light sensing device 130 is configured to receive the restricted light stream $R_1$ and generate a sequence of samples representing intensity of the restricted light stream as a function of time.

The bandpass filter 2420 is configured to restrict a second light stream $S_2$ to a visible wavelength range (i.e., a wavelength range with the visible wavelength band) in order to obtain a visible light stream V. The second light stream $S_2$ comprises the portions of the incident light stream that are reflected onto the second optical path $P_2$ by the mirrors in the second orientation state.

The image sensor 2430 is configured to acquire a sequence of images of the visible light stream V. The image sensor includes an array of light detecting elements. The array is preferable a two-dimensional array. However, in alternative embodiments, the array may be a one-dimensional array.

In some embodiments, the image sensor 2430 is a CCD array. In other embodiments, the image sensor is a CMOS image sensor. In yet other embodiments, the image sensor is based on some other semiconductor technology.

In some embodiments, the first wavelength range and the visible wavelength range are non-overlapping.

In some embodiments, the first wavelength range and the visible wavelength range are overlapping but non-identical.

In some embodiments, the first bandpass filter is configured so that the first wavelength range is adjustable (or selectable), e.g., programmable.

In some embodiments, the light modulation unit and elements downstream from the light modulation unit (e.g., the light sensing device 130, the image sensor 2430, any optics intervening between the light modulation unit 110M and the light sensing device, and any optics intervening between the light modulation unit 110M and the image sensor) may be mounted on a first translation stage that is translatable with respect to the optical subsystem 105. Furthermore, in some embodiments, the image sensor 2430 is mounted on a second translation stage which is itself mounted on the first translation stage, and the light sensing device 130 is mounted on a third translation stage which is itself mounted on the first translation stage. The second translation stage is electrically and/or manually adjustable to translate the image sensor, in order to change the optical distance between the light modulation unit and the image sensor. The third translation stage is electrically and/or manually adjustable to translate the light sensing device, in order to change the optical distance between the light modulation unit and the light sensing device.

Change Optical Distance to Light Sensing Device in Response to in Change in First Wavelength Range In some embodiments, system 2400 may also include an actuator configured to adjust an optical distance between the light modulation unit and the light sensing device. The processing unit 150 may be configured to: receive user input specifying a selection (e.g., a selection different from the current selection) for the first wavelength range; determine an adjustment value for the optical distance based on the specified selection; and direct the actuator to adjust the optical distance based on the determined adjustment value. The functional relationship between optimal values of the optical distance and wavelength (or wavelength range) will have been determined by calibration and stored in a memory accessible to the processing unit. The functional relationship may take the form of a lookup table, or a set of coefficients for substitution into a known functional form.

In some embodiments, system 2400 may also include the optical subsystem 105 and the processing unit 150 as described above, and may also include a display (or an interface for coupling to a display). The optical subsystem 105 may be configured to receive and operate on the incident light stream prior to the incident light stream arriving at the light modulation unit. The processing unit 150 may be configured to display the sequence of images on the display (e.g., in real time).

User Looks at Display and Provides Input that Determines Focus Adjustment

In some embodiments, the system 2400 may also include a first actuator configured to adjust a focus setting of the optical subsystem 105. The processing unit 150 may be configured to: receive user input specifying a focus adjustment; direct the first actuator to adjust the focus setting of the optical subsystem 105 based on the user-specified focus adjustment.

In some embodiments, system 2400 may also include an actuator configured to adjust a pre-modulation optical distance $d_{OM}$ between the optical subsystem 105 and the light modulation unit 110M (e.g., by translating the light modulation unit). The processing unit may be configured to: receive user input specifying a focus adjustment; and direct the actuator to adjust the pre-modulation optical distance $d_{OM}$ based on the user-specified focus adjustment.

Changing Post-Modulation Optical Distance(s) in Response to Change in Pre-Modulation Optical Distance In some embodiments, the processing unit 150 may be further configured to: compute a first adjustment value for a first post-modulation optical distance $d_{MI}$ between the light modulation unit and the image sensor based on the user-specified focus adjustment; compute a second adjustment value for a second post-modulation optical distance $d_{MS}$ between the light modulation unit 110M and the light sensing device 130 based on the first adjustment value (or based directly on the user-specified focus adjustment); direct a first additional actuator to adjust the first post-modulation optical distance $d_{MI}$ based on the first adjustment value; and direct a second additional actuator to adjust the second post-modulation optical distance $d_{MS}$ based on the second adjustment value.

In some embodiments, system 2400 may include a first actuator configured to adjust a first optical distance between the light modulation unit and the image sensor (e.g., by translating image sensor), and a second actuator configured to adjust a second optical distance between the light modulation unit and the light sensing device. In this context, the processing unit 150 may be configured to: receive user input specifying a focus adjustment for the first optical distance; direct the first actuator to adjust the first optical distance based on the user-specified focus adjustment; determine an adjustment value for the second optical distance based on the user-specified focus adjustment; and direct the second actuator to adjust the second optical distance based on the determined adjustment value. The functional relationship between the optimal value of the first optical distance and the optimal value for the second optical distance will have been previously determined by calibration and stored in memory accessible to the processing unit 150.

In some embodiments, system 2400 may also include the control unit 150 described above. The control unit 150 is configured to drive the array of mirrors through a sequence of spatial patterns. The sequence of spatial patterns may include a first subsequence, where each spatial pattern of the first subsequence specifies that all the mirrors be in the second orientation state (the OFF state), to allow the image sensor to capture an image (or images) of the incident light stream without spatial modulation. The user will then be able to see on the display a depiction of the external environment. In some embodiments, the sequence of spatial patterns may also include a second subsequence of measurement patterns. The samples captured by the light sensing device 130 in response to the assertion of the measurement patterns may be used to algorithmically construct images corresponding to the first wavelength range. The image sensor may be configured to acquire images corresponding to the patterns of the first subsequence and to ignore or discard images corresponding to the patterns of the second subsequence.

In some embodiments, system 2400 may also include the optical subsystem 105 and the processing unit 150. The optical subsystem may be configured to receive and operate on the incident light stream prior to the incident light stream arriving at the light modulation unit. The processing unit may be configured to compute a focus indicator value based on at least one of the images from the image sensor. The focus indicator value indicates an extent to which the visible light stream is in focus at the image sensor. The focus indicator value may be computed by evaluating one or more focus metrics on the image, e.g., as variously described above. The one or more focus metrics may include one or more 2D focus metrics and/or one or more 1D focus metrics. A 2D focus metric is a focus metric that operates on a 2D image. A 1D focus metric is a focus metric that operates on a 1D image. (Even though the image from the image sensor may be a 2D image, it is possible to derive a 1D image from the 2D image by extracting pixel values along a 1D path or a set of 1D paths in the 2D image.)

In some embodiments, system 2400 may also include a first actuator configured to adjust a focus setting of the optical subsystem 105. In this context, the processing unit may be configured to direct the first actuator to adjust the focus setting of the optical subsystem based on data including the focus indicator value. The data may also includes a previously-determined focus indicator value for a previous state of the focus setting and the value of that previous focus setting as well as the value of the current focus setting.

In some embodiments, system 2400 may also include a first actuator configured to adjust a first optical distance between the optical subsystem 105 and the light modulation unit 110M (e.g., by translating the light modulation unit or by translating the optical subsystem). In this context, the processing unit 150 may be configured to: compute a first adjustment value for the first optical distance based on data including the focus indicator value; and direct the first actuator to adjust the first optical distance based on the first adjustment value.

In some embodiments, the processing unit 150 may be further configured to: compute a second adjustment value for a second optical distance between the light modulation unit and the image sensor based on the first adjustment value; compute a third adjustment value for a third optical distance between the light modulation unit and the light sensing device based on the first adjustment value (e.g., using a known functional relationship between the optimal value of second optical distance and the optimal value of the third optical distance, having been determined by calibration); direct a second actuator to adjust the second optical distance based on the second adjustment value; and direct a third actuator to adjust the third optical distance based on the third adjustment value.

In some embodiments, system 2400 may also include a first actuator configured to adjust a first optical distance between the light modulation unit and the image sensor (e.g., by translating the image sensor) and a second actuator configured to adjust a second optical distance between the light modulation unit and the light sensing device. In this context, the processing unit may be configured to: compute a first adjustment value for the first optical distance based on data including the focus indicator value; compute a second adjustment value for the second optical distance based on the first adjustment value (using a known functional relationship between the optimal value of the first optical distance and the optimal value of the second optical distance); direct the first actuator to adjust the first optical distance based on the first adjustment value; and direct the second actuator to adjust the second optical distance based on the second adjustment value.

In some embodiments, system 2400 may also include the optical subsystem 105, the control unit 120 and the processing unit 150, and may also include a first actuator. The first actuator may be configured to adjust a focus setting of the optical subsystem. The control unit may be configured to drive the array of mirrors through a sequence of spatial patterns. The processing unit may be configured to operate on a first subset of the sequence of images acquired by the image sensor to determine focus indicator values, where each of focus indicator values is determined based on one or more of the images of the first subset, where each of the focus indicator values indicates an extent to which the visible light stream is in focus at the image sensor. The processing unit may be configured to drive the first actuator based on the focus indicator values in order to locate an improved value (e.g., optimal value) of the focus setting.

In some embodiments, the spatial patterns include one-dimensional patterns, where each of the one-dimensional patterns is restricted to a corresponding one-dimensional path on the array of the mirrors.

In some embodiments, system 2400 may also include the control unit 120 and the processor 150, and may also include a first actuator and a second actuator. The first actuator may be configured to adjust a first optical path length between the light modulation unit and the image sensor. The second actuator may be configured to adjust a second optical path length between the light modulation unit and the light sensing device. The control unit may be configured to drive the array of mirrors through a sequence of spatial patterns, where the sequence of spatial patterns includes a plurality of repetitions of a collection of one or more calibration patterns. The one or more calibration patterns correspond respectively to one or more subsets of the array of mirrors. Each of the one or more subsets corresponds to a respective subset of the array of light detecting elements. The sequence of images acquired by the image sensor includes an image for each of the spatial patterns.

The processing unit may be configured to compute a sequence of spillover values, where each of the spillover values corresponds to respective one of the plurality of repetitions of the set of one or more calibration patterns and is computed based on one or more of the images that correspond to the respective repetition. Each spillover value indicates an extent to which modulated light from the one or more subsets of the array of mirrors fail to reach their respective subsets of the array of light detecting elements.

In some embodiments, the processing unit 150 may be configured to: drive the first actuator based on the spillover values in order to determine an improved value (or optimal value) for the first optical path length; compute an improved value for the second optical path length based on the improved value for the first optical path length; direct the second actuator to adjust the second optical path length based on the improved value for the second optical path length.

Figure 25:
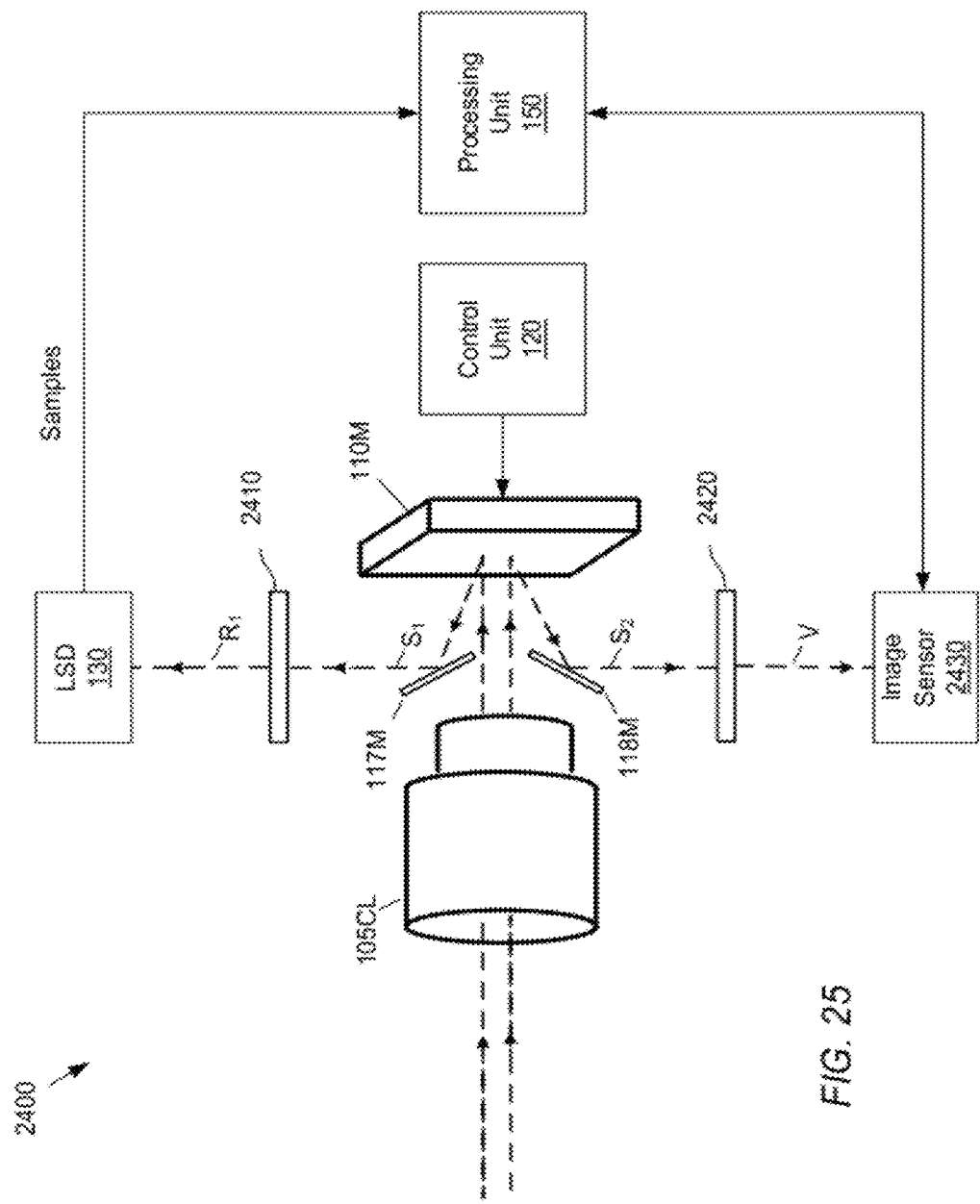
FIG. 25 illustrates an embodiment of system 2400 where mirrors 117M and 118M are used to reflect the light streams $S_1$ and $S_2$.

In some embodiments, system 2400 may be configured as shown in FIG. 25. Mirror 117M is configured to reflect the first light stream $S_1$ onto a path leading to the bandpass filter 2410. Likewise, mirror 118M is configured to reflect the second light stream $S_2$ onto a path leading to the bandpass filter 2420. Furthermore, system 2400 may include optics intervening between the light modulation unit and the image sensor to direct the visible light stream V onto the image sensor, and optics intervening between the light modulation unit and the light sensing device 130 to direct the restricted light stream $R_1$ onto the light sensing device.

Figure 26:
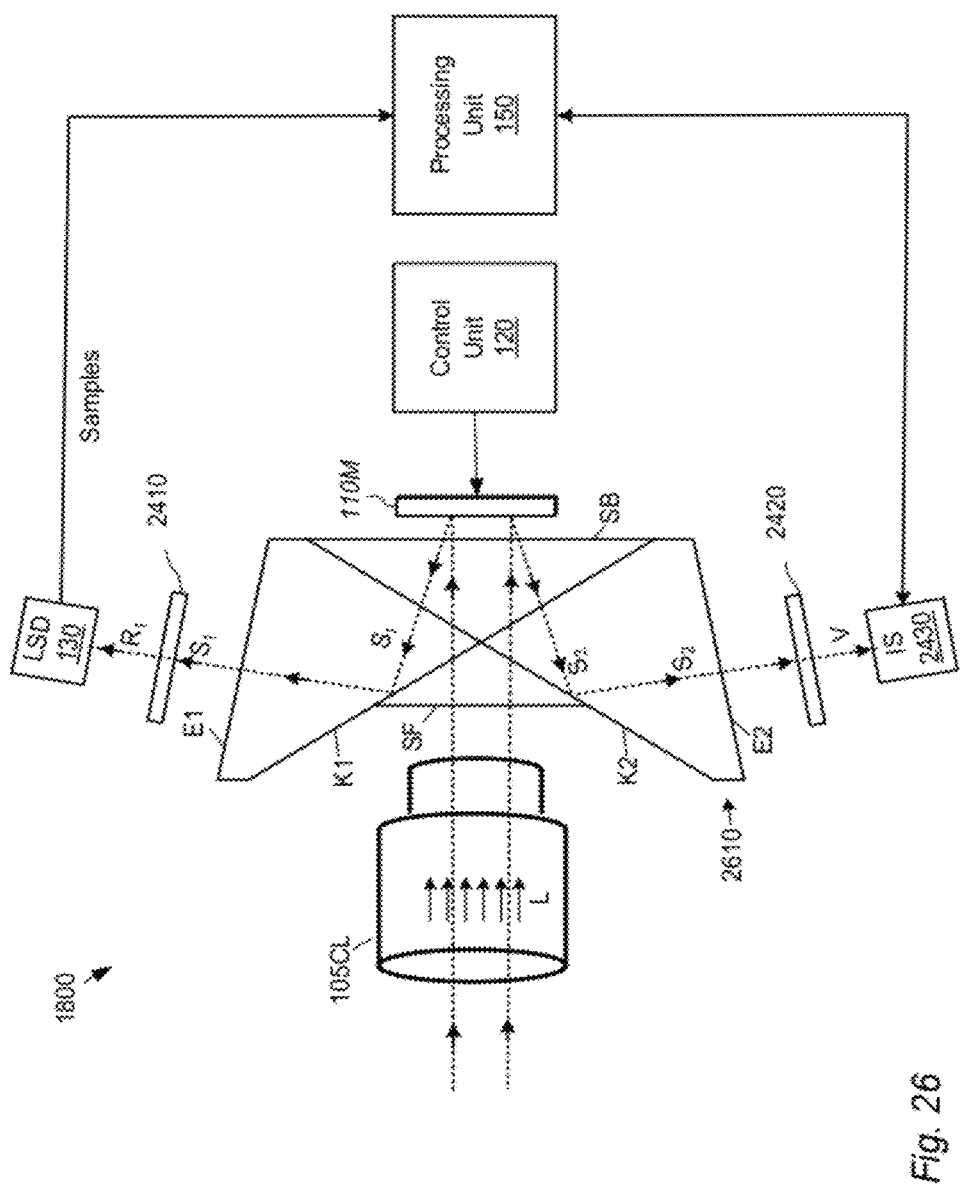
FIG. 26 illustrates an embodiment of system 2400 using a dual TIR prism.

In some embodiments, system 2400 may be configured as shown in FIG. 26. A TIR prism pair 2610 is employed to separate the incident light stream L from the first light stream $S_1$ and the second light stream $S_2$. The TIR prism pair 2610 may be configured as variously described above.

Figure 27A:
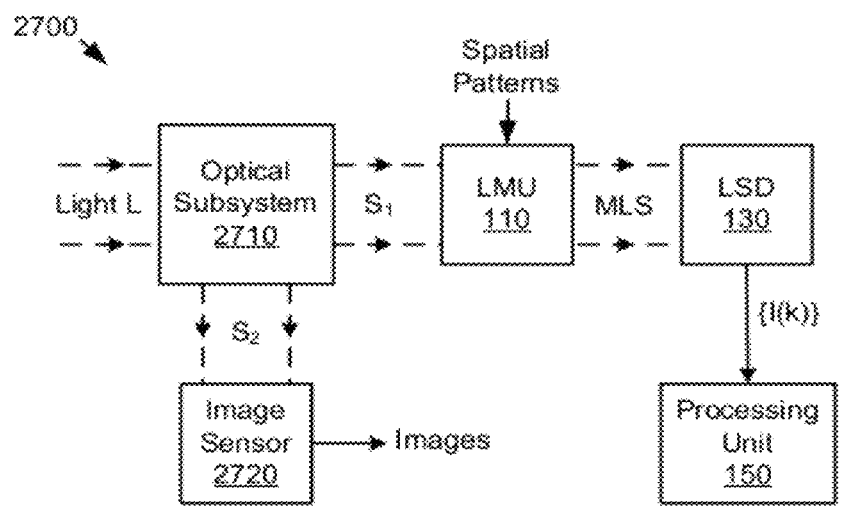
FIG. 27A illustrates an embodiment of a system 2700 that splits the incident light stream into two streams prior to modulation; the light modulator receives one of the streams; the image sensor receives the other stream.

In one set of embodiments, a system 2700 may be configured as shown in FIG. 27A. System 2700 includes the light modulation 110 and the light sensing device as described above, and also includes a first optical subsystem 2710 and an image sensor 2720.

The optical subsystem 2710 may be configured to receive an incident light stream and to split (or separate) the incident light stream into a first light stream $S_1$ and a second light stream $S_2$. Any of various means of splitting are contemplated.

The light modulation unit 110 is configured to modulate the first light stream with a sequence of spatial patterns to obtain a modulated light stream MLS, e.g., as variously described above.

The light sensing device 130 is configured to receive the modulated light stream and to generate a sequence of samples $\{I(k)\}$ representing intensity of the modulated light stream as a function of time, e.g., as variously described above.

The image sensor 2720 may be configured to receive the second light stream $S_2$ and acquire a sequence of images of the second light stream $S_2$. The image sensor includes an array of light detecting elements. The image sensor may be a low cost image sensor. In some embodiments, the image sensor is a CCD array or CMOS image sensor.

In some embodiments, the first light stream $S_1$ is restricted to a first wavelength range and the second light stream $S_2$ is restricted to a second wavelength range that are different (e.g., non-overlapping, or, overlapping but non-identical). In one embodiment, the second wavelength range is a visible wavelength range, i.e., wavelength range in the visible light spectrum.

In some embodiments, the system 2700 may also include the processing unit 150 as described above. The processing unit may be configured to operate on the samples $\{I(k)\}$ and/or to operate on the images or selected ones of the images.

In some embodiments, the system 2700 may include a bandpass filter configured to receive and the modulated light stream and to restrict the modulated light stream to a first wavelength range. The light sensing device 130 receives the modulated light stream as restricted to the first wavelength range by the bandpass filter.

In some embodiments, the bandpass filter is configured so that the first wavelength range is adjustable (or selectable).

In some embodiments, system 2700 may also include an actuator configured to adjust an optical distance between the light modulation unit and the light sensing device 130, e.g., by translating the light sensing device along a central axis of the modulated light stream. The processing unit 150 may be configured to receive user input specifying a selection for the first wavelength range; determine a value of best focus for the optical distance based on the specified selection for the first wavelength range; and direct the actuator to adjust the optical distance based on the determined value.

The value of best focus may be determined by evaluating a calibration function, e.g., a function of wavelength or wavelength range index that has been determined by previous calibration. The function may be evaluated by evaluating a mathematical expression whose parameters are stored in system 2700, or, by table lookup.

In some embodiments, system 2700 may also include a second bandpass filter configured to restrict the second light stream $S_2$ to the visible wavelength range. The image sensor 2710 may receive the second light stream $S_2$ as restricted to the visible wavelength range. Thus, the images produced by the image sensor may be images corresponding to the visible wavelength range.

Figure 27B:
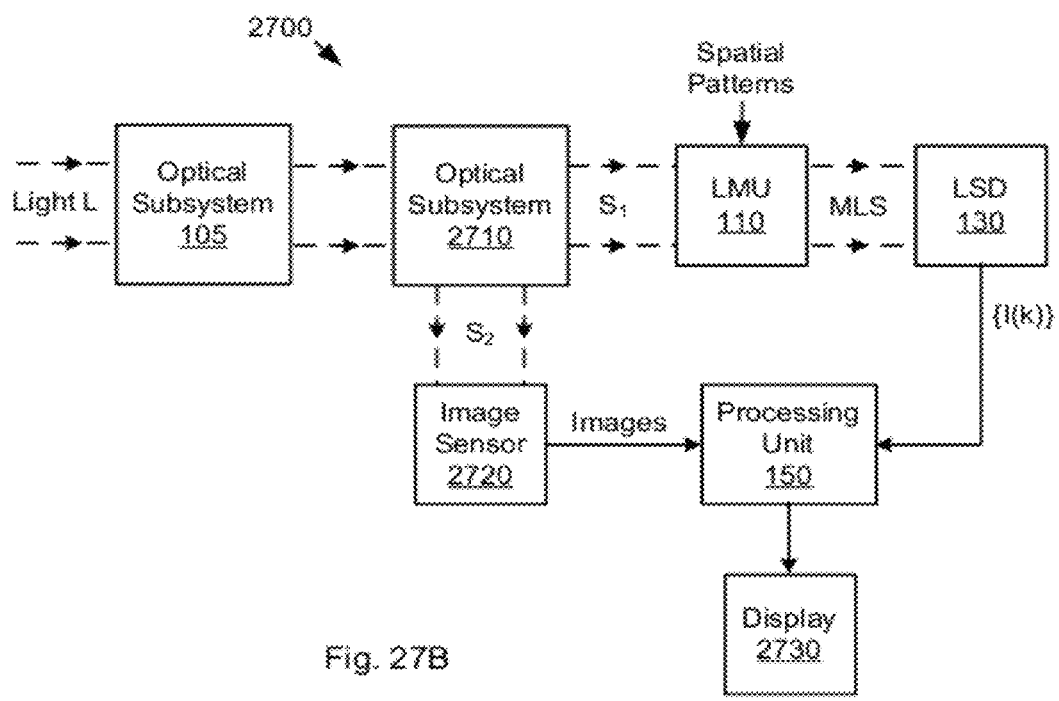
FIG. 27B illustrates an embodiment of system 2700 where images from the image sensor are displayed.

In some embodiments, system 2700 also includes the optical subsystem 105, the processing unit 150 and a display 2730, e.g., as shown in FIG. 27B. The optical subsystem 105 (e.g., a camera lens) may be configured to receive and operate on the incident light stream prior to the incident light stream arriving at the optical subsystem 2710. The processing unit may be configured to display the sequence of images on the display (e.g., in real time).

User Looks at Display and Provides Input Determining Focus Adjustment

In some embodiments, the processing unit 150 may be configured to receive user input specifying a focus adjustment. The viewing the image on the display, the user can judge when optimal focus has been achieved on the image sensor 2720. The processing unit may adjust a focus setting of the optical subsystem 105 (e.g., camera lens) based on the user-specified focus adjustment.

In some embodiments, the processing unit 150 may be configured to evaluate a calibration function $f_{IS2M}$ based on a current value of the focus setting to obtain a modulator-specific value of the focus setting, e.g., in response to user input indicating that the image as seen on the display 2730 is in focus. The calibration function $f_{IS2M}$ relates optimal values of the focus setting for focusing onto the image sensor to optimal values of the focus setting for focusing onto the light modulation unit 110. The processing unit may then change the focus setting of the optical subsystem 105 to the modulator-specific value.

In some embodiments, the processing unit 150 may be further configured to evaluate a calibration function $f_{M2D}$ based on the modulator-specific value of the focus setting to obtain an optimal value for an optical distance between the light modulation unit 110 and the light sensing device 130. The processing unit may then change the optical distance to the optimal value (e.g., by translating the light sensing device).

As noted above, the processing unit 150 may be configured to receive user input specifying a focus adjustment. In some embodiments, the processing unit 150 may change an optical distance $d_{TIS}$ between the optical subsystem 2710 and the image sensor 2720 based on the user-specified focus adjustment.

In some embodiments, the processing unit 150 may be further configured to evaluate a calibration function $g_{IS2M}$ based on a current value of the optical distance $d_{TIS}$ to obtain a value V for an optical distance $d_{TM}$ between the optical subsystem 2710 and the light modulation unit 110, e.g., in response to user input indicating that the image as seen on the display 2730 is in focus. The calibration function $g_{IS2M}$ relates optimal values of the optical distance $d_{TIS}$ for focusing onto the image sensor to optimal values of the optical distance $d_{TM}$ for focusing onto the light modulation unit. The processing unit may then change the optical distance $d_{TM}$ to the value V.

In some embodiments, the processing unit 150 may be configured to evaluate a calibration function $g_{M2D}$ based on the value V of the second optical distance $d_{TM}$ to obtain an optimal value for an optical distance $d_{MD}$ between the light modulation unit 110 and the light sensing device 130. The processing unit may then change the optical distance $d_{MD}$ to the optimal value (e.g., by translating the light sensing device).

In some embodiments, the processing unit 150 may be configured to compute focus indicator values for respective ones of the images. For example, the processing unit may evaluate a 2D focus metric (or a combination of 2D focus metrics) on each image or selected ones of the images. (In one embodiment, the processing unit may evaluate a 1D focus metric (or a combination of 1D focus metrics) on the 1D slices through the images. Each focus indicator value indicates an extent to which the second light stream $S_2$ is in focus at the image sensor 2720.

In some embodiments, the processing unit 150 may be configured to change a focus setting of the optical subsystem 105 one or more times until the focus indicator value is optimized (e.g., maximized or minimized). The optimizing state of the focus setting may be the state where optimal focus has been achieved for the light on the image sensor 2720.

In some embodiments, the processing unit 150 may be configured to evaluate the calibration function $f_{IS2M}$ based on a first value of the focus setting to obtain a second value of the focus setting (e.g., in response to having optimized the focus indicator value on the images from the image sensor). As described above, the calibration function $f_{IS2M}$ relates optimal values of the focus setting for focusing onto the image sensor to optimal values of the focus setting for focusing onto the light modulation unit. The processing unit may then change the focus setting of the optical subsystem 105 to the second value.

In some embodiments, the processing unit 150 may be configured to evaluate the calibration function $f_{M2D}$ based on the second value of the focus setting to obtain an optimal value for the optical distance $d_{MD}$ between the light modulation unit and the light sensing device. The processing unit may then change the optical distance $d_{MD}$ to the optimal value (e.g., by translating the light sensing device).

In some embodiments, the processing unit 150 may be configured to change the first optical distance $d_{TIS}$ between the optical subsystem 2710 and the image sensor one or more times until the focus indicator value on the image-sensor images is optimized (e.g., maximized or minimized). The optimizing value of the distance $d_{TIS}$ may be the value where optimal focus has been achieved for the light on the image sensor 2720

In some embodiments, the processing unit 150 may be configured to evaluate the calibration function $g_{IS2M}$ based on an optimizing value of the optical distance $d_{TIS}$ to obtain an optimal value V for the optical distance $d_{TM}$ between the optical subsystem 2710 and the light modulation unit 110. As noted above the calibration function $g_{IS2M}$ relates optimal values of the optical distance $d_{TIS}$ for focusing onto the image sensor to optimal values of the optical distance $d_{TM}$ for focusing onto the light modulation unit. The processing unit may then change the optical distance $d_{TM}$ to the second value V.

In some embodiments, the processing unit 150 may be configured to evaluate the calibration function $g_{M2D}$ based on the optimal value V of the optical distance $d_{TM}$ to obtain an optimal value $V_{MD}$ for the optical distance $d_{MD}$ between the light modulation unit and the light sensing device. The processing unit may then change the optical distance $d_{MD}$ to the optimal value $V_{MD}$ (e.g., by translating the light sensing device).

Pre-Modulation Separation of Light for Image Sensor

Figure 27C:
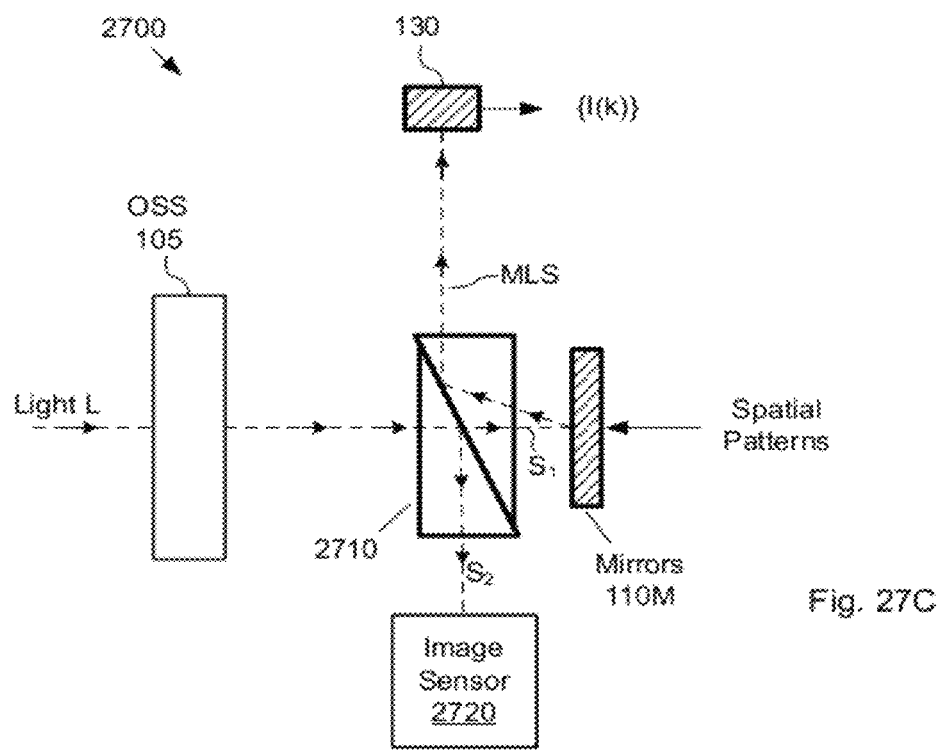
FIG. 27C illustrates an embodiment of system 2700 where the light streams $S_1$ and $S_2$ are produced by a TIR prism 2710.

In some embodiments of system 2700, the light modulation unit comprises an array of mirrors 110M, e.g., as shown in FIG. 27C. The mirrors are configured to receive respective portions of the first light stream $S_1$. Each of the mirrors is configured to (a) reflect the respective portion of the first light stream $S_1$ onto a first optical path $P_1$ when the mirror is in a first orientation state and (b) reflect the respective portion of the first light stream away from the first optical path when the mirror is in a second orientation state.

The light sensing device 130 is configured to receive a modulated light stream from the first optical path $P_1$. The modulated light stream comprises the portions of the first light stream that are reflected onto the first optical path by mirrors in the first orientation state. The first light sensing device is further configured to generate a sequence of samples {I(k)} representing intensity of the modulated light stream as a function of time.

In some embodiments, the optical subsystem 2710 includes a TIR prism pair. A first prism of the TIR prism pair may be configured to generate the first light stream $S_1$ by partially transmitting the incident light stream and generate the second light stream $S_2$ by partially reflecting the incident light stream.

In some embodiments, a first surface of the first prism is coated with a dielectric coating in order to restrict the second light stream $S_2$ to a visible wavelength range.

In some embodiments, each of the mirrors (of the light modulating array) is configured to reflect the respective portion of the first light stream $S_1$ onto a second optical path $P_2$ when the mirror is in the second orientation state. In these embodiments, system 2700 may also include a second light sensing device configured to receive a complementary modulated light stream from the second optical path $P_2$. The complementary modulated light stream comprises the portions of the first light stream $S_1$ that are reflected onto the second optical path by mirrors in the second orientation state. The second light sensing device may be further configured to generate a second sequence of samples representing intensity of the complementary modulated light stream as a function of time. For further information regarding compressive imaging systems that use both a modulated light stream and a complementary modulated light stream reflected from a light modulation unit, see U.S. patent application Ser. No. 13/207,900, filed on Aug. 11, 2011.

FIG. 27D shows an embodiment where light is split at the interface of the first prism of the TIR prism pair 2710. In this embodiment, a dielectric coating on this interface reflects visible light and transmits the remaining spectral components of the light. The reflected visible light forms an image on the sensor array 2720. The positions of the sensor array and the DMD 110M are calibrated such that when the image is in focus on the sensor array at visible wavelengths it is also in focus on the DMD at the remaining wavelengths.

Compressive Imaging System 2800

Figure 28:
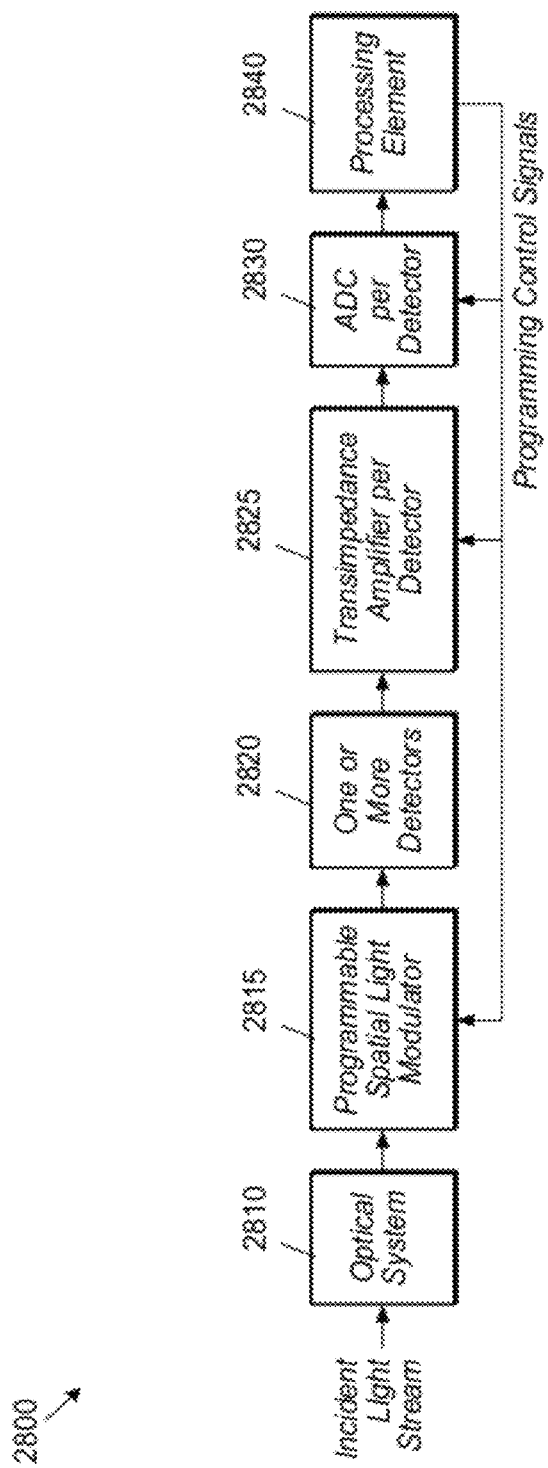
FIGS. 28 and 29 shows embodiment of a compressive imaging (CI) system having multiple signal acquisition channels.

In one set of embodiments, a compressive imaging system 2800 may be configured as shown in FIG. 28. The compressive imaging (CI) system may include an optical system 2810, a spatial light modulator 2815, a set 2820 of one or more photodetectors, a set 2825 of one or more amplifiers (i.e., one amplifier per detector), a set 2830 of analog-to-digital converters (one ADC per detector), and a processing element 2840.

The optical system 2810 focuses an incident light stream onto the spatial light modulator, e.g., as variously described above. See the discussion above regarding optical subsystem 105. The incident light stream carries an image (or a spectral ensemble of images) that is to be captured by the CI system in compressed form.

The spatial light modulator 2815 modulates the incident light stream with a sequence of spatial patterns to obtain a modulated light stream, e.g., as variously described above.

Each of the detectors 2820 generates a corresponding electrical signal that represents the intensity of a corresponding portion of the modulated light stream, e.g., a spatial portion or a spectral portion of the modulated light stream.

Each of the amplifiers 2825 (e.g., transimpedance amplifiers) amplifies the corresponding detector signal to produce a corresponding amplified signal.

Each of the ADCs 2830 acquires samples of the corresponding amplified signal.

The processing element 2840 may operate on the sample sets obtained by the respective ADCs to construct respective images. The images may represent spatial portions or spectral slices of the incident light stream. Alternatively, or additionally, the processing element may send the sample sets to a remote system for image construction.

The processing element 2840 may include one or more microprocessors configured to execute program instructions stored in a memory medium.

The processing element 2840 may be configured to control one or more other elements of the CI system. For example, in one embodiment, the processing element may be configured to control the spatial light modulator, the transimpedance amplifiers and the ADCs.

The processing element 2840 may be configured to perform any subset of the above-described methods on any or all of the detector channels. Each of the detector channels of system 2800 may include any subset of the embodiments, features, and elements described above. (A detector channel may include a corresponding detector, amplifier and ADC.)

Compressive Imaging System 2900

Figure 29:
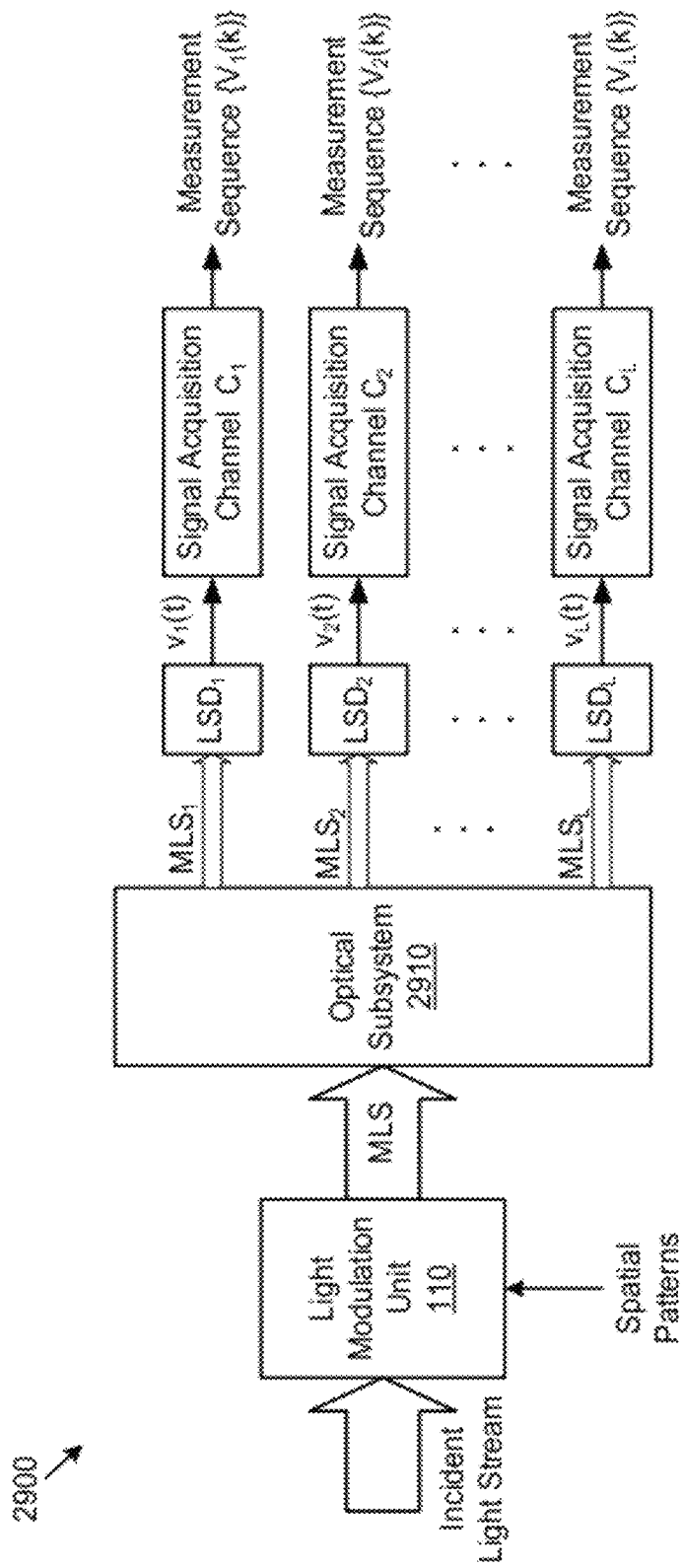

In one set of embodiments, a compressive imaging system 2900 may be configured as shown in FIG. 29. The compressive imaging system includes the light modulation unit 110 as variously described above, and also includes optical subsystem 2910, a set of L light sensing devices $LSD_1$ through $LSD_L$, and a set of L signal acquisition channels $C_1$ through $C_L$, where L in a positive integer.

The light modulation unit 110 receives an incident light stream and modulates the incident light stream with a sequence of spatial patterns to obtain a modulated light stream MLS, e.g., as variously described above.

The optical subsystem 2910 delivers portions (e.g., spatial portions or spectral portions) of the modulated light stream to corresponding ones of the light sensing devices $LSD_1$ through $LDS_L$.

For information on various mechanisms for delivering spatial subsets of the modulated light stream to respective light sensing devices, please see U.S. patent application Ser. No. 13/197,304, filed on Aug. 3, 2011, titled "Decreasing Image Acquisition Time for Compressive Imaging Devices", invented by Woods et al., which is hereby incorporated by reference in its entirety as though fully and completely set forth herein.

In some embodiments, the optical subsystem 2910 includes one or more lenses and/or one or more mirrors arranged so as to deliver spatial portions of the modulated light stream onto respective ones of the light sensing devices. For example, in one embodiment, the optical subsystem 2910 includes a lens whose object plane is the plane of the array of light modulating elements and whose image plane is a plane in which the light sensing devices are arranged. The light sensing devices may be arranged in an array.

In some embodiments, optical subsystem 2910 is configured to separate the modulated light stream into spectral components and deliver the spectral components onto respective ones of the light sensing devices. For example, optical subsystem 2910 may include a grating, a spectrometer, or a tunable filter such as a Fabry-Perot Interferometer to achieve the spectral separation.

Each light sensing device $LSD_j$ generates a corresponding electrical signal $v_j(t)$ that represents intensity of the corresponding portion $MLS_j$ of the modulated light stream.

Each signal acquisition channel $C_j$ acquires a corresponding sequence of samples $\{V_j(k)\}$ of the corresponding electrical signal $v_j(t)$. Each signal acquisition channel may include a corresponding amplifier (e.g., a TIA) and a corresponding A/D converter.

The sample sequence $\{V_j(k)\}$ obtained by each signal acquisition channel $C_j$ may be used to construct a corresponding sub-image which represents a spatial portion or a spectral slice of the incident light stream. The number of samples m in each sample sequence $\{V_j(k)\}$ may be less (typically much less than) the number of pixels in the corresponding sub-image. Thus, each signal acquisition channel $C_j$ may operate as a compressive sensing camera for a spatial portion or spectral portion of the incident light.

Each of the signal acquisition channels may include any subset of the embodiments, features, and elements described above.

System 2900 may also include the optical subsystem 2010 (or the optical subsystem 105) for focusing the incident light stream onto the light modulation unit 110.

The following numbered paragraphs describe various additional embodiments of systems and methods.

1.1 A method for focusing a compressive imaging (CI) device, the method comprising:

(a) supplying a sequence of calibration patterns to a light modulation unit of the CI device, wherein the light modulation unit includes an array of light modulating elements;

(b) the light modulation unit modulating an incident light stream with the sequence of calibration patterns to produce a modulated light stream, wherein the sequence of calibrations patterns is configured to effect a movement of a region along a one-dimensional path on the array of light modulating elements, wherein each of the calibration patterns corresponds a different position of the region along the one-dimensional path;

(c) a light sensing device of the CI device receiving the modulated light stream and acquiring a sequence of samples representing an intensity of the modulated light stream as a function of time, wherein the sequence of samples includes at least one sample for each of the calibration patterns;

(d) computing a focus indicator value based on the sequence of samples, wherein the focus indicator value indicates an extent to which the incident light stream is in focus along the one-dimensional path on the array of light modulating elements.

1.2 The method of paragraph 1.1, wherein the CI device includes an optical subsystem that receives and operates on the incident light stream prior to the incident light stream arriving at the light modulation unit.

1.3 The method of paragraph 1.2, further comprising: changing a focus setting of the optical subsystem based on data including the focus indicator value.

1.4 The method of paragraph 1.2, further comprising repeatedly performing a set of operations including: changing a focus setting of the optical subsystem; and performing actions (a), (b), (c) and (d), wherein the set of operations is repeated until the focus indicator value becomes less than a threshold value.

1.5 The method of paragraph 1.2, further comprising: changing an optical distance between the light modulation unit and the optical subsystem based on data including the focus indicator value.

1.6 The method of paragraph 1.2, further comprising repeatedly performing a set of operations including: changing an optical distance between the light modulation unit and the optical subsystem; and performing (a), (b), (c) and (d), wherein the set of operations is repeated until the focus indicator value becomes less than a threshold value.

1.7 The method of paragraph 1.6, further comprising: changing an optical distance between the light modulation unit and the light sensing device based on a final optical distance between the light modulation unit and the optical subsystem after the focus indicator value becomes less than the threshold value.

1.8 The method of paragraph 1.1, further comprising: determining that the focus indicator value is inaccurate; and performing (a), (b), (c) and (d) a second time, using a second sequence of calibration patterns, to obtain a second sequence of samples and a second focus indicator value, wherein the second sequence of calibration patterns is configured to effect the movement of the region along a second one-dimensional path on the array of light modulating elements.

1.9 The method of paragraph 1.1, wherein (a), (b), (c) and (d) are performed a plurality of times, using a respective plurality of calibration sequences to obtain a respective plurality of focus indicator values for a respective plurality of one-dimensional paths on the array of light modulating elements.

1.10 The method of paragraph 1.2, further comprising: directing an actuator to change an optical distance between the optical subsystem and the light modulation unit according to a first displacement value; performing (a) through (d) a second time, to obtain an additional focus indicator value for an additional sequence of samples; computing a second displacement value for the optical distance based on data including the focus indicator value for the sequence of samples, the focus indicator value for the additional sequence of samples and the first displacement value.

1.11 The method of paragraph 1.10, further comprising: directing the actuator to change the optical distance between the optical subsystem and the light modulation unit according to the second displacement value.

1.12 The method of paragraph 1.2, further comprising: directing an actuator to change a focus setting of the optical subsystem according to a first displacement value; performing (a) through (d) a second time, to obtain an additional focus indicator value for an additional sequence of samples; computing a second displacement value for the focus setting based on data including the focus indicator value for the sequence of samples, the focus indicator value for the additional sequence of samples and the first displacement value.

1.13 The method of paragraph 1.12, further comprising: directing the actuator to change the focus setting of the optical subsystem according to the second displacement value.

1.14 The method of paragraph 1.2, further comprising: directing an actuator to change an optical distance between the optical subsystem and the light modulation unit through a range; performing (a) through (d) for each of a plurality of optical distances within the range in order to obtain a corresponding plurality of sample sequences and a corresponding plurality of focus indicator values; determining an optimal value for the optical distance between the input optical subsystem and the light modulation unit based on an analysis of data including the plurality of focus indicator values.

1.15 The method of paragraph 1.14, further comprising: directing the actuator to change the optical distance to the optimal value.

1.16 The method of paragraph 1.2, further comprising: directing an actuator to change a focus setting of the optical subsystem through a range of settings; performing (a) through (d) for each of a plurality of settings within the range in order to obtain a corresponding plurality of sample sequences and a corresponding plurality of focus indicator values; determining an optimal value for the focus setting based on an analysis of data including the plurality of focus indicator values.

1.17 The method of paragraph 1.16, further comprising: directing the actuator to change the focus setting to the optimal value.

1.18 The method of paragraph 1.1, wherein the light sensing device includes a plurality of light sensing elements, wherein each of the light sensing elements generates a respective electrical signal representing intensity of a respective spatial portion of the modulated light stream, wherein said acquiring the sequence of samples comprises adding the electrical signals to obtain a sum signal and sampling the sum signal.

1.19 The method of paragraph 1.1, wherein the light sensing device includes a plurality of light sensing elements, wherein each of the light sensing elements generates a respective electrical signal representing intensity of a respective spatial portion of the modulated light stream, wherein said acquiring the sequence of samples comprises sampling each of the electrical signals and adding the sampled versions of the electrical signals in the digital domain.

1.20 The method of paragraph 1.1, wherein the light sensing device includes only one light sensing element.

1.21 The method of paragraph 1.1, wherein said computing a focus indicator value includes: computing a discrete Fourier transform of a one-dimensional image derived from the sequence of samples; and computing an amount of energy present in the discrete Fourier transform at frequencies above a cutoff frequency.

1.22 A method for focusing a compressive imaging (CI) device, the method comprising:
(a) supplying a sequence of calibration patterns to a light modulation unit of the CI device, wherein the light modulation unit includes an array of light modulating elements;
(b) the light modulation unit modulating an incident light stream with the sequence of calibration patterns to produce a modulated light stream, wherein the sequence of calibrations patterns is configured to effect a movement of a region along a one-dimensional path on the light modulation unit, wherein each of the calibration patterns corresponds a different position of the region along the one-dimensional path;
(c) acquiring a sequence of the frames from an array of light sensing elements, wherein each of the light sensing elements is configured to receive a respective spatial portion of the modulated light stream, wherein each of the frames of the acquired sequence corresponds to a respective one of the calibration patterns, wherein each of the frames includes a sample from each of the light sensing elements,
(d) determining a sequence of sum values, wherein each of the sum values is determined by adding the samples in a respective one of the frames of the acquired sequence;
(e) operating on the sequence of sum values to determine a focus indicator value, wherein the focus indicator value indicates an extent to which the incident light stream is in focus along the one-dimensional path.

1.23 A method for focusing a compressive imaging (CI) device, the method comprising:
(a) supplying a sequence of calibration patterns to a light modulation unit of the CI device, wherein the light modulation unit includes an array of light modulating elements;
(b) the light modulation unit modulating an incident light stream with the sequence of calibration patterns to produce a modulated light stream;
(c) a light sensing device of the CI device receiving the modulated light stream and acquiring a sequence of samples representing an intensity of the modulated light stream as a function of time, wherein the sequence of samples includes at least one sample for each of the calibration patterns;
(d) changing a focus setting of the CI device based on the sequence of samples.

1.24 The method of paragraph 1.23, wherein the focus setting of the CI device is an optical distance between an optical subsystem of the CI device and the light modulation unit.

1.25 The method of paragraph 1.23, wherein the focus setting of the CI device is a focus setting of an optical subsystem of the CI device.

1.26 The method of paragraph 1.23, further comprising: repeating (a) through (d) until a focus metric based on the sequence of samples is optimized.

1.27 The method of paragraph 1.23, wherein the sequence of calibrations patterns is configured to effect the movement of a region along a one-dimensional path on a surface of the light modulation unit, wherein each of the calibration patterns corresponds a different position of the region along the one-dimensional path.

1.28 A method for focusing a compressive imaging (CI) device, the method comprising:
(a) supplying a sequence of calibration patterns to a light modulation unit of the CI device, wherein the light modulation unit includes an array of light modulating elements;
(b) the light modulation unit modulating an incident light stream with the sequence of calibration patterns to produce a modulated light stream, wherein the sequence of calibrations patterns is configured to effect a movement of a region along a one-dimensional path on the light modulation unit, wherein each of the calibration patterns corresponds a different position of the region along the one-dimensional path;
(c) a light sensing device of the CI device receiving the modulated light stream and acquiring a sequence of samples representing an intensity of the modulated light stream as a function of time, wherein the sequence of samples includes at least one sample for each of the calibration patterns;
(d) displaying a one-dimensional image on a display, wherein the one-dimensional image is based on the sequence of samples;
(e) adjusting a focus setting of the CI device based on user input.

1.29 The method of paragraph 1.28, wherein the user input specifies a direction and/or magnitude of the adjustment to the focus setting.

1.30 The method of paragraph 1.28, wherein the focus setting of the CI device is a focus setting of an optical subsystem of the CI device.

1.31 The method of paragraph 1.28, wherein the focus setting of the CI device is an optical distance between an optical subsystem of the CI device and the light modulation unit.

1.32 The method of paragraph 1.28, performing (a) through (e) a plurality of times.

1.33 The method of paragraph 1.28, further comprising: receiving user input specifying a position and/or orientation of the one-dimensional path on the array of light modulating elements.

2.1 A method for focusing a compressive imaging (CI) device, the method comprising:
(a) supplying a sequence of spatial patterns to a light modulation unit of the CI device;
(b) the light modulation unit modulating an incident light stream with the sequence of spatial patterns to produce a modulated light stream;
(c) a light sensing device of the CI device receiving the modulated light stream and acquiring a sequence of samples representing an intensity of the modulated light stream as a function of time, wherein the sequence of samples includes at least one sample for each of the spatial patterns;

(d) constructing an image using the sequence of spatial patterns and the acquired samples;

(e) computing a focus indicator value based on the image, wherein the focus indicator value indicates an extent to which the incident light stream is in focus at the light modulation unit.

2.2 The method of paragraph 2.1, wherein each of the spatial patterns is restricted to a subset of the array of light modulating elements.

2.3 The method of paragraph 2.2, wherein the subset of the array of light modulating elements is a convex region located at the center of the array of light modulating elements.

2.4 The method of paragraph 2.1, wherein the CI device includes an optical subsystem that receives and operates on the incident light stream prior to the incident light stream arriving at the light modulation unit.

2.5 The method of paragraph 2.4, further comprising: changing a focus setting of the optical subsystem based on data including the focus indicator value.

2.6 The method of paragraph 2.5, further comprising repeatedly performing a set of operations that includes: changing a focus setting of the optical subsystem; and performing (a), (b), (c), (d) and (e), wherein the set of operations is repeated until the focus indicator value becomes less than a threshold value.

2.7 The method of paragraph 2.4, further comprising: changing an optical distance between the optical subsystem and the light modulation unit based on data including the focus indicator value.

2.8 The method of paragraph 2.4, further comprising repeatedly performing a set of operations that includes: changing an optical distance between the optical subsystem and the light modulation unit; and performing (a), (b), (c), (d) and (e), wherein the set of operations is repeated until the focus indicator value becomes less than a threshold value.

2.9 The method of paragraph 2.8, further comprising: changing an optical distance between the light modulation unit and the light sensing device based on a final distance between the optical subsystem and the light modulation unit after the focus indicator value becomes less than the threshold value.

2.10 The method of paragraph 2.1, further comprising: changing an angle of orientation of the light modulation unit based on data including the focus indicator value.

2.11 The method of paragraph 2.4, further comprising: directing an actuator to change an optical distance between the optical subsystem and the light modulation unit according to a first displacement value; performing (a) through (e) a second time, to obtain an additional image and a focus indicator value for the additional image; computing a second displacement value for the optical distance based on data including the focus indicator value for the image, the focus indicator value for the additional image and the first displacement value.

2.12 The method of paragraph 2.8, further comprising: directing the actuator to change the optical distance according to the second displacement value.

2.13 The method of paragraph 2.4, further comprising: directing an actuator to change a focus setting of the optical subsystem according to a first displacement value; performing (a) through (e) a second time, to obtain an additional image and a focus indicator value for the additional image; computing a second displacement value for the focus setting based on data including the focus indicator value for the image, the focus indicator value for the additional image and the first displacement value.

2.14 The method of paragraph 2.13, further comprising: directing the actuator to change the focus setting of the optical subsystem according to the second displacement value.

2.15 The method of paragraph 2.4, further comprising: directing an actuator to change an optical distance between the optical subsystem and the light modulation unit through a range of distances; performing (a) through (e) for each of a plurality of distances within the range in order to obtain a corresponding plurality of images and a corresponding plurality of focus indicator values; determining an optimal value for the optical distance based on an analysis of data including the plurality of focus indicator values.

2.16 The method of paragraph 2.15, further comprising: directing the actuator to change the optical distance between the optical subsystem and the light modulation unit to the optimal value.

2.17 The method of paragraph 2.4, further comprising: directing an actuator to change the focus setting of the optical subsystem through a range of settings; performing (a) through (e) for each of a plurality of focus settings within the range in order to obtain a corresponding plurality of images and a corresponding plurality of focus indicator values; determining an optimal value for the focus setting based on an analysis of data including the plurality of focus indicator values.

2.18 The method of paragraph 2.17, further comprising: directing the actuator to change the focus setting to the optimal value.

2.19 The method of paragraph 2.1, wherein the light sensing device includes a plurality of light sensing elements, wherein each of the light sensing elements generates a respective electrical signal representing intensity of a respective spatial portion of the modulated light stream, wherein said acquiring the sequence of samples comprises adding the electrical signals to obtain a sum signal and sampling the sum signal.

2.20 The method of paragraph 2.1, wherein the light sensing device includes a plurality of light sensing elements, wherein each of the light sensing elements generates a respective electrical signal representing intensity of a respective spatial portion of the modulated light stream, wherein said acquiring the sequence of samples comprises sampling each of the electrical signals and adding the sampled versions of the electrical signals in the digital domain.

2.21 The method of paragraph 2.1, wherein the light sensing device includes only one light sensing element.

2.22 A method for focusing a compressive imaging (CI) device, the method comprising:

(a) supplying a sequence of spatial patterns to a light modulation unit of the CI device;

(b) the light modulation unit modulating an incident light stream with the sequence of spatial patterns to produce a modulated light stream;

(c) acquiring a sequence of the frames from an array of light sensing elements of the CI device, wherein each of the light sensing elements receives a respective spatial portion of the modulated light stream, wherein each of the frames corresponds to respective one of the spatial patterns, wherein each of the frames includes one sample from each of the light sensing elements;

(d) determining a sequence of sum values, wherein each of the sum values is determined by adding the samples in a respective one of the frames of the acquired sequence;

(e) constructing an image using the sequence of spatial patterns and the sequence of sum values;

(f) computing a focus indicator value based on the image, wherein the focus indicator value indicates an extent to which the incident light stream is in focus at the light modulation unit.

2.23 A method for determining focus-related information for a compressive imaging (CI) device, the method comprising:

(a) modulating an incident light stream with the sequence of spatial patterns, thereby generating a modulated light stream, wherein said modulating is performed by a light modulation unit of the CI device;

(b) generating an electrical signal representing intensity of the modulated light stream as a function of time, wherein the electrical signal is generated by a light sensing device of the CI device;

(c) acquiring samples of the electrical signal;

(d) constructing an image using the sequence of spatial patterns and a subset of the acquired samples that corresponds to the sequence of spatial patterns;

(e) computing focus information based on the image, wherein the focus information comprises information regarding at extent to which the incident light stream is in focus at the light modulation unit.

2.24 The method of paragraph 2.23, wherein the number of spatial patterns in the sequence of spatial patterns is m, wherein the image is an n-pixel image with n less than the number N of light modulating elements in the light modulation unit, wherein m is less than n.

2.25 The method of paragraph 2.23, further comprising: changing an optical distance between an optical subsystem of the CI device and the light modulation unit based on the focus information.

2.26 The method of paragraph 2.23, further comprising: changing a focus setting of an optical subsystem of the CI device based on the focus information.

2.27 A method for focusing a compressive imaging (CI) device, the method comprising:

(a) modulating an incident light stream with a sequence of spatial patterns to obtain a modulated light stream, wherein said modulating is performed by a light modulation unit of the CI device;

(b) generating an electrical signal representing intensity of the modulated light stream as a function of time, wherein the electrical signal is generated by a light sensing device of the CI device;

(c) acquiring samples of the electrical signal, wherein the acquired samples include at least one sample for each of the spatial patterns;

(d) constructing an image using the sequence of spatial patterns and the acquired samples;

(e) displaying the image on a display;

(f) changing a focus setting of the CI device based on user input.

2.28 The method of paragraph 2.27, wherein the focus setting of the CI device is an optical distance between an optical subsystem of the CI device and the light modulation unit.

2.29 The method of paragraph 2.27, wherein the focus setting of the CI device is a focus setting of an optical subsystem of the CI device.

2.30 The method of paragraph 2.27, further comprising: performing (a) through (f) one or more additional times.

2B.1 A method for focusing a compressive imaging (CI) device, the method comprising:

(a) modulating an incident light stream with calibration patterns to obtain a modulated light stream, wherein said modulating is performed by a light modulation unit of the CI device, wherein the light modulation unit includes an array of light modulating elements;

(b) an array of light sensing elements of the CI device receiving the modulated light stream, where the light sensing elements receive respective spatial portions of the modulated light stream and generate respective electrical signals, wherein each electrical signal represents intensity of the respective spatial portion as a function of time, wherein the light sensing elements correspond to respective non-overlapping regions within the array of light modulating elements, wherein each of the calibration patterns specifies that the light modulating elements inside a respective one of the regions are to be set to an off state and specifies that at least a subset of the light modulating elements outside the respective region are to be set to an on state;

(c) for each of the calibration patterns, acquiring a respective group of samples from the array of light sensing elements, wherein each of the sample groups includes at least one sample of each of the electrical signals;

(d) determining spillover values corresponding respectively to the calibration patterns, wherein each of the spillover values is determined based on the sample group corresponding to the respective calibration pattern, wherein each of the spillover values indicates an extent to which modulated light from outside the respective region of the array of light modulating elements reaches the light sensing element corresponding to the respective region.

(e) computing a composite spillover value for the array of light sensing elements based on the spillover values.

2B.2 The method of paragraph 2B.1, further comprising: directing an actuator to change an optical distance between the light modulation unit and the array of light sensing elements based on data including the composite spillover value.

2B.3 The method of paragraph 2B.1, further comprising repeatedly performing a set of operations that includes: changing an optical distance between the light modulation unit and the array of light sensing elements; and performing (a) through (e), wherein the set of operations is repeated until the composite spillover value becomes less than a threshold value.

2B.4 The method of paragraph 2B.1, further comprising: directing an actuator to change an angle of orientation of the array of light modulating elements based on data including the composite spillover value.

2B.5 The method of paragraph 2B.1, further comprising repeatedly performing a set of operations that includes: changing an angle of orientation of the array of light sensing elements; and performing (a) through (e), wherein the set of operations is repeated until the composite spillover value becomes less than a threshold value.

2B.6 The method of paragraph 2B.1, wherein each of the calibration patterns specifies that all the light modulating elements outside the respective region are to take the ON state.

2B.7 The method of paragraph 2B.1, further comprising: directing an actuator to change an optical distance between the light modulation unit and the array of light sensing elements according to a first displacement value;

performing (a) through (e) a second time, to obtain an additional composite spillover value;

computing a second displacement value for the optical distance between the light modulation unit and the array of light sensing elements based on data including the composite spillover value, the additional composite spillover value and the first displacement value.

2B.8 The method of paragraph 2B.7, further comprising: directing the actuator to change the optical distance between the light modulation unit and the array of light sensing elements according to the second displacement value.

2B.9 The method of paragraph 2B.1, further comprising: directing an actuator to change an angle of orientation of the array of light sensing elements according to a first displacement value;

performing (a) through (e) a second time, to obtain an additional composite spillover value;

computing a second displacement value for the angular orientation based on data including the composite spillover value, the additional composite spillover value and the first displacement value.

2B.10 The method of paragraph 2B.9, further comprising: directing the actuator to change the angle of orientation of the array of light sensing elements according to the second displacement value.

2B.11 The method of paragraph 2B.1, further comprising: directing an actuator to change an optical distance between the light modulation unit and the array of light sensing elements through a range of distances;

performing (a) through (e) for each of a plurality of optical distances within the range in order to obtain a corresponding plurality of composite spillover values;

determining an optimal value for the optical distance based on an analysis of data including the plurality of composite spillover values.

2B.12 The method of paragraph 2B.11, further comprising: directing the actuator to change the optical distance to the optimal value.

2B.13 The method of paragraph 2B.1, further comprising: directing an actuator to change an orientation angle of the array of light sensing elements through a range of angles; performing (a) through (e) for each of a plurality of angles within the range in order to obtain a corresponding plurality of composite spillover values; determining an optimal value for the angle based on an analysis of data including the plurality of composite spillover values.

2B.14 The method of paragraph 2B.13, further comprising: directing the actuator to change the angular orientation to the optimal value.

2B.15 The method of paragraph 2B.1, wherein the number of the calibration patterns is four.

2B.16 A method for focusing a compressive imaging (CI) device, the method comprising:

(a) modulating an incident light stream with a calibration pattern to obtain a modulated light stream, wherein said modulating is performed by a light modulation unit of the CI device, wherein the light modulation unit includes an array of light modulating elements;

(b) an array of light sensing elements of the CI device receiving the modulated light stream, where the light sensing elements receive respective spatial portions of the modulated light stream and generate respective electrical signals, wherein each electrical signal represents intensity of the respective spatial portion as a function of time, wherein the light sensing elements correspond to respective non-overlapping regions within the array of light modulating elements, wherein the calibration pattern specifies that the light modulating elements inside a first one of the regions are to be set to an off state and specifies that at least a subset of the light modulating elements outside the first region are to be set to an on state, wherein the first region corresponds to a first of the light sensing elements;

(c) acquiring samples of the electrical signal generated by the first light sensing element in response to said modulating the incident light stream with the calibration pattern, wherein each of the samples indicates an extent to which modulated light from outside the first region of the array of light modulating elements reaches the first light sensing element.

2B.17 A method for focusing a compressive imaging (CI) device, the method comprising:

(a) modulating an incident light stream with calibration patterns to obtain a modulated light stream, wherein said modulating is performed by a light modulation unit of the CI device, wherein the light modulation unit includes an array of light modulating elements;

(b) an array of light sensing elements of the CI device receiving the modulated light stream, wherein each of the light sensing elements receives a respective spatial portion of the modulated light stream and generates a respective electrical signal representing intensity of the respective spatial portion as a function of time, wherein the calibration patterns correspond to respective regions of the array of light modulating elements and correspond to respective ones of the light sensing elements, wherein each of the calibration patterns specifies that at least a subset of the light modulating elements inside the respective region are to be set to an on state and specifies that the light modulating elements outside the respective region are to be set to an off state;

(c) for each of the calibration patterns, acquiring a respective group of samples from the array of light sensing elements, wherein each of the sample groups includes at least one sample of each of the electrical signals;

(d) computing spillover values corresponding respectively to the calibration patterns, wherein each of the spillover values is computed based on the sample group corresponding to the respective calibration pattern, wherein each of the spillover values indicates an extent to which modulated light from the respective region of the array of light modulating elements reaches light sensing elements of the array other than the respective light sensing element; and (e) computing a composite spillover value for the array of light sensing elements based on the spillover values.

2B.18 A method for focusing a compressive imaging (CI) device, the method comprising:

(a) modulating an incident light stream with a calibration pattern to obtain a modulated light stream, wherein said modulating is performed by a light modulation unit of the CI device, wherein the light modulation unit includes an array of light modulating elements;

(b) an array of light sensing elements of the CI device receiving the modulated light stream, wherein each of the light sensing elements receives a respective spatial portion of the modulated light stream and generates a respective electrical signal representing intensity of the respective spatial portion as a function of time, wherein the calibration pattern correspond to a region of the array of light modulating elements and to one of the light sensing elements, wherein the calibration pattern specifies that at least a subset of the light modulating elements within the region are to be set to the on state, and specifies that the light modulating elements outside the region are to be set to the off state;

(c) acquiring a group of samples corresponding to the calibration pattern, wherein the sample group includes at least one sample of each of the electrical signals;

(d) computing a spillover value for the calibration pattern, wherein the spillover value is computed based on the sample group and indicates an extent to which modulated light from the region of the array of light modulating elements reaches light sensing elements other than the corresponding light sensing element.

2B.19 The method of paragraph 2B.18, wherein the region is located at a center of the array of light modulating elements.

2B.20. A method comprising:

focusing a compressive imaging (CI) device, wherein the CI device includes a light modulation unit and an array of light sensing elements, wherein the light modulation unit includes an array of L light modulating elements, wherein the light modulation unit is configured to modulate an incident light stream with a sequence of spatial patterns to produce a modulated light stream, wherein each of the L light sensing elements is configured to generate a respective electrical signal representing intensity of a respective spatial portion of the modulated light stream as a function of time, wherein said focusing the CI device includes:

(a) injecting p calibration patterns into the sequence of spatial patterns so that the light modulation unit modulates the incident light stream with each of the p calibration patterns, wherein p is a positive integer that is less than or equal to L, wherein the p calibration patterns correspond respectively to p non-overlapping regions of the array of light modulating elements, wherein the p non-overlapping regions correspond respectively to p of the L light sensing elements, wherein each of the p calibration patterns specifies that at least a subset of the light modulating elements within the respective region are to take an ON state and that light modulating elements outside the respective region are to take an OFF state;

(b) for each of the p calibration patterns, acquiring a corresponding group of samples from the array of light sensing elements, wherein each of the p sample groups includes at least one sample of each of the L electrical signals;

(c) computing a set of p spillover values corresponding respectively to the p calibration patterns, wherein each of the p spillover values is computed based on the corresponding sample group and indicates an extent to which modulated light from the respective region of the array of light modulating elements reaches light sensing elements of the array other than the respective light sensing element; and (d) computing a composite spillover value for the array of light sensing elements based on the set of p spillover values.

2C.1 A method for determining focus-related information for a compressive imaging (CI) device, the method comprising:

(a) modulating an incident light stream with a sequence of spatial patterns to obtain a modulated light stream, wherein said modulating is performed by a light modulation unit of the CI device, wherein the light modulation unit includes an array of light modulating elements;

(b) an array of light sensing elements of the CI device receiving the modulated light stream, wherein the light sensing elements receive respective spatial portions of the modulated light stream and generate respective electrical signals, wherein each of the electrical signals represents intensity of the respective spatial portion as a function of time, wherein the light sensing elements correspond to respective non-overlapping regions of the array of light modulating elements;

(c) acquiring measurements from the array of light sensing elements, wherein the measurements include sample sets that correspond respectively to the light sensing elements, wherein each sample set includes samples of the electrical signal generated by the respective light sensing element, with the samples including at least one sample for each of the spatial patterns (e.g., exactly one); (in the text, explain that you might only acquire one set of samples from one sensor)

(d) computing a focus indicator value based on two or more noise values for two or more respective ones of the light sensing devices, wherein the focus indicator value indicates an extent to which the modulated light stream is in focus at the sensor array, wherein each of the two or more noise values is computed by: constructing a respective sub-image based on the sample set of the respective light sensing element and also on a restriction of the spatial patterns to the region of the array of light modulating elements corresponding to the respective light sensing element; and computing an amount of noise present in the respective sub-image.

2C.2 The method of paragraph 2C.1, further comprising: determining a displacement value for the array of light sensing elements based on data including the focus indicator value; and directing the array of light sensing elements to be translated according to the displacement value.

2C.3 The method of paragraph 2C.1, further comprising: determining an angular displacement value for the array of light sensing elements based on data including the focus indicator value; and directing the array of light sensing elements to be rotated according to the angular displacement value.

2C.4 The method of paragraph 2C.1, further comprising: changing an optical distance between the light modulation unit and the array of light sensing elements; and performing said changing and the operations (a) through (d) one or more times until the focus indicator value is optimized.

2C.5 The method of paragraph 2C.1, further comprising: changing an angular orientation of the array of light sensing elements; and performing said changing and the operations (a) through (d) one or more times until the focus indicator value is optimized.

2C.6. A method for determining focus-related information for a compressive imaging (CI) device, the method comprising:

(a) modulating an incident light stream with a sequence of spatial patterns to obtain a modulated light stream, wherein said modulating is performed by a light modulation unit of the CI device, wherein the light modulation unit includes an array of light modulating elements;

(b) an array of light sensing elements of the CI device receiving the modulated light stream, wherein the light sensing elements receive respective spatial portions of the modulated light stream and generate respective electrical signals, wherein each of the electrical signals represents intensity of the respective spatial portion as a function of time, wherein the light sensing elements correspond to respective non-overlapping regions of the array of light modulating elements;

(c) acquiring a set of samples from a first of the light sensing elements, wherein the sample set includes samples of the electrical signal generated by the first light sensing element, with the samples including at least one sample for each of the spatial patterns;

(d) computing a focus indicator value for the first light sensing device, wherein the focus indicator value indicates an extent to which the modulated light stream is in focus at the sensor array, wherein the focus indicator value is computed by: constructing a sub-image based on the sample set and on a restriction of the spatial patterns to a the region of the array of light modulating elements corresponding to the first light sensing element; and computing an amount of noise present in the sub-image.

2D.1. A method for determining focus-related information for a compressive imaging (CI) device, the method comprising:

(a) modulating an incident light stream with a sequence of spatial patterns to obtain a modulated light stream, wherein said modulating is performed by a light modulation unit of the CI device, wherein the light modulation unit includes an array of light modulating elements;

(b) an array of light sensing elements of the CI device receiving the modulated light stream, wherein the light sensing elements receive respective spatial portions of the modulated light stream and generate respective electrical signals, wherein each of the electrical signals represents intensity of the respective spatial portion as a function of time, wherein the light sensing elements correspond to respective non-overlapping regions on the array of light modulating elements;

(c) acquiring measurements from the array of light sensing elements, wherein the measurements include sample sets that correspond respectively to the light sensing elements, wherein each sample set includes samples of the electrical signal generated by the respective light sensing element, with the samples including at least one sample for each of the spatial patterns;

(d) computing a focus indicator value based on two or more spillover values for two or more respective ones of the light sensing devices, wherein the focus indicator value indicates an extent to which the modulated light stream is in focus at the sensor array, wherein each of the two or more spillover values is computed by: constructing a respective image based on the sample set of the respective light sensing element and also on the spatial patterns; and summing pixels in the image outside the region corresponding to the respective light sensing element.

2D.2. A method for determining focus-related information for a compressive imaging (CI) device, the method comprising:

(a) modulating an incident light stream with a sequence of spatial patterns to obtain a modulated light stream, wherein said modulating is performed by a light modulation unit of the CI device, wherein the light modulation unit includes an array of light modulating elements;

(b) an array of light sensing elements of the CI device receiving the modulated light stream, wherein the light sensing elements receive respective spatial portions of the modulated light stream and generate respective electrical signals, wherein each of the electrical signals represents intensity of the respective spatial portion as a function of time, wherein the light sensing elements correspond to respective non-overlapping regions on the array of light modulating elements;

(c) acquiring measurements from the array of light sensing elements, wherein the measurements include sample sets that correspond respectively to the light sensing elements, wherein each sample set includes samples of the electrical signal generated by the respective light sensing element, with the samples including at least one sample for each of the spatial patterns;

(d) computing a spillover value for a first of the light sensing devices, wherein the spillover value indicates an extent to which the modulated light stream is in focus at the sensor array, wherein the spillover value is computed by: constructing an image based on the sample set corresponding to the first light sensing element and also on the spatial patterns; and summing pixels in the image outside the region corresponding to the first light sensing element.

3.1 A method for focusing a compressive imaging (CI) device, the method comprising:

(a) supplying a sequence of high-frequency spatial patterns to a light modulation unit of the CI device, wherein the light modulation unit includes an array of light modulating elements, wherein each of the high-frequency spatial patterns is a spatial pattern whose AC component includes only spatial frequencies greater than or equal to a cutoff frequency;

(b) the light modulation unit modulating an incident light stream with the sequence of high-frequency spatial patterns to produce a modulated light stream;

(c) a light sensing device of the CI device receiving the modulated light stream and acquiring a sequence of samples representing an intensity of the modulated light stream as a function of time, wherein the sequence of samples includes at least one sample for each of the high-frequency spatial patterns;

(d) computing a focus indicator value based on the sequence of samples, wherein the focus indicator value indicates an extent to which the incident light stream is in focus at the array of light modulating elements.

3.2 The method of paragraph 3.1, wherein each of the high-frequency spatial patterns corresponds to spatial sinusoid whose spatial frequency is greater than or equal to the cutoff frequency.

3.3 The method of paragraph 3.1, wherein the cutoff-frequency is programmable.

3.4 The method of paragraph 3.1, wherein the CI device includes an optical subsystem that receives and operates on the incident light stream prior to the incident light stream arriving at the light modulation unit.

3.5 The method of paragraph 3.4, further comprising: (e) changing a focus setting of the optical subsystem based on data including the focus indicator value.

3.6 The method of paragraph 3.4, further comprising repeatedly performing a set of operations including: changing a focus setting of the optical subsystem; and performing (a), (b), (c) and (d), wherein the set of operations is repeated until the focus indicator value becomes less than a threshold value.

3.7 The method of paragraph 3.4, further comprising: changing an optical distance between the light modulation unit and the optical subsystem based on data including the focus information.

3.8 The method of paragraph 3.4, further comprising repeatedly performing a set of operations including: changing an optical distance between the light modulation unit and the optical subsystem; and performing (a), (b), (c) and (d), wherein the set of operations is repeated until the focus indicator value becomes less than a threshold value.

3.9 The method of paragraph 3.4, further comprising: directing an actuator to change an optical distance between the optical subsystem and the light modulation unit according to a first displacement value; performing (a) through (d) a second time, to obtain an additional focus indicator value for an additional sequence of samples; and computing a second displacement value for the optical distance based on data including the focus indicator value for the sequence of samples, the focus indicator value for the additional sequence of samples and the first displacement value.

3.10 The method of paragraph 3.9, further comprising: directing the actuator to change the optical distance based on the second displacement value.

3.11 The method of paragraph 3.4, further comprising: directing an actuator to change a focus setting of the optical subsystem according to a first displacement value; performing (a) through (d) a second time, to obtain an additional focus indicator value for an additional sequence of samples; and computing a second displacement value for the focus setting based on data including the focus indicator value for the sequence of samples, the focus indicator value for the additional sequence of samples and the first displacement value.

3.12 The method of paragraph 3.11, further comprising: directing the actuator to change the focus setting of the optical subsystem according to the second displacement value.

3.13 The method of paragraph 3.1, wherein said computing the focus indicator value includes: removing a temporal DC component of the sequence of samples to obtain an AC sequence of samples; and computing an average magnitude of the AC sequence of samples.

4.1 A system comprising:
a light modulation unit configured to receive an incident light stream from an optical input path, wherein the light modulation unit includes an array of mirrors configured to receive respective portions of the incident light stream, wherein each of the mirrors is configured to (a) reflect the respective portion of the incident light stream onto a first optical path when the mirror is in a first orientation state and (b) reflect the respective portion of the incident light stream onto a second optical path when the mirror is in a second orientation state;
a light sensing device configured to receive a first light stream comprising the portions of the incident light stream that are reflected onto the first optical path by mirrors in the first orientation state, wherein the first light sensing device is configured to generate a sequence of samples representing intensity of the first light stream as function of time;
a time-of-flight determining device (TDD) configured to: transmit a light pulse onto the second optical path so that the light pulse is reflected onto the input optical path and out of the system by mirrors that are in the second orientation state; receive a second light stream comprising the portions of the incident light stream that are reflected onto the second optical path by the mirrors in the second orientation state; detect a reflected pulse occurring in the second light stream; and determine a time of flight between the transmission of the light pulse and detection of the reflected pulse;
a processing unit configured to determine a range from the system to an external object based on the time of flight.

4.2 The system of paragraph 4.1, further comprising: an optical subsystem positioned along the input optical path and configured to operate on the incident light stream before it is provided to the light modulation unit.

4.3 The system of paragraph 4.2, further comprising: a first actuator configured to adjust a first optical distance between the optical subsystem and the light modulation unit, wherein the processing unit is configured to compute a first adjustment value for the first optical distance based on the determined range and to direct the first actuator to adjust the first optical distance according to the first adjustment value.

4.4 The system of paragraph 4.3, further comprising: a second actuator configured to adjust a second optical distance between the light modulation unit and the light sensing device, wherein the processing unit is configured to compute a second adjustment value for the second optical distance based on the first adjustment value and to direct the second actuator to adjust the second optical distance according to the second adjustment value.

4.5 The system of paragraph 4.3, further comprising: a second actuator configured to adjust an angular orientation of the light sensing device, wherein the processing unit is configured to compute an angle adjustment value for the angular orientation based on the first adjustment value and to direct the second actuator to adjust the angular orientation according to the angle adjustment value.

4.6 The system of paragraph 4.2, further comprising: a first actuator configured to adjust a focus setting of the optical subsystem, wherein the processing unit is configured to direct the first actuator to adjust said focus setting based on the determined range.

4.7 The system of paragraph 4.1, wherein the TDD includes a transmitter, a detector, and a timing subsystem, wherein the transmitter is configured to generate the light pulse, wherein the detector is configured to receive the second light stream and to detect the reflected pulse, wherein the timing subsystem is configured to determine the time of flight between said transmission and said detection.

4.8 The system of paragraph 4.7, wherein the transmitter includes a laser light source.

4.9 The system of paragraph 4.1, further comprising: a control unit configured to drive the array of mirrors through a sequence of spatial patterns, wherein the TDD is configured to transmit the light pulse and detect the reflected pulse within a period of time corresponding to a single one of the spatial patterns.

4.10 The system of paragraph 4.1, wherein the sequence of samples corresponds to M of the spatial patterns, wherein the sequence of samples is usable to construct an N-pixel image, wherein M is less than N.

4.11 The system of paragraph 4.1, wherein the TDD is configured to determine a Doppler shift between the light pulse and the reflected pulse, wherein the processing unit is configured to compute a range velocity based on the Doppler shift.

4.12 A system comprising:
a light modulation unit configured to receive an incident light stream from an optical input path, wherein the light modulation unit includes an array of mirrors configured to receive respective portions of the incident light stream, wherein each of the mirrors is configured to (a) reflect the respective portion of the incident light stream onto a first optical path when the mirror is in a first orientation state and (b) reflect the respective portion of the incident light stream onto a second optical path when the mirror is in a second orientation state;
a light sensing device configured to receive a first light stream comprising the portions of the incident light stream that are reflected onto the first optical path by mirrors in the first orientation state, wherein the light sensing device is configured to generate a sequence of samples representing intensity of the first light stream as function of time;
a range finder configured to: transmit a light signal onto the second optical path so that the light signal is reflected onto the input optical path and out of the system by mirrors that are in the second orientation state; receive a second light stream comprising the portions of the incident light stream that are reflected onto the second optical path by the mirrors in the second orientation state, wherein the second light stream includes a reflected light signal due to reflection of the transmitted light signal from an external object; and determine a range to the external object based on the transmitted light signal and the reflected light signal.

4.13 The system of paragraph 4.12, further comprising: a processing unit; and an optical subsystem positioned along the input optical path and configured to operate on the incident light stream before it is provided to the light modulation unit.

4.14 The system of paragraph 4.13, further comprising: a first actuator configured to adjust a first optical distance between the optical subsystem and the light modulation unit, wherein the processing unit is configured to compute an optimal value for the first optical distance based on the determined range and to direct the first actuator to set the first optical distance to the optimal value for the first optical distance.

4.15 The system of paragraph 4.14, further comprising: a second actuator configured to adjust a second optical distance between the light modulation unit and the light sensing device, wherein the processing unit is configured to compute an optimal value for the second optical distance based on the optimal value for the first optical distance and to direct the second actuator to set the second optical distance to the optimal value for the second optical distance.

4.16 The system of paragraph 4.13, further comprising: a first actuator configured to adjust a first optical distance between the optical subsystem and the light modulation unit, wherein the processing unit is configured to compute a first adjustment value for the first optical distance based on the determined range and to direct the first actuator to adjust the first optical distance according to the first adjustment value.

4.17 The system of paragraph 4.16, further comprising: a second actuator configured to adjust a second optical distance between the light modulation unit and the light sensing device, wherein the processing unit is configured to compute a second adjustment value for the second optical distance based on the first adjustment value and to direct the second actuator to adjust the second optical distance according to the second adjustment value.

4.18 The system of paragraph 4.16, further comprising: a second actuator configured to adjust an angular orientation of the light sensing device, wherein the processing unit is configured to compute an angle adjustment value for the angular orientation based on the first adjustment value and to direct the second actuator to adjust the angular orientation according to the angle adjustment value.

4.19 The system of paragraph 4.13, further comprising: a first actuator configured to adjust a focus setting of the optical subsystem, wherein the processing unit is configured to: compute an optimal value for the focus setting based on the determined range; and direct the first actuator to set the focus setting to the optimal value for the focus setting.

4.20 The system of paragraph 4.19, further comprising: a second actuator configured to adjust an optical distance between the light modulation unit and the light sensing device, wherein the processing unit is configured to: compute an optimal value for the optical distance based on the optimal value for the focus setting and to direct the second actuator to set the optical distance to the optimal value for the optical distance.

4.21 The system of paragraph 4.13, further comprising: a first actuator configured to adjust a focus setting of the optical subsystem, wherein the processing unit is configured to direct the first actuator to adjust said focus setting based on the determined range.

4.22 The system of paragraph 4.12, wherein the range finder includes a laser light source.

4.23 The system of paragraph 4.12, further comprising: a control unit configured to drive the array of mirrors through a sequence of spatial patterns, wherein the range finder is configured to transmit the light signal and receive the reflected light signal while the array of mirrors is being driven through the sequence of spatial patterns.

4.24 The system of paragraph 4.23, wherein the sequence of samples corresponds to M of the spatial patterns, wherein the sequence of samples is usable to construct an N-pixel image, wherein M is less than N.

4.25 The system of paragraph 4.12, wherein the range finder is configured to determine a Doppler shift between the transmitted light signal and the reflected light signal, wherein the processing unit is configured to compute a range velocity based on the Doppler shift.

5.1 A system comprising:
a light modulation unit configured to receive an incident light stream from an optical input path, wherein the light modulation unit includes an array of mirrors configured to receive respective portions of the incident light stream, wherein each of the mirrors is configured to (a) reflect the respective portion of the incident light stream onto a first optical path when the mirror is in a first orientation state and (b) reflect the respective portion of the incident light stream onto a second optical path when the mirror is in a second orientation state;

a first bandpass filter configured to restrict a first light stream to a first wavelength range in order to produce a restricted light stream, wherein the first light stream comprises the portions of the incident light stream that are reflected onto the first optical path by mirrors in the first orientation state;

a light sensing device configured to receive the restricted light stream and generate a sequence of samples representing intensity of the restricted light stream as a function of time;

a second bandpass filter configured to restrict a second light stream to a visible wavelength range in order to obtain a visible light stream, wherein the second light stream comprises the portions of the incident light stream that are reflected onto the second optical path by the mirrors in the second orientation state;

an image sensor configured to acquire a sequence of images of the visible light stream, wherein the image sensor includes an array of light detecting elements.

5.2 The system of paragraph 5.1, wherein the first wavelength range and the visible wavelength range are non-overlapping (or non-identical).

5.3 The system of paragraph 5.1, wherein the first bandpass filter is configured so that the first wavelength range is adjustable (or selectable).

5.4 The system of paragraph 5.1, further comprising: an actuator configured to adjust an optical distance between the light modulation unit and the light sensing device, wherein the first bandpass filter is configured so that the first wavelength range is selectable, wherein the processing unit is configured to: receive user input specifying a selection for the first wavelength range; determine an adjustment value for the optical distance based on the specified selection for the first wavelength range; and direct the actuator to adjust the optical distance based on the determined adjustment value.

5.5 The system of paragraph 5.1, further comprising: an optical subsystem configured to receive and operate on the incident light stream prior to the incident light stream arriving at the light modulation unit; a display; and a processing unit configured to display the sequence of images on the display.

5.6 The system of paragraph 5.5, further comprising: a first actuator configured to adjust a focus setting of the optical subsystem, wherein the processing unit is configured to: receive user input specifying a focus adjustment; and direct the first actuator to adjust the focus setting of the optical subsystem based on the user-specified focus adjustment.

5.7 The system of paragraph 5.5, further comprising: an actuator configured to adjust a pre-modulation optical distance between the optical subsystem and the light modulation unit, wherein the processing unit is configured to: receive user input specifying a focus adjustment; and direct the actuator to adjust the pre-modulation optical distance based on the user-specified focus adjustment.

5.8 The system of paragraph 5.7, wherein the processing unit is further configured to: compute a first adjustment value for a first post-modulation optical distance between the light modulation unit and the image sensor based on the user-specified focus adjustment; computing a second adjustment value for a second post-modulation optical distance between the light modulation unit and the light sensing device based on the first adjustment value; direct a first additional actuator to adjust the first post-modulation optical distance based on the first adjustment value; and direct a second additional actuator to adjust the second post-modulation optical distance based on the second adjustment value.

5.9 The system of paragraph 5.5, further comprising: a first actuator configured to adjust a first optical distance between the light modulation unit and the image sensor.

5.10 The system of paragraph 5.9, further comprising: a second actuator configured to adjust a second optical distance between the light modulation unit and the light sensing device, wherein the processing unit is configured to: receive user input specifying a focus adjustment for the first optical distance; direct the first actuator to adjust the first optical distance based on the user-specified focus adjustment; determine an adjustment value for the second optical distance based on the user-specified focus adjustment; and direct the second actuator to adjust the second optical distance based on the determined adjustment value.

5.11 The system of paragraph 5.1, further comprising: a control unit configured to drive the array of mirrors through a sequence of spatial patterns, wherein the sequence of spatial patterns includes a first subsequence, wherein each spatial pattern of the first subsequence specifies that all the mirrors be in the second orientation state.

5.12 The system of paragraph 5.1, further comprising: an optical subsystem configured to receive and operate on the incident light stream prior to the incident light stream arriving at the light modulation unit; a processing unit configured to compute a focus indicator value based on at least one of the images, wherein the focus indicator value indicates an extent to which the visible light stream is in focus at the image sensor.

5.13 The system of paragraph 5.12, further comprising: a first actuator configured to adjust a focus setting of the optical subsystem, wherein the processing unit is configured to direct the first actuator to adjust the focus setting of the optical subsystem based on data including the focus indicator value.

5.14 The system of paragraph 5.12, further comprising: a first actuator configured to adjust a first optical distance between the optical subsystem and the light modulation unit, wherein the processing unit is configured to: compute a first adjustment value for the first optical distance based on data including the focus indicator value; and direct the first actuator to adjust the first optical distance based on the first adjustment value.

5.15 The system of paragraph 5.14, wherein the processing unit is further configured to: compute a second adjustment value for a second optical distance between the light modulation unit and the image sensor based on the first adjustment value; compute a third adjustment value for a third optical distance between the light modulation unit and the light sensing device based on the first adjustment value; direct a second actuator to adjust the second optical distance based on the second adjustment value; direct a third actuator to adjust the third optical distance based on the third adjustment value.

5.16 The system of paragraph 5.12, further comprising: a first actuator configured to adjust a first optical distance between the light modulation unit and the image sensor.

5.17 The system of paragraph 5.16, a second actuator configured to adjust a second optical distance between the light modulation unit and the light sensing device, wherein the processing unit is configured to: compute a first adjustment value for the first optical distance based on data including the focus indicator value; compute a second adjustment value for the second optical distance based on the first adjustment value; direct the first actuator to adjust the first optical distance based on the first adjustment value; and direct the second actuator to adjust the second optical distance based on the second adjustment value.

5.18 The system of paragraph 5.1, further comprising: an optical subsystem configured to receive and operate on the incident light stream prior to the incident light stream arriving at the light modulation unit; a first actuator configured to adjust a focus setting of the optical subsystem; a control unit configured to drive the array of mirrors through a sequence of spatial patterns; a processing unit configured to operate on a first subset of the sequence of images acquired by the image sensor to determine focus indicator values, wherein each of focus indicator values is determined based on one or more of the images of the first subset, wherein each of the focus indicator values indicates an extent to which the visible light stream is in focus at the image sensor.

5.19 The system of paragraph 5.18, wherein the processing unit is configured to drive the first actuator based on the focus indicator values in order to locate an improved value of the focus setting.

5.20 The system of paragraph 5.18, wherein the spatial patterns include one-dimensional patterns, wherein each of the one-dimensional patterns is restricted to a corresponding one-dimensional path on the array of the mirrors.

5.21 The system of paragraph 5.1, further comprising:

a first actuator configured to adjust a first optical path length between the light modulation unit and the image sensor;

a second actuator configured to adjust a second optical path length between the light modulation unit and the light sensing device;

a control unit configured to drive the array of mirrors through a sequence of spatial patterns, wherein the sequence of spatial patterns includes a plurality of repetitions of a collection of one or more calibration patterns, wherein the one or more calibration patterns correspond respectively to one or more subsets of the array of mirrors, wherein each of the one or more subsets corresponds to a respective subset of the array of light detecting elements, wherein the sequence of images acquired by the image sensor includes an image for each of the spatial patterns; and a processing unit configured to compute a sequence of spillover values, wherein each of the spillover values corresponds to respective one of the plurality of repetitions of the set of one or more calibration patterns and is computed based on one or more of the images that correspond to the respective repetition, wherein each spillover value indicates an extent to which modulated light from the one or more subsets of the array of mirrors fail to reach their respective subsets of the array of light detecting elements.

5.22 The system of paragraph 5.21, wherein the processing unit is configured to: drive the first actuator based on the spillover values in order to determine an improved value for the first optical path length; compute an improved value for the second optical path length based on the improved value for the first optical path length; and direct the second actuator to adjust the second optical path length based on the improved value for the second optical path length.

5B.1 A system comprising:
a first optical subsystem configured to receive an incident light stream and to split the incident light stream into a first light stream and a second light stream;
a light modulation unit configured to modulate the first light stream with a sequence of spatial patterns to obtain a modulated light stream;
a first light sensing device configured to receive the modulated light stream and to generate a first sequence of samples representing intensity of the modulated light stream as a function of time;
an image sensor configured to receive the second light stream and to acquire a sequence of images of the second light stream, wherein the image sensor includes an array of light detecting elements.

5B.2 The system of paragraph 5B.1, further comprising: a first bandpass filter configured to receive and the modulated light stream and to restrict the modulated light stream to a first wavelength range, wherein the first light sensing device is configured to receive the modulated light stream as restricted to the first wavelength range.

5B.3 The system of paragraph 5B.2, wherein the first bandpass filter is configured so that the first wavelength range is adjustable.

5B.4 The system of paragraph 5B.2, further comprising an actuator configured to adjust an optical distance between the light modulation unit and the first light sensing device, wherein the first bandpass filter is configured so that the first wavelength range is selectable, wherein the processing unit is configured to: receive user input specifying a selection for the first wavelength range; determine a value for the optical distance based on the specified selection for the first wavelength range; and direct the actuator to adjust the optical distance based on the determined value.

5B.5 The system of paragraph 5B.1, further comprising a second bandpass filter configured to restrict the second light stream to a visible wavelength range, wherein the image sensor is configured to receive the second light stream as restricted to the visible wavelength range.

5B.6 The system of paragraph 5B.1, wherein the first light stream is restricted to a first wavelength range and the second light stream is restricted to a visible wavelength range, wherein the first wavelength range is not the same as the visible wavelength range.

5B.7 The system of paragraph 5B.1, further comprising: a second optical subsystem configured to receive and operate on the incident light stream prior to the incident light stream arriving at the first optical subsystem; a display; and a processing unit configured to display the sequence of images on the display.

5B.8 The system of paragraph 5B.7, wherein the processing unit is configured to: receive user input specifying a focus adjustment; and adjust a focus setting of the second optical subsystem based on the user-specified focus adjustment.

5B.9 The system of paragraph 5B.8, wherein the processing unit is configured to: evaluate a first calibration function based on a current value of the focus setting to obtain an second value of the focus setting, wherein the first calibration function relates optimal values of the focus setting for focusing the second light stream onto the image sensor to optimal values of the focus setting for focusing the first light stream onto the light modulation unit; and change the focus setting of the second optical subsystem to the second value.

5B.10 The system of paragraph 5B.9, wherein the processing unit is further configured to: evaluate a second calibration function based on the second value of the focus setting to obtain an optimal value for an optical distance between the light modulation unit and the light sensing device; and change the optical distance to the optimal value.

5B.11 The system of paragraph 5B.7, wherein the processing unit is configured to: receive user input specifying a focus adjustment; and change a first optical distance between the first optical subsystem and the image sensor based on the user-specified focus adjustment.

5B.12 The system of paragraph 5B.11, wherein the processing unit is further configured to: evaluate a first calibration function based on a current value of the first optical distance to obtain a second value for a second optical distance between the first optical subsystem and the light modulation unit, wherein the first calibration function relates optimal values of the first optical distance for focusing the second light stream onto the image sensor to optimal values of the second optical distance for focusing the first light stream onto the light modulation unit; and change the second optical distance to the second value.

5B.13 The system of paragraph 5B.12, wherein the processing unit is further configured to: evaluate a second calibration function based on the second value of the second optical distance to obtain an optimal value for a third optical distance between the light modulation unit and the light sensing device; and change the third optical distance to the optimal value.

5B.14 The system of paragraph 5B.1, further comprising: a second optical subsystem configured to receive and operate on the incident light stream prior to the incident light stream arriving at the first optical subsystem; and a processing unit configured to compute focus indicator values for respective ones of the images, wherein each focus indicator value indicates an extent to which the second light stream is in focus at the image sensor.

5B.15 The system of paragraph 5B.14, wherein the processing unit is configured to: change a focus setting of the second optical subsystem one or more times until the focus indicator value is optimized.

5B.16 The system of paragraph 5B.15, wherein the processing unit is configured to: evaluate a first calibration function based on a first value of the focus setting to obtain a second value of the focus setting, wherein the first calibration function relates optimal values of the focus setting for focusing the second light stream onto the image sensor to optimal values of the focus setting for focusing the first light stream onto the light modulation unit; and change the focus setting of the second optical subsystem to the second value.

5B.17 The system of paragraph 5B.16, wherein the processing unit is further configured to: evaluate a second calibration function based on the second value of the focus setting to obtain an optimal value for an optical distance between the light modulation unit and the light sensing device; and change the optical distance to the optimal value.

5B.18 The system of paragraph 5B.14, wherein the processing unit is configured to change a first optical distance between the first optical subsystem and the image sensor one or more times until the focus indicator value is optimized.

5B.19 The system of paragraph 5B.18, wherein the processing unit is configured to: evaluate a first calibration function based on a first value of the first optical distance to obtain a second value for a second optical distance between the first optical subsystem and the light modulation unit, wherein the first calibration function relates optimal values of the first optical distance for focusing the second light stream onto the image sensor to optimal values of the second optical distance for focusing the first light stream onto the light modulation unit; and change the second optical distance to the second value.

5B.20 The system of paragraph 5B.19, wherein the processing unit is further configured to: evaluate a second calibration function based on the second value of the second optical distance to obtain an optimal value for a third optical distance between the light modulation unit and the light sensing device; and change the third optical distance to the optimal value.

5B.21 A system comprising:
a first optical subsystem configured to receive an incident light stream and to split the incident light stream into a first light stream and a second light stream;
a light modulation unit configured to receive the first light stream and to modulate the first light stream, wherein the light modulation unit includes an array of mirrors configured to receive respective portions of the first light stream, wherein each of the mirrors is configured to (a) reflect the respective portion of the first light stream onto a first optical path when the mirror is in a first orientation state and (b) reflect the respective portion of the first light stream away from the first optical path when the mirror is in a second orientation state;
a first light sensing device configured to receive a modulated light stream from the first optical path, wherein the modulated light stream comprises the portions of the first light stream that are reflected onto the first optical path by mirrors in the first orientation state, wherein the first light sensing device is further configured to generate a first sequence of samples representing intensity of the modulated light stream as a function of time;
an image sensor configured to receive the second light stream and to acquire a sequence of images of the second light stream, wherein the image sensor includes an array of light detecting elements.

5B.22 The system of paragraph 5B.21, wherein the first optical subsystem includes a TIR prism pair, wherein a first prism of the TIR prism pair is configured to generate the first light stream by partially transmitting the incident light stream and generate the second light stream by partially reflecting the incident light stream.

5B.23 The system of paragraph 5B.22, wherein a first surface of a first prism of the TIR prism pair is coated with a dielectric coating in order to restrict the second light stream to a visible wavelength range.

5B.24 The system of paragraph 5B.21, wherein each of the mirrors is configured to reflect the respective portion of the first light stream onto a second optical path when the mirror is in the second orientation state, wherein the system further comprises a second light sensing device configured to receive a complementary modulated light stream from the second optical path, wherein the complementary modulated light stream comprises the portions of the first light stream that are reflected onto the second optical path by mirrors in the second orientation state, wherein the second light sensing device is further configured to generate a second sequence of samples representing intensity of the complementary modulated light stream.

Any of the various embodiments described herein may be combined to form composite embodiments. Furthermore, any of the various embodiments described in U.S. Provisional Application No. 61/372,826 and in U.S. patent application Ser. Nos. 13/193,553, 13/193,556 and 13/197,304 may be combined with any of the various embodiments described herein to form composite embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for focusing a compressive imaging (CI) device, the method comprising:
    (a) supplying a sequence of spatial patterns to a light modulation unit of the CI device, wherein the light modulation unit includes an array of light modulating elements;
    (b) the light modulation unit modulating an incident light stream with the sequence of spatial patterns to produce a modulated light stream, wherein each of the spatial patterns is restricted to a subset of the array of light modulating elements;
    (c) a light sensing device of the CI device receiving the modulated light stream and acquiring a sequence of samples representing an intensity of the modulated light stream as a function of time, wherein the sequence of samples includes at least one sample for each of the spatial patterns;
    (d) constructing an image using the sequence of spatial patterns and the acquired samples;
    (e) computing a focus indicator value based on the image, wherein the focus indicator value indicates an extent to which the incident light stream is in focus at the light modulation unit.

2. The method of claim 1, wherein the subset of the array of light modulating elements is a convex region located at the center of the array of light modulating elements.

3. The method of claim 1, wherein the CI device includes an optical subsystem that receives and operates on the incident light stream prior to the incident light stream arriving at the light modulation unit.

4. The method of claim 3, further comprising: changing a focus setting of the optical subsystem based on data including the focus indicator value.

5. The method of claim 4, further comprising repeatedly performing a set of operations that includes: changing a focus setting of the optical subsystem; and performing (a), (b), (c), (d) and (e), wherein the set of operations is repeated until the focus indicator value becomes less than a threshold value.

6. The method of claim 3, further comprising: changing an optical distance between the optical subsystem and the light modulation unit based on data including the focus indicator value.

7. The method of claim 3, further comprising repeatedly performing a set of operations that includes: changing an optical distance between the optical subsystem and the light modulation unit; and performing (a), (b), (c), (d) and (e), wherein the set of operations is repeated until the focus indicator value becomes less than a threshold value.

8. The method of claim 7, further comprising: changing an optical distance between the light modulation unit and the light sensing device based on a final distance between the optical subsystem and the light modulation unit after the focus indicator value becomes less than the threshold value.

9. The method of claim 3, further comprising:
    directing an actuator to change an optical distance between the optical subsystem and the light modulation unit according to a first displacement value;
    performing (a) through (e) a second time, to obtain an additional image and a focus indicator value for the additional image;
    computing a second displacement value for the optical distance based on data including the focus indicator value for the image, the focus indicator value for the additional image and the first displacement value.

10. The method of claim 9, further comprising: directing the actuator to change the optical distance according to the second displacement value.

11. The method of claim 3, further comprising:
directing an actuator to change a focus setting of the optical subsystem according to a first displacement value;
performing (a) through (e) a second time, to obtain an additional image and a focus indicator value for the additional image;
computing a second displacement value for the focus setting based on data including the focus indicator value for the image, the focus indicator value for the additional image and the first displacement value.

12. The method of claim 11, further comprising: directing the actuator to change the focus setting of the optical subsystem according to the second displacement value.

13. The method of claim 3, further comprising:
directing an actuator to change an optical distance between the optical subsystem and the light modulation unit through a range of distances;
performing (a) through (e) for each of a plurality of distances within the range in order to obtain a corresponding plurality of images and a corresponding plurality of focus indicator values;
determining an optimal value for the optical distance based on an analysis of data including the plurality of focus indicator values.

14. The method of claim 13, further comprising: directing the actuator to change the optical distance between the optical subsystem and the light modulation unit to the optimal value.

15. The method of claim 3, further comprising:
directing an actuator to change the focus setting of the optical subsystem through a range of settings;
performing (a) through (e) for each of a plurality of focus settings within the range in order to obtain a corresponding plurality of images and a corresponding plurality of focus indicator values; and
determining an optimal value for the focus setting based on an analysis of data including the plurality of focus indicator values.

16. The method of claim 15, further comprising: directing the actuator to change the focus setting to the optimal value.

17. The method of claim 1, wherein the light sensing device includes only one light sensing element.

18. A method for focusing a compressive imaging (CI) device, the method comprising:
(a) supplying a sequence of spatial patterns to a light modulation unit of the CI device;
(b) the light modulation unit modulating an incident light stream with the sequence of spatial patterns to produce a modulated light stream;
(c) acquiring a sequence of the frames from an array of light sensing elements of the CI device, wherein each of the light sensing elements receives a respective spatial portion of the modulated light stream, wherein each of the frames corresponds to respective one of the spatial patterns, wherein each of the frames includes one sample from each of the light sensing elements;
(d) determining a sequence of sum values, wherein each of the sum values is determined by adding the samples in a respective one of the frames of the acquired sequence;
(e) constructing an image using the sequence of spatial patterns and the sequence of sum values;
(f) computing a focus indicator value based on the image, wherein the focus indicator value indicates an extent to which the incident light stream is in focus at the light modulation unit.

19. A method for focusing a compressive imaging (CI) device, the method comprising:
(a) modulating an incident light stream with calibration patterns to obtain a modulated light stream, wherein said modulating is performed by a light modulation unit of the CI device, wherein the light modulation unit includes an array of light modulating elements;
(b) an array of light sensing elements of the CI device receiving the modulated light stream, where the light sensing elements receive respective spatial portions of the modulated light stream and generate respective electrical signals, wherein each electrical signal represents intensity of the respective spatial portion as a function of time, wherein the light sensing elements correspond to respective non-overlapping regions within the array of light modulating elements, wherein each of the calibration patterns specifies that the light modulating elements inside a respective one of the regions are to be set to an off state and specifies that at least a subset of the light modulating elements outside the respective region are to be set to an on state;
(c) for each of the calibration patterns, acquiring a respective group of samples from the array of light sensing elements, wherein each of the sample groups includes at least one sample of each of the electrical signals;
(d) determining spillover values corresponding respectively to the calibration patterns, wherein each of the spillover values is determined based on the sample group corresponding to the respective calibration pattern, wherein each of the spillover values indicates an extent to which modulated light from outside the respective region of the array of light modulating elements reaches the light sensing element corresponding to the respective region;
(e) computing a composite spillover value for the array of light sensing elements based on the spillover values.

20. The method of claim 19, further comprising: directing an actuator to change an optical distance between the light modulation unit and the array of light sensing elements based on data including the composite spillover value.

21. The method of claim 19, further comprising repeatedly performing a set of operations that includes: changing an optical distance between the light modulation unit and the array of light sensing elements; and performing (a) through (e), wherein the set of operations is repeated until the composite spillover value becomes less than a threshold value.

22. The method of claim 19, further comprising: directing an actuator to change an angle of orientation of the array of light modulating elements based on data including the composite spillover value.

23. The method of claim 19, further comprising repeatedly performing a set of operations that includes: changing an angle of orientation of the array of light sensing elements; and performing (a) through (e), wherein the set of operations is repeated until the composite spillover value becomes less than a threshold value.

24. The method of claim 19, wherein each of the calibration patterns specifies that all the light modulating elements outside the respective region are to take the ON state.

25. The method of claim 19, further comprising:
directing an actuator to change an optical distance between the light modulation unit and the array of light sensing elements according to a first displacement value;
performing (a) through (e) a second time, to obtain an additional composite spillover value;
computing a second displacement value for the optical distance between the light modulation unit and the array of light sensing elements based on data including the composite spillover value, the additional composite spillover value and the first displacement value.

26. The method of claim 25, further comprising: directing the actuator to change the optical distance between the light modulation unit and the array of light sensing elements according to the second displacement value.

27. The method of claim 19, further comprising:
    directing an actuator to change an angle of orientation of the array of light sensing elements according to a first displacement value;
    performing (a) through (e) a second time, to obtain an additional composite spillover value;
    computing a second displacement value for the angular orientation based on data including the composite spillover value, the additional composite spillover value and the first displacement value.

28. The method of claim 27, further comprising: directing the actuator to change the angle of orientation of the array of light sensing elements according to the second displacement value.

29. The method of claim 19, further comprising:
    directing an actuator to change an optical distance between the light modulation unit and the array of light sensing elements through a range of distances;
    performing (a) through (e) for each of a plurality of optical distances within the range in order to obtain a corresponding plurality of composite spillover values;
    determining an optimal value for the optical distance based on an analysis of data including the plurality of composite spillover values.

30. The method of claim 29, further comprising: directing the actuator to change the optical distance to the optimal value.

31. The method of claim 19, further comprising:
    directing an actuator to change an orientation angle of the array of light sensing elements through a range of angles;
    performing (a) through (e) for each of a plurality of angles within the range in order to obtain a corresponding plurality of composite spillover values;
    determining an optimal value for the angle based on an analysis of data including the plurality of composite spillover values.

32. The method of claim 31, further comprising: directing the actuator to change the angular orientation to the optimal value.

33. A method for focusing a compressive imaging (CI) device, the method comprising:
    (a) modulating an incident light stream with a calibration pattern to obtain a modulated light stream, wherein said modulating is performed by a light modulation unit of the CI device, wherein the light modulation unit includes an array of light modulating elements;
    (b) an array of light sensing elements of the CI device receiving the modulated light stream, where the light sensing elements receive respective spatial portions of the modulated light stream and generate respective electrical signals, wherein each electrical signal represents intensity of the respective spatial portion as a function of time, wherein the light sensing elements correspond to respective non-overlapping regions within the array of light modulating elements, wherein the calibration pattern specifies that the light modulating elements inside a first one of the regions are to be set to an off state and specifies that at least a subset of the light modulating elements outside the first region are to be set to an on state, wherein the first region corresponds to a first of the light sensing elements;
    (c) acquiring samples of the electrical signal generated by the first light sensing element in response to said modulating the incident light stream with the calibration pattern, wherein each of the samples indicates an extent to which modulated light from outside the first region of the array of light modulating elements reaches the first light sensing element.

34. A method for determining focus-related information for a compressive imaging (CI) device, the method comprising:
    (a) modulating an incident light stream with a sequence of spatial patterns to obtain a modulated light stream, wherein said modulating is performed by a light modulation unit of the CI device, wherein the light modulation unit includes an array of light modulating elements;
    (b) an array of light sensing elements of the CI device receiving the modulated light stream, wherein the light sensing elements receive respective spatial portions of the modulated light stream and generate respective electrical signals, wherein each of the electrical signals represents intensity of the respective spatial portion as a function of time, wherein the light sensing elements correspond to respective non-overlapping regions of the array of light modulating elements;
    (c) acquiring measurements from the array of light sensing elements, wherein the measurements include sample sets that correspond respectively to the light sensing elements, wherein each sample set includes samples of the electrical signal generated by the respective light sensing element, with the samples including at least one sample for each of the spatial patterns;
    (d) computing a focus indicator value based on two or more noise values for two or more respective ones of the light sensing devices, wherein the focus indicator value indicates an extent to which the modulated light stream is in focus at the sensor array, wherein each of the two or more noise values is computed by:
        constructing a respective sub-image based on the sample set of the respective light sensing element and also on a restriction of the spatial patterns to the region of the array of light modulating elements corresponding to the respective light sensing element; and
        computing an amount of noise present in the respective sub-image.

35. The method of claim 34, further comprising: determining a displacement value for the array of light sensing elements based on data including the focus indicator value; and directing the array of light sensing elements to be translated according to the displacement value.

36. The method of claim 34, further comprising: determining an angular displacement value for the array of light sensing elements based on data including the focus indicator value; and directing the array of light sensing elements to be rotated according to the angular displacement value.

37. The method of claim 34, further comprising: changing an optical distance between the light modulation unit and the array of light sensing elements; and performing said changing and the operations (a) through (d) one or more times until the focus indicator value is optimized.

38. The method of claim 34, further comprising: changing an angular orientation of the array of light sensing elements; and performing said changing and the operations (a) through (d) one or more times until the focus indicator value is optimized.

39. A method for determining focus-related information for a compressive imaging (CI) device, the method comprising:
- (a) modulating an incident light stream with a sequence of spatial patterns to obtain a modulated light stream, wherein said modulating is performed by a light modulation unit of the CI device, wherein the light modulation unit includes an array of light modulating elements;
- (b) an array of light sensing elements of the CI device receiving the modulated light stream, wherein the light sensing elements receive respective spatial portions of the modulated light stream and generate respective electrical signals, wherein each of the electrical signals represents intensity of the respective spatial portion as a function of time, wherein the light sensing elements correspond to respective non-overlapping regions of the array of light modulating elements;
- (c) acquiring a set of samples from a first of the light sensing elements, wherein the sample set includes samples of the electrical signal generated by the first light sensing element, with the samples including at least one sample for each of the spatial patterns;
- (d) computing a focus indicator value for the first light sensing device, wherein the focus indicator value indicates an extent to which the modulated light stream is in focus at the sensor array, wherein the focus indicator value is computed by:
    - constructing a sub-image based on the sample set and on a restriction of the spatial patterns to a the region of the array of light modulating elements corresponding to the first light sensing element; and
    - computing an amount of noise present in the sub-image.

40. A method for determining focus-related information for a compressive imaging (CI) device, the method comprising:
- (a) modulating an incident light stream with a sequence of spatial patterns to obtain a modulated light stream, wherein said modulating is performed by a light modulation unit of the CI device, wherein the light modulation unit includes an array of light modulating elements;
- (b) an array of light sensing elements of the CI device receiving the modulated light stream, wherein the light sensing elements receive respective spatial portions of the modulated light stream and generate respective electrical signals, wherein each of the electrical signals represents intensity of the respective spatial portion as a function of time, wherein the light sensing elements correspond to respective non-overlapping regions on the array of light modulating elements;
- (c) acquiring measurements from the array of light sensing elements, wherein the measurements include sample sets that correspond respectively to the light sensing elements, wherein each sample set includes samples of the electrical signal generated by the respective light sensing element, with the samples including at least one sample for each of the spatial patterns;
- (d) computing a focus indicator value based on two or more spillover values for two or more respective ones of the light sensing devices, wherein the focus indicator value indicates an extent to which the modulated light stream is in focus at the sensor array, wherein each of the two or more spillover values is computed by:
    - constructing a respective image based on the sample set of the respective light sensing element and also on the spatial patterns;
    - summing pixels in the image outside the region corresponding to the respective light sensing element.

41. A method for determining focus-related information for a compressive imaging (CI) device, the method comprising:
- (a) modulating an incident light stream with a sequence of spatial patterns to obtain a modulated light stream, wherein said modulating is performed by a light modulation unit of the CI device, wherein the light modulation unit includes an array of light modulating elements;
- (b) an array of light sensing elements of the CI device receiving the modulated light stream, wherein the light sensing elements receive respective spatial portions of the modulated light stream and generate respective electrical signals, wherein each of the electrical signals represents intensity of the respective spatial portion as a function of time, wherein the light sensing elements correspond to respective non-overlapping regions on the array of light modulating elements;
- (c) acquiring measurements from the array of light sensing elements, wherein the measurements include sample sets that correspond respectively to the light sensing elements, wherein each sample set includes samples of the electrical signal generated by the respective light sensing element, with the samples including at least one sample for each of the spatial patterns;
- (d) computing a spillover value for a first of the light sensing devices, wherein the spillover value indicates an extent to which the modulated light stream is in focus at the sensor array, wherein the spillover value is computed by:
    - constructing an image based on the sample set corresponding to the first light sensing element and also on the spatial patterns;
    - summing pixels in the image outside the region corresponding to the first light sensing element.

42. A method for focusing a compressive imaging (CI) device, the method comprising:
- (a) supplying a sequence of spatial patterns to a light modulation unit of the CI device;
- (b) the light modulation unit modulating an incident light stream with the sequence of spatial patterns to produce a modulated light stream;
- (c) a light sensing device of the CI device receiving the modulated light stream and acquiring a sequence of samples representing an intensity of the modulated light stream as a function of time, wherein the sequence of samples includes at least one sample for each of the spatial patterns;
- (d) constructing an image using the sequence of spatial patterns and the acquired samples;
- (e) computing a focus indicator value based on the image, wherein the focus indicator value indicates an extent to which the incident light stream is in focus at the light modulation unit; and
- (f) changing an angle of orientation of the light modulation unit based on data including the focus indicator value.

43. A method for focusing a compressive imaging (CI) device, the method comprising:
- (a) supplying a sequence of spatial patterns to a light modulation unit of the CI device;
- (b) the light modulation unit modulating an incident light stream with the sequence of spatial patterns to produce a modulated light stream;
- (c) a light sensing device of the CI device receiving the modulated light stream and acquiring a sequence of samples representing an intensity of the modulated light stream as a function of time, wherein the sequence of samples includes at least one sample for each of the spatial patterns, wherein the light sensing device includes a plurality of light sensing elements, wherein each of the light sensing elements generates a respective electrical signal representing intensity of a respective spatial portion of the modulated light stream, wherein said acquiring the sequence of samples comprises adding the electrical signals to obtain a sum signal and sampling the sum signal;

(d) constructing an image using the sequence of spatial patterns and the acquired samples;

(e) computing a focus indicator value based on the image, wherein the focus indicator value indicates an extent to which the incident light stream is in focus at the light modulation unit.

44. A method for focusing a compressive imaging (CI) device, the method comprising:

(a) supplying a sequence of spatial patterns to a light modulation unit of the CI device;

(b) the light modulation unit modulating an incident light stream with the sequence of spatial patterns to produce a modulated light stream;

(c) a light sensing device of the CI device receiving the modulated light stream and acquiring a sequence of samples representing an intensity of the modulated light stream as a function of time, wherein the sequence of samples includes at least one sample for each of the spatial patterns, wherein the light sensing device includes a plurality of light sensing elements, wherein each of the light sensing elements generates a respective electrical signal representing intensity of a respective spatial portion of the modulated light stream, wherein said acquiring the sequence of samples comprises sampling each of the electrical signals and adding the sampled versions of the electrical signals in the digital domain;

(d) constructing an image using the sequence of spatial patterns and the acquired samples;

(e) computing a focus indicator value based on the image, wherein the focus indicator value indicates an extent to which the incident light stream is in focus at the light modulation unit.

* * * * *